(12) United States Patent
Roy

(10) Patent No.: US 7,844,466 B2
(45) Date of Patent: *Nov. 30, 2010

(54) CONCEPTUAL ANALYSIS DRIVEN DATA-MINING AND DICTATION SYSTEM AND METHOD

(75) Inventor: Philippe Roy, Lake Worth, FL (US)

(73) Assignee: Conceptual Speech, LLC, Vero Beach, FL (US)

( * ) Notice: Subject to any disclaimer, the term of this patent is extended or adjusted under 35 U.S.C. 154(b) by 439 days.

This patent is subject to a terminal disclaimer.

(21) Appl. No.: 11/840,933

(22) Filed: Aug. 18, 2007

(65) Prior Publication Data

US 2009/0048830 A1 Feb. 19, 2009

Related U.S. Application Data

(63) Continuation of application No. 10/610,080, filed on Jun. 30, 2003, now Pat. No. 7,286,987.

(51) Int. Cl.
*G10L 15/00* (2006.01)
(52) U.S. Cl. ........................ 704/275; 704/200; 704/251
(58) Field of Classification Search ................ 704/200, 704/251, 275
See application file for complete search history.

(56) References Cited

U.S. PATENT DOCUMENTS 6,330,530 B1* 12/2001 Horiguchi et al. .............. 704/4
6,968,308 B1* 11/2005 Brockett et al. ................ 704/9
7,124,073 B2* 10/2006 Tokuda et al. .................. 704/2

* cited by examiner

Primary Examiner—Daniel D Abebe
(74) Attorney, Agent, or Firm—Ostrolenk Faber LLP; Steven M. Hoffberg

(57) ABSTRACT

A new approach to speech recognition that reacts to concepts conveyed through speech, which shifts the balance of power in speech recognition from straight sound recognition and statistical models to a more powerful and complete approach determining and addressing conveyed concepts. A probabilistically unbiased multi-phoneme recognition process is employed, followed by a phoneme stream analysis process that builds the list of candidate words derived from recognized phonemes, followed by a permutation analysis process that produces sequences of candidate words with high potential of being syntactically valid, and finally, by processing targeted syntactic sequences in a conceptual analysis process to generate the utterance's conceptual representation that can be used to produce an adequate response. Applications include improving accuracy or automatically generating punctuation for transcription and dictation, word or concept spotting in audio streams, concept spotting in electronic text, customer support, call routing and other command/response scenarios.

65 Claims, 30 Drawing Sheets

Invention's overview of data flow and processes

Phoneme Recognition process

| Tword (802) | |
|---|---|
| String | mSpelling |
| Logical | mPartOfSpeech[] |
| String | mCDScript[][] |
| String | mExtra[] |

| Tnode (806) | |
|---|---|
| String | mIndexPart |
| TNode | mParentNode |
| TNode | mEqualNode |
| TNode | mSmallerNode |
| TNode | mGreaterNode |
| TData | mData |

| Tdata (804) | |
|---|---|
| TWord | mWords[] |

| Tindex (808) | |
|---|---|
| TNode | mTopNode |
| Number | mNodeCount |

| TNodePos (810) | |
|---|---|
| TNode | mNode |
| Number | mIndexInNode |

Figure 9A Syntactic Transform Script

```
ADJECTIVE PHRASE CONSTRUCTION 1:         ([ADVERB])[AD]ECTIVE] -> ADJECTIVE_PHRASE
ADJECTIVE PHRASE CONSTRUCTION 2:         [ADJECTIVE_PHRASE][CONJUNCTION & "and" | "or"][ADJECTIVE_PHRASE] -> ADJECTIVE_PHRASE
VERB CONSTRUCTION 1:                     [VERB & ":" | "is" | "was" | "will" | "have" | "has" | "to" | "will be" | "have been" | "has been" | "to be" | "will have been" | "be"][VERB] -> VERB
GERUNDIVE ING:                           [VERB & " ing"] -> GERUNDIVE_VERB
GERUNDIVE ED:                            [VERB & " ed"] -> GERUNDIVE_VERB
PLAIN NOUN PHRASE CONSTRUCTION:          ([DEFINITE_ARTICLE | INDEFINITE_ARTICLE])([ORDINAL_NUMBER])([CARDINAL_NUMBER])([ADJECTIVE_PHRASE])[NOUN | PLURAL |
PROPER_NOUN | TIME | DATE | PRONOUN] -> NOUN_PHRASE
NOUN PHRASE UNION:                       [NOUN_PHRASE][CONJUNCTION & "and" | "or" | "until" | "before" | "since"][NOUN_PHRASE] -> NOUN_PHRASE
PREPOSITION PHRASE CONSTRUCTION 1:       [PREPOSITION][NOUN_PHRASE] -> PREPOSITION_PHRASE
PREPOSITION PHRASE CONSTRUCTION 2:       [PREPOSITION_PHRASE][PREPOSITION_PHRASE] -> PREPOSITION_PHRASE
VERB PHRASE CONSTRUCTION 1:              [VERB][NOUN_PHRASE]([PREPOSITION_PHRASE]) -> VERB_PHRASE
VERB PHRASE CONSTRUCTION 2:              [VERB][PREPOSITION_PHRASE] -> VERB_PHRASE
VERB PHRASE CONSTRUCTION 3:              [ADJECTIVE_PHRASE][PREPOSITION][VERB] -> VERB_PHRASE
GERUNDIVE PHRASE CONSTRUCTION:           [GERUNDIVE_VERB]([NOUN_PHRASE])([VERB_PHRASE])([ADVERB]) -> GERUNDIVE_PHRASE
NOUN PHRASE CONST WITH GERUNDIVE:        [NOUN_PHRASE][GERUNDIVE_PHRASE]([GERUNDIVE_PHRASE])([GERUNDIVE_PHRASE]) -> NOUN_PHRASE
PREPOSITION PHRASE CONSTRUCTION 3:       [PREPOSITION][GERUNDIVE_PHRASE] -> PREPOSITION_PHRASE
RESTRICTIVE RELATIVE CLAUSE:             [WH_PRONOUN & "who" | "that" | "where" | "when"][VERB_PHRASE] -> REL_CLAUSE
NOUN PHRASE WITH REL_CLAUSE:             [NOUN_PHRASE][REL_CLAUSE] -> NOUN_PHRASE
VERB PHRASE WITH REL_CLAUSE:             [VERB_PHRASE][REL_CLAUSE] -> VERB_PHRASE
VERB PHRASE CONSTRUCTION 4:              [VERB][NOUN_PHRASE][REL_CLAUSE]([PREPOSITION_PHRASE]) -> VERB_PHRASE
WH_PRONOUN CONSTRUCTION 1:               [WH_PRONOUN][CONJUNCTION & "and" | "or"][WH_PRONOUN] -> WH_PRONOUN
VERB_PH.CONST. 5:                        [VERB][NOUN_PH.]([GERUNDIVE_PH.])(GERUNDIVE_PH.])([PREPOSITION_PH.]) -> VERB_PH.
VERB PHRASE CONSTRUCTION 6:              [VERB][NOUN_PHRASE][ADJECTIVE_PHRASE] -> VERB_PHRASE
VERB PHRASE CONSTRUCTION 7:              [VERB][NOUN_PHRASE][VERB] -> VERB_PHRASE
VERB_PH.CONST.8:                         [VERB_PH.][NOUN_PH.][GERUNDIVE_PH.]([GERUNDIVE_PH.])([PREPOSITION_PH.])->VERB_PH.
VERB PHRASE CONSTRUCTION 9:              [VERB_PHRASE]([NOUN_PHRASE])[ADJECTIVE_PHRASE] -> VERB_PHRASE
VERB PHRASE CONSTRUCTION 10:             [WH_PRONOUN][VERB_PHRASE] -> VERB_PHRASE
VERB PHRASE CONSTRUCTION 11:             [VERB_PHRASE][NOUN_PHRASE]([PREPOSITION_PHRASE | GERUNDIVE_PHRASE]) -> VERB_PHRASE
WH_NP CONSTRUCTION 1:                    [WH_PRONOUN][NOUN_PHRASE] -> WH_NP
WH_NP CONSTRUCTION 2:                    [WH_PRONOUN][ADJECTIVE]([ADVERB]) -> WH_NP
WH_NP CONSTRUCTION 3:                    [WH_PRONOUN][ADVERB][ADJECTIVE] -> WH_NP
WH_NP CONSTRUCTION 4:                    [WH_NP][CONJUNCTION & "and" | "or"][WH_NP | WH_PRONOUN] -> WH_NP
SENTENCE CONSTRUCTION 1:                 ([WH_NP])[VERB_PHRASE]([PREPOSITION & "at" | "in" | "of" | "on" | "for" | "into" | "from") -> SENTENCE
SENTENCE CONST. 2:                       ([WH_NP])[(AUX)][NOUN_PHRASE][VERB_PHRASE | VERB]([PREPOSITION & "at" | "in" | "of" | "on" | "for" | "into" | "from"])[WH_NP]([ADVERB])->SENTENCE
SENTENCE CONSTRUCTION 3:                 [NOUN_PHRASE]([PREPOSITION & "at" | "in" | "of" | "on" | "for" | "into" | "from"])[WH_NP] -> SENTENCE
SENTENCE CONSTRUCTION 4:                 [SENTENCE]([CONJUNCTION & "and" | "or" | "if"])[SENTENCE] -> SENTENCE
```

Figure 9B Number Transform Script

NUMBER TRANSFORM: [<NUMBER>:CARDINAL_NUMBER | ORDINAL_NUMBER]
NUMBER CONST.:    [<LEFT>:CARDINAL_NUMBER | ORDINAL_NUMBER][(CONJUNCTION & "and")][<RIGHT>:CARDINAL_NUMBER | ORDINAL_NUMBER]

Figure 9C Time Transform Script

TRANSFORMATION:   [<WORD>: NOUN & "noon" | "midnight"]
TIME FROM AMPM:   [<HOUR>:CARDINAL_NUMBER][(<MINUTES>:CARDINAL_NUMBER)][<AMPM>: NOUN & "am" | "pm"]
TIME FROM OCLOCK: [<HOUR>:CARDINAL_NUMBER][NOUN & "o'clock"]
TIME FROM DIFF:   [<MINUTES>:CARDINAL_NUMBER][(NOUN | PLURAL & "minute" | "minutes")][PREPOSITION & "to" | "from"][<TIME>:TIME]

Figure 9D Custom Transform Script

AIRLINE IDENTIFICATION:         [AIRLINE][NOUN & "airline" | "airlines"] -> AIRLINE
FLIGHT IDENTIFICATION CONST 1:  ([NOUN & "flight" | "flights"])[AIRLINECODE[(NOUN & "flight" | "flights"])([NOUN & "number" | "numbers"])[CARDINAL_NUMBER] -> FLIGHT
FLIGHT IDENTIFICATION CONST 2:  ([<AIRLINE NAME>:AIRLINE])[NOUN&"flight" | "flights"]([NOUN&"number" | "numbers"])[<FLIGHT NUMBER>:CARDINAL_NUMBER]-> FLIGHT
FLIGHT IDENTIFICATION CONST 3:  [<AIRLINE NAME>:AIRLINE][(NOUN & "number" | "number")][<FLIGHT NUMBER>:CARDINAL_NUMBER] -> FLIGHT
FLIGHT IDENTIFICATION CONST 4:  [<AIRLINE NAME>:AIRLINECODE[(NOUN & "number" | "numbers")][<FLIGHT NUMBER>:CARDINAL_NUMBER] -> FLIGHT
MULTIPLE FLIGHTS 1:             [FLIGHT][CONJUNCTION & "and"][<FLIGHT NUMBER>:CARDINAL_NUMBER] -> FLIGHTS
FLIGHT INTEGRATION:             [FLIGHT] -> NOUN
MULTIPLE FLIGHTS INTEGRATION:   [FLIGHTS] -> NOUN
GATE CONSTRUCTION:              [NOUN & "gate"]([NOUN & "number"])[<GATE NUMBER>:CARDINAL_NUMBER | ORDINAL_NUMBER] -> GATE
GATE INTEGRATION:               [GATE] -> NOUN
CITY IDENTIFICATION 1:          [CITY][NOUN & "airport"] -> CITY
CITY IDENTIFICATION 2:          [NOUN & "city"][PREPOSITION & "of"][CITY] -> CITY
CITY INTEGRATION:               [CITY] -> NOUN Conceptual-201.1

Test Stream sub-process

Time Producer Permutation Callback and Permutation Callback sub-processes

Calculate Predicate for NOUN_PHRASE Stream sub-process

Find Packet sub-process

Find Packet sub-process

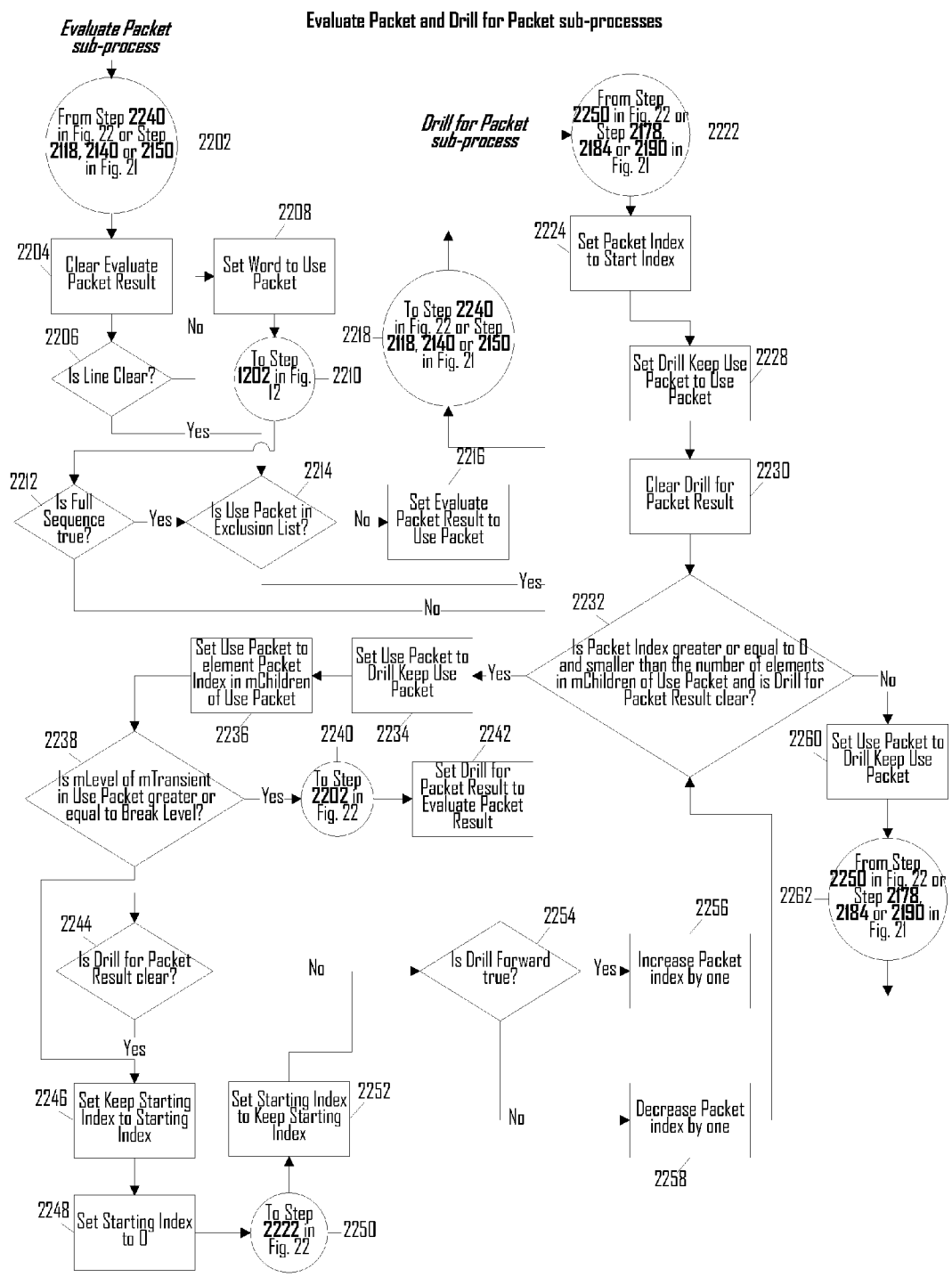
Figure 22 Evaluate Packet and Drill for Packet sub-processes

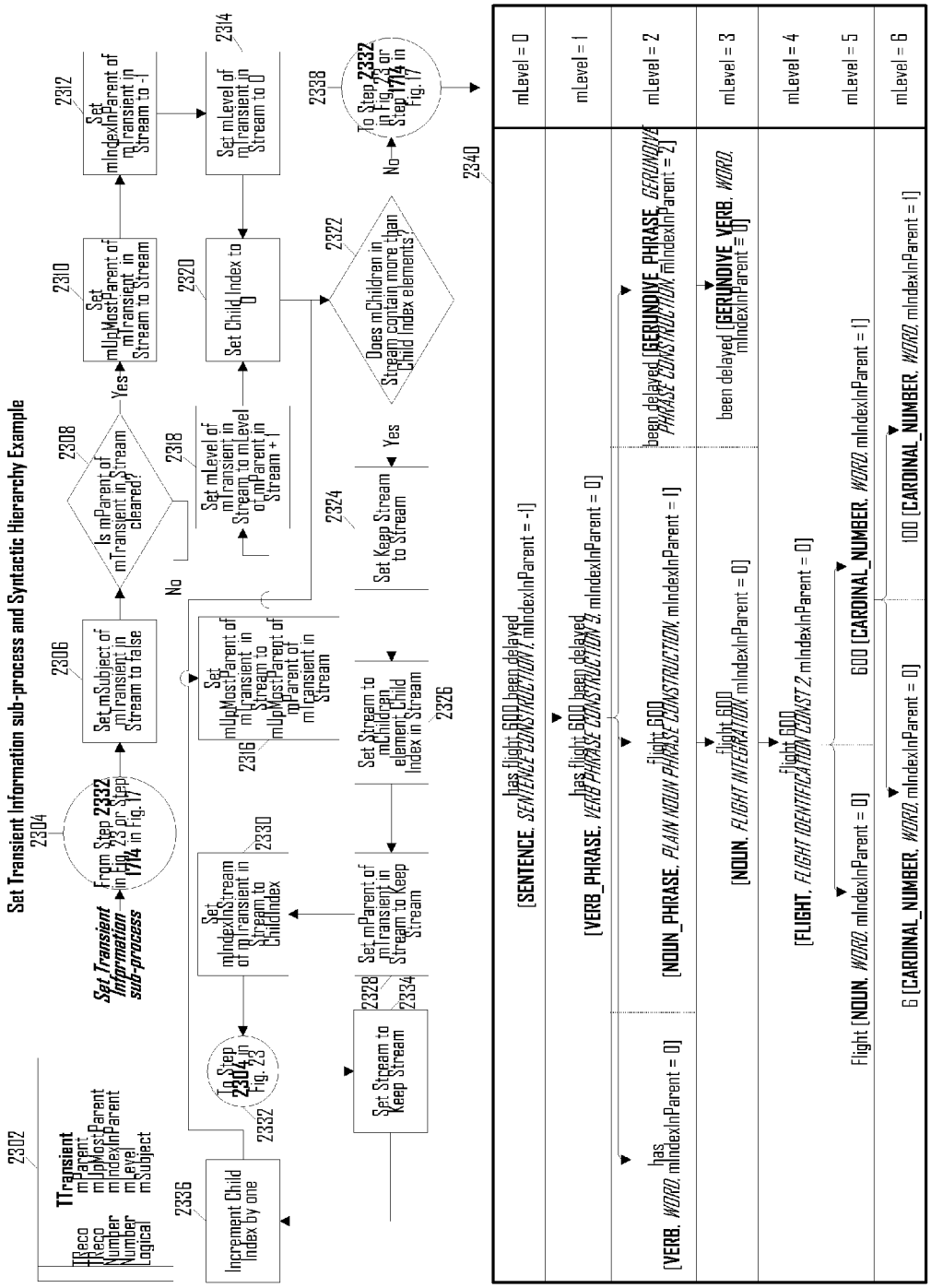

CONCEPTUAL ANALYSIS DRIVEN DATA-MINING AND DICTATION SYSTEM AND METHOD

RELATED APPLICATIONS

The present application is a continuation of U.S. patent application Ser. No. 10/610,080, filed Jun. 30, 2003, the entirety of which is expressly incorporated herein by reference.

FIELD OF THE INVENTION

The present invention relates generally to speech processing. More specifically, the invention relates to speech processing used by humans and interpreted by machines where speech content is restricted only by concepts conveyed instead of syntactic related constraints.

BACKGROUND OF THE INVENTION

Speech recognition is defined as the process allowing humans to interact with machines by using speech. Scientists have worked for years to develop the capability for machines to understand human speech. The applications of this capability are obvious. People can interface with machines through speech, as opposed to the cryptic command inputs that are the norm with today's personal computers, telephony devices, embedded devices and other programmable machinery. For example, a person who wants to access information from a telephone may need to listen to multiple prompts and navigate through a complex phone system by pressing keys on a keypad or matching predefined keywords to get adequate information retrieved. This time-consuming process frustrates, and even sometimes discourages the user, and increases the cost for the information provider.

The most common approach to speech recognition relates to sound analysis of a digitized audio sample, and the matching of that sound sample to stored acoustic profiles representative of pre-defined words or utterances. Techniques for such matching include the Hidden Markov Model (HMM) and the Backus-Naur (BNF) techniques, both well known in the art. Typically, current techniques analyze audio streams and identify one single most probable phoneme per time-slice, while introducing a probabilistic bias for the following time-slice to recognize a single most probable phoneme. A successful "match" of an audio sample to an acoustic profile results in a predefined operation to be executed. Such techniques typically force users to adapt their behavior by limiting their vocabulary, forcing them to learn commands that are recognized by the system or having them react to prompts taking significant time before the information of interest to them is communicated.

One of the greatest obstacles to overcome in continuous speech recognition is the ability to recognize words when uttered by persons having different accents and/or voice intonations. For example, many speech recognition applications cannot recognize spoken words that do not match the stored acoustic information due to particular pronunciation of that word by the speaker. Often users of speech recognition programs must "train" their own speech recognition system by reading sentences or other materials to permit the machine to recognize that user's pronunciation of words. Such an approach cannot be used, however, for the casual user of a speech recognition system, since spending time to train the system would not be acceptable.

Several approaches involve the use of acoustical models of various words to identify words in digitized audio data. For example, U.S. Pat. No. 5,033,087 issued to Bahl et al. and titled "Method and Apparatus for the Automatic Determination of Phonological Rules as For a Continuous Speech Recognition System", the disclosure of which is hereby incorporated by reference in a manner consistent with this disclosure, discloses the use of acoustical models of separate words in isolation in a vocabulary. The system also employs phonological rules which model the effects of coarticulation to adequately modify the pronunciations of words based on previous words uttered.

Similarly, U.S. Pat. No. 5,799,276 issued to Komissarchik et. al. and titled "Knowledge-Based Speech Recognition System and Methods Having Frame Length Computed Based Upon Estimated Pitch Period of Vocalic Intervals", the disclosure of which is hereby incorporated by reference in a manner consistent with this disclosure, discloses an apparatus and method for translating an input speech signal to text. The apparatus segments an input speech signal based on the detection of pitch period and generates a series of hypothetical acoustic feature vectors that characterize the signal in terms of primary acoustic events, detectable vowel sounds and other acoustic features. The apparatus and method employ a largely speaker-independent dictionary based upon the application of phonological and phonetic/acoustic rules to generate acoustic event transcriptions. Word choices are selected by comparing the generated acoustic event transcriptions to the series of hypothesized acoustic feature vectors.

Another approach is disclosed in U.S. Pat. No. 5,329,608 issued to Bocchieri et. al. and titled "Automatic Speech Recognizer", the disclosure of which is hereby incorporated by reference in a manner consistent with this disclosure. Bocchieri discloses an apparatus and method for generating a string of phonetic transcription strings from data entered into the system and recording that in the system. A model is constructed of sub-words characteristic of spoken data and compared to the stored phonetic transcription strings to recognize the spoken data.

Yet another approach is to select candidate words by slicing a speech section by the unit of a word by spotting and simultaneously matching by the unit of a phoneme, as disclosed in U.S. Pat. No. 6,236,964 issued to Tamura et. al. and titled "Speech Recognition Apparatus and Method for Matching Inputted Speech and a Word Generated From Stored Reference Phoneme Data", the disclosure of which is hereby incorporated by reference in a manner consistent with this disclosure.

As previously noted, several approaches use Hidden Markov Model techniques to identify a likely sequence of words that could have produced a given speech signal. For example, U.S. Pat. No. 5,752,227 issued to Lyberg and titled "Method and Arrangement for Speech to Text Conversion", the disclosure of which is hereby incorporated by reference in a manner consistent with this disclosure, discloses identification of a string of phonemes from a given input speech by the use of Hidden Markov Model techniques. The phonemes are identified and joined together to form words and phrases/sentences, which are checked syntactically.

Typically, in prior art approaches, too much emphasis is put on straight sound recognition instead of recognizing speech as a whole, where syntax is used exclusively to build a concept and the concept itself is used in order to produce an adequate response.

SUMMARY OF THE INVENTION

The system and method of this invention provides a natural language speech recognition process allowing a machine to recognize human speech, conceptually analyze that speech so that the machine can "understand" it and provide an adequate response. The approach of this invention does not rely on word spotting, context-free grammars or other single-phoneme based techniques to "recognize" digitized audio signals representative of the speech input and consequently does not probabilistically bias the pattern recognition algorithm applied to compare stored phonemes profiles in each cluster with the audio data. Instead the approach of this invention is to recognize multiple, sometimes alternative, phonemes in the digitized audio signals; build words through streaming analysis, syntactically validate sequences of words through syntactic analysis, and finally, analyze selected syntactically valid sequences of words through conceptual analysis. The invention may utilize some methods related to artificial intelligence and, more specifically, recurrent neural networks and conceptual dependency to achieve these objectives. By conceptually analyzing the speech input, the machine can "understand" and respond adequately to that input. In addition, the invention is applicable to speakers of different accents and intonations by using clusters.

More specially, the invention relates to a multi-phoneme streamer and knowledge representation system and method. By combining novel methods of phoneme recognition based on multi-phoneme streaming, and applying conceptual dependency principles to most probable recognized syntactically valid sequences of candidate words obtained from the permutation of all recognized phonemes in their respective time-slice of an audio sample, the invention enables humans to communicate with machines through speech with little constraint in regards to syntax of commands that can be recognized successfully. Although most of the content of this disclosure relates to an English implementation of the invention, this approach can be used for any language.

The invention utilizes clusters as a grouping of all phoneme speech related data in a targeted group of individuals. (Every language is based on finite set of phonemes, such as about 45 phonemes for English. A cluster is a set of reference phonemes [e.g., 45 phonemes for English] for a particular speaker type, such as a man/woman, adult/child, region, or any combination thereof.) Preferably, the computerized system and method evaluates all probabilities without bias of all phonemes in all clusters for an audio data input through the use of a pattern recognition algorithm. A list of candidate words is then built, while keeping the starting time in the audio input for each of them, using all phonemes identified from a unique cluster in the audio data as exceeding a minimal probability set by the pattern recognition algorithm. Using a dictionary that associates pronunciations to spellings and syntactic parts of speech, a syntactic analysis process builds all syntactically valid sequences of words from all possible permutations of candidate words in the words list while respecting pronunciation of words boundaries. Only high potential of being correctly formed syntactic sequences, for example sentences or other syntactic organizations, are later analyzed conceptually. These sequences preferably encapsulate the entire audio data (i.e., all recognized phonemes) although the invention is operative on any given syntactic organization according to the programming engineer's specifications. A subset of English syntactic organization rules that are applicable to the invention are discussed in Jurafsky, Daniel and Martin, James H., *Speech and language processing*, Prentice Hall, New Jersey, 2000, pages 332-353, the disclosures of which are herein incorporated by reference in a manner consistent with this disclosure.

Conceptual analysis is performed through predicate calculus operations that are driven by Predicate Builder scripts associated with each word and part of speech. Conceptual analysis initially involves searching for an object of knowledge in the syntactic hierarchy derived from the syntactic organization (i.e., what is being talked about, a person, a flight, etc), by parsing all noun phrases, as an example for the English language, and detecting a resulting valid Predicate structure. Once an object of knowledge is successfully detected, the entire syntactic organization is parsed, and the Predicate structure resulting from conceptual analysis is interpreted in order to produce an adequate answer. If an answer cannot be produced from conceptual analysis of the syntactic organization's hierarchy, other syntactic organizations hierarchies that encapsulate the entire, or any desired portion, of the audio data are analyzed conceptually following the same process until at least one succeeds; although the successful conceptual representation may contain some kind of inquiry anomaly derived from the syntactic organization's conceptual analysis, consequently signaling the desired continuation of conceptual analysis processing to eventually build a conceptual representation which contains preferable inquiry anomaly identified in it.

One advantage of the system and method of the invention is that it does not require a predefined syntax from the speaker to be observed in order for a command to be recognized successfully. Another advantage is that systems implementing this method do not require a sound input with high sampling rate in order to be analyzed successfully; for example, telephony systems can function more efficiently with this method than prior art approaches. This indeed significantly improves the balance of power in speech recognition by inserting a process where concepts conveyed have some weight in the recognition task; in contradiction to prior art approaches where emphasis is put on straight sound recognition.

The system includes an audio input device, an audio input digitizer, a unit for recognizing phonemes by applying pattern recognition algorithms, a phoneme stream analyzer for building a list of probable words based on the probable phonemes by reference to a dictionary structure, a syntactic analyzer for building syntactically valid sequences of words from the list of probable words, a conceptual analyzer for building conceptual representations of syntactically valid sequences, and a post analysis process that builds conceptual representations of adequate responses to the original inquiry.

Some of the techniques are based on the concept of Conceptual Dependency (CD), as first set forth by Schank. Many references are available that explain in depth the approach of Schank, which on a very broad level is to remove syntax from a statement leaving the concept intact. In that way, statements of differing syntax yet similar concept are equalized. Such references include Schank, Roger C. and Colby, Kenneth M., *Computer models of thought and language*, W.H. Freeman and Company, San Francisco, 1973, pages 187-247; Riesbeck, Christopher K. and Schank, Roger C., *Inside case-based reasoning*, Lawrence Erlbaum associates publishers, New Jersey, 1989; and Riesbeck, Christopher K. and Schank, Roger C., *Inside computer understanding*, Lawrence Erlbaum associates publishers, New Jersey, 1981. The disclosures of each of these references are incorporated by reference herein in a manner consistent with this disclosure.

It is an object of the invention to:

i. provide a method for speech recognition that builds words and syntactically valid sequences of words from the phonemes contained in a digitized audio data sample.

ii. provide a method that combines artificial intelligence and recurrent neural networks with phoneme recognition and Conceptual Dependency that allows a machine to conceptually "understand" a digitized audio data sample.

iii. provide a method of conceptual speech recognition that allows a machine to formulate an adequate response to a digitized audio data sample based on the machine's conceptual "understanding" of the input.

iv. provide a method of conceptual speech recognition that is speaker independent.

v. provide a method of conceptual speech recognition that recognizes not only words but concepts in a digitized audio sample.

vi. provide a method of conceptual speech recognition that recognizes concepts in a digitized audio sample substantially regardless of the speaker's vocal intonation and/or accent.

vii. provide a system utilizing a method of conceptual speech recognition that can be accessed and used by numerous users without prior training and/or enrollment by those users in the system.

viii. provide a system and method for word spotting in an audio stream.

ix. provide a system and method for concept spotting in an audio stream or electronic text.

x. provide a system and method for validating punctuation and syntactic relationships in dictation speech recognition.

xi. provide a system and method that can generate punctuation in existing dictation systems so punctuation marks do not have to be read into dictation, allowing the user to speak more naturally.

xii. provide a system and method that can enhance recognition accuracy of existing dictation systems.

These and other aspects of the invention will become clear to those of ordinary skill in the art based on the disclosure contained herein.

BRIEF DESCRIPTION OF THE DRAWINGS

The invention will be described with reference to the following drawings, in which like elements are referenced with like numerals.

FIG. 9A is a schematic of an exemplary syntactic transform script according to one embodiment of the invention.

FIG. 9B is a schematic of an exemplary number transform script according to one embodiment of the invention.

FIG. 9C is a schematic of an exemplary time transform script according to one embodiment of the invention.

FIG. 9D is a schematic of an exemplary custom transform script according to one embodiment of the invention.

FIG. 22 is a flow diagram of the Evaluate Packet and Drill for Packet sub-process according to one embodiment of the invention.

FIG. 23 is a flow diagram of the Set Transient Information sub-process and a Syntactic Hierarchy example according to one embodiment of the invention.

DETAILED DESCRIPTION OF THE INVENTION

Figure 1:
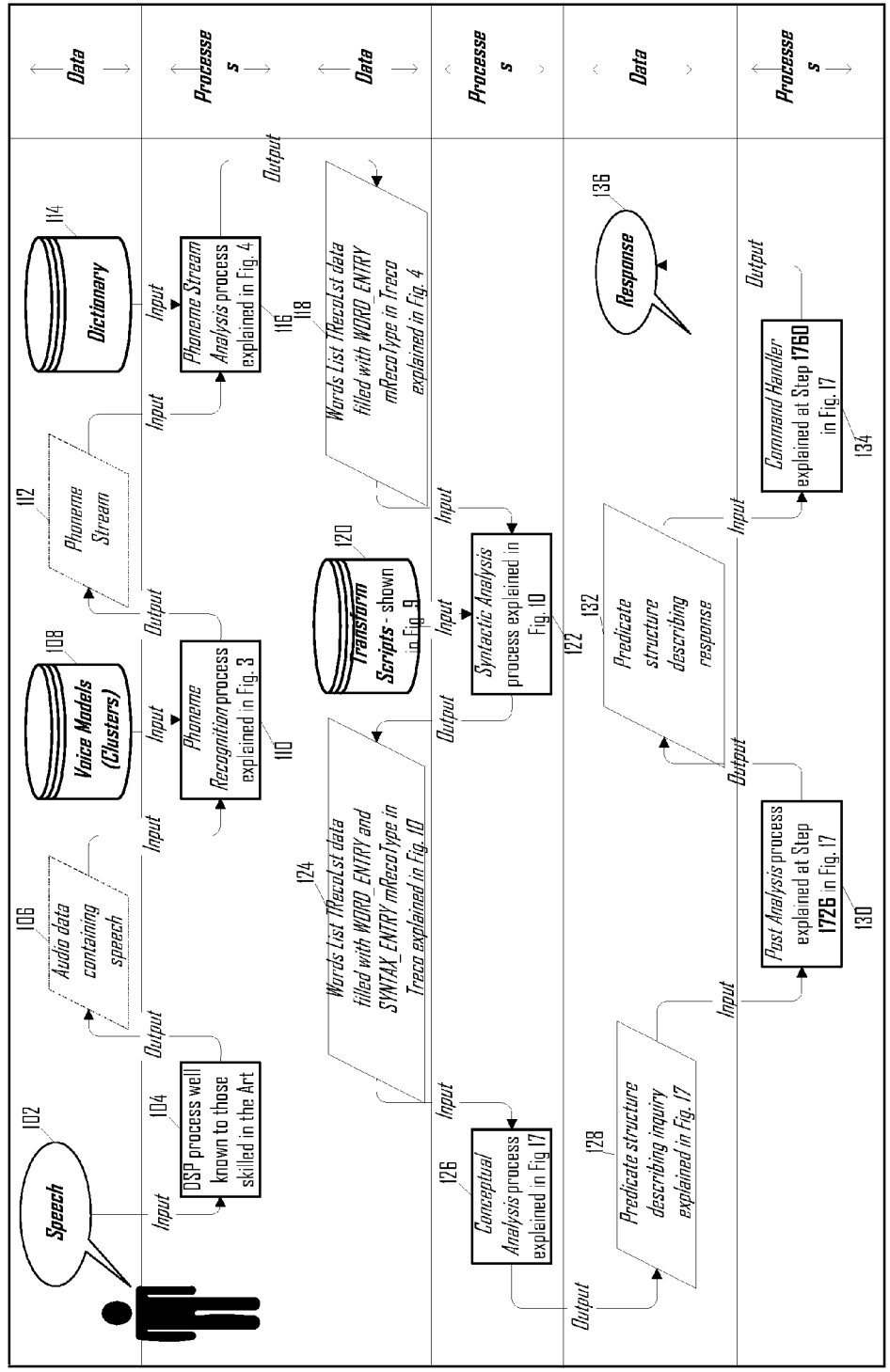
FIG. 1 is a schematic of one embodiment of the method of the invention.

The system and method of the invention is designed to operate on any programmable device available now or hereafter developed, including personal computers and networks, embedded devices, main frames, distributed networks or other means of computing that may evolve over time. The computer should be capable of sufficient speed and contain sufficient memory in order to operate the various subroutines and processes, described below, of the conceptual speech recognition method. The invention may be used on a personal computer or embedded device by way of audio input, which may be accomplished by numerous acceptable methods now known or later developed. The only requirement of the audio data input is that it be digitized either prior to being input, or otherwise after being input into a system operating using the invention. The audio data input could be digitized according to well understood digitization techniques, including, for example, PCM (Pulse Code Modulation), DM (Delta Modulation), APCM (Adaptive Pulse Code Modulation), ADPCM (Adaptive Delta PCM) and LPC (Linear Predictive Coding); although other methods of digitizing the audio data input could be utilized and the foregoing references are not intended to be limiting. Standard references well known to those skilled in the art teach various techniques for digitizing speech signals. See for example *Digital Processing of Speech Signals* by L. R. Rabiner and R. W. Schafer (Prentice-Hall 1978), and Jurafsky, Daniel and Martin, James H., *Speech and language processing*, Prentice Hall, New Jersey, 2000, the disclosures of which are hereby incorporated by reference in a manner consistent with this disclosure.

It should be understood by those of skill in the art that digitizing the speech can occur in multiple fashions by multiple devices at multiple locations. For example, the speech can be digital encoded in the various fashions discussed previously (PCM, ADPCM, etc.). The speech can be digitized by various devices, such as a conventional A-to-D converter, a cell phone, a personal computer, an embedded device, a PDA, and so forth. The speech can be digitized at various locations, such as at a cell phone, PC, PDA or the like proximate to the speaker. The speech can be digitized at a network server or other computer or embedded device remote from the speaker, such as at a customer service center implementing the present invention to field customer service calls. Finally, it should also be understood that the term "digitizing" or "digitization" should be understood to not only encompass digitally encoding an analog signal, but also re-digitizing a presently digital signal. For example, if the speaker is transmitting speech through a digital cell phone as understood in the art, two phases of digitizing may occur: one at the cell phone where the speaker's analog voice signal is converted to a digital representation for transmission over-the-air, and a second one at a speech processing system where the digital signal may be re-digitized to provide a digital signal with the proper bit resolution, quantization, bit rate, and so forth, in accordance with the requirements of the system.

Audio input devices used by this system and method include microphone, telephone, wireless transceiver, modem, a voice recorder (analog or digital) and any other existing or future technology permitting spoken words to be received and converted into an electrical, electromagnetic or any other physical representation. If the system is utilized on a network (e.g., the Internet, LAN, PAN, WAN, cellular network, Public Switched Telephone Network [PSTN], or the like), the network should have an interface capable of receiving the audio input. Common interfaces include interfaces with the PSTN where the audio input is by telephone (or with a cellular network via a wireless transceiver); a network server where the audio input is by Internet; In addition, the system should include a method for outputting the result in response to the audio input. Such output may include digitized artificial speech generated by the computer through its speakers or by telephone (or wireless transceiver); a text output for medias such as the Internet (or any other similar distributed networks) and email; or any other process which may be invoked as a result to a successful recognition.

It is to be understood that a voice recorder encompasses analog or digital technology for storing a representation of speech, such as analog tape (e.g., VHS, etc.), digital tape, memories storing digital sound files (e.g., .wav, .voc, .mp3, and the like), and so forth. Further, the interface or link between a sound source (whether it be a live source such as a person speaking into a microphone or a recorded source such as a .wav file) and the speech processing system of the present invention may encompass a packet-switched network connection (e.g., Internet, WAN, PAN, LAN, etc.), a circuit-based or packet-switched telephony connection (e.g., PSTN or cellular network), a microwave connection, satellite connection, cable connection, terrestrial broadcast-type connection and the like. Of course, it is readily appreciated that the interface between the sound source and the speech processing system may be a direct connection where the sound source and the speech processing system are essentially collocated.

Typically, the invention is accessed in a real-time interactive environment between a personal computer, network server or embedded device that operates the system and the persons or entities that input the audio data. In many situations, a business will operate the speech recognition system of the invention through a network server to provide some information to its customers. Such information may include, for example, bank account information, assistance with products, customer assistance with billing inquiries, driving directions, stock prices or airline flight information. These examples of the types of information that may be provided as a result of the conceptual speech recognition system and method are exemplary only and are not intended to limit the invention. In fact, any information may be provided in response to audio input by use of the conceptual speech recognition system and method of the present invention.

Typically, a customer of a business that is utilizing the conceptual speech recognition system and method will make some inquiry. The vocalization of that inquiry comprises the audio data input into the system. Preferably, the system will provide the customer with the answer to the inquiry in real time. However, the system can also be operated on a batch basis in which case the customer may input the inquiry, and the system may provide the answer to the customer at a later time.

The data processor preferably will have one or more memory units for storing received audio data input samples, and preferably maintains a file system whereby each stored audio input sample is designated with file reference indicia. When the system has completed the speech recognition process, the result can be referenced using the same file reference indicia such that the result of the speech recognition process can be returned to the customer that input the data. The audio return may be made in real-time, or it may be returned at a later time. The return may be made by any form of wired or wireless communication including telephone or email or may be stored to persistent memory for later referral.

The invention entails other applications as well. The invention may be used to provide word recognition services given an audio input. Similarly, the invention may be used to provide syntactic validation of dictation that may be input using other phoneme recognition methods, such as HMM, to improve accuracy.

Referring to the figures, FIG. 1 depicts a flow scheme representing the invention's overview of data flow and processes in the preferred embodiment of the invention.

In Box 102, an utterance is produced by a speaker. The speaker may be a person or a machine. Audio may be captured by a microphone connected to a computer, a telephone line receiving a signal, an interface though an embedded device or any other means of communication that may be known today or later developed. In Step 104, digital signal processing (DSP) is performed to digitize the audio signal. Virtually any DSP process known to those skilled in the art can be used. Box 106 shows the result of Step 104 as audio data that contains the speech information of the utterance. Step 110 uses the audio data containing speech in Box 106 and voice models that are predefined and programmed into the system as input to execute a Phoneme Recognition process shown in Box 108 (an exemplary phoneme recognition process is further described in FIG. 3), which will produce a phoneme stream shown in Box 112 (also explained in FIG. 3). The Phoneme Recognition process at Step 110 detects probable phonemes over a predefined probabilistic threshold per time-slice.

The Phoneme Recognition process is capable of detecting a plurality of candidate phonemes, some of which are alternative candidate phonemes, meaning that they represent different possible phonemes detected in the same sample of speech, or audio input. It should also be noted that the threshold employed is preferably fixed, although it could be adaptive. For example, the threshold might be automatically adjusted based on throughput considerations. Similarly, the threshold may vary with time for different phonemes within a given cluster, within a given cluster, or between different clusters. The threshold may also be constant and the same for all clusters, constant but potentially different for all clusters or constant but potentially different for all phonemes within a given cluster.

In Step 116, the Phoneme Stream Analysis process uses the phoneme stream shown in Box 112 and the Dictionary shown in Box 114 as an input. The Phoneme Stream Analysis process at Step 116 will generate a list of words potentially uttered by the speaker (candidate words) ordered by their respective starting phoneme index in the phoneme stream, as shown in Box 118. Preferably, the Phoneme Stream Analysis process is based on permuting all combinations of the candidate phonemes to generate an initial list of candidate words. Candidate words may be processed according to a dictionary, described further below, to identify a subset referred to as candidate words.

In Step 122, a Syntactic Analysis process (an example of which is explained in FIG. 10) is performed by applying transform scripts (e.g., like the exemplary ones shown in FIG. 9) from Box 120 to the list of words potentially uttered from Box 118. The Syntactic Analysis process in Step 122 populates the list of potentially spoken words with syntactic organizations in Box 124 while respecting word boundaries and rules described in transform scripts. The transform scripts may be adapted and customized for individual operations, and customization may improve system operation.

Figure 17:
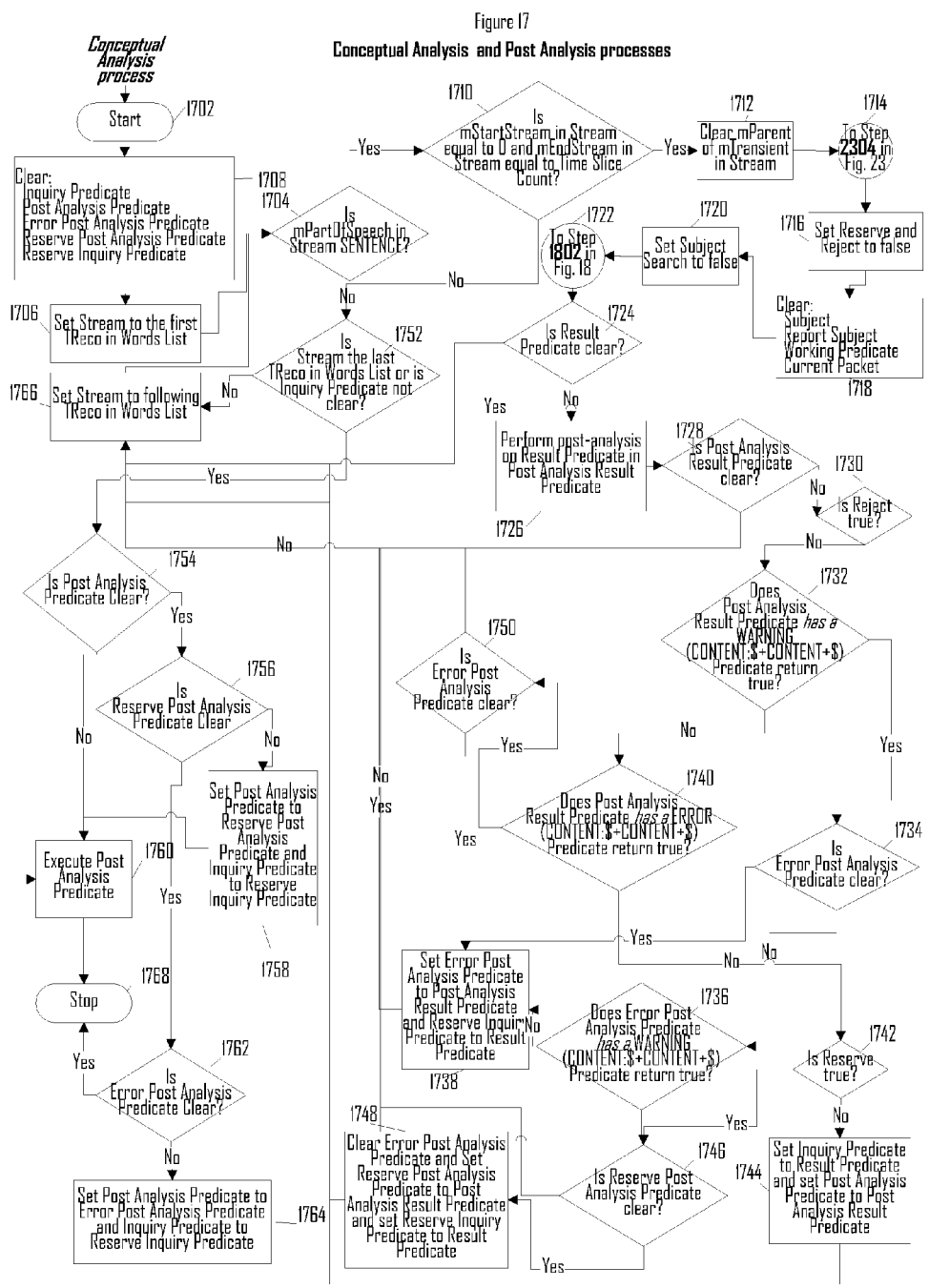
FIG. 17 is a flow diagram of the Conceptual Analysis and Post Analysis processes according to one embodiment of the invention.

In Step 126, the Conceptual Analysis process uses the list of candidate words with syntactic organizations from Box 124 as input to calculate a Predicate structure describing conceptually the inquiry uttered by the speaker. A Predicate structure, further explained in FIG. 17, is a conceptual representation where all elements of syntax are removed; as an example, the Predicate structure of "What time is it?" would be the same as the one of "What is the time?" since both sentences convey the same concept and they only differ by their syntax used. The technique of Conceptual Dependency forms the basis of this aspect of the invention, which technique was first formulated by Schank. The Conceptual Analysis process at Step 126 generates a Predicate structure describing the inquiry in Box 128.

In Step 130, the Post Analysis process, further explained in FIG. 17, uses the inquiry Predicate structure from Box 128 in order to produce a response Predicate structure in Box 132. A different Predicate structure is produced to formulate a response than the one that described the inquiry since a system may well understand what is being asked, but it does not automatically mean it can produce an adequate response. Having two separate concepts, one for the inquiry and another one for the response, is more adequate than using only one for the inquiry and matching it to stored concepts that may be handled by the system, although the invention may be implemented by matching an inquiry to stored concepts if desired in a particular application.

If desired, in Step 134, the Command Handler, further explained in FIG. 17, processes the response Predicate structure to produce the response in Box 136. A Predicate structure can indeed be processed since it contains action primitives that can be implemented in the system. As an example, the action primitive SPEAK with the content role would generate a voice synthesizer of the filler associated with the content role, producing an audible response to the speaker. The response does not have to be limited to an audible response, however. The response Predicate structure may hold any operation it sees fit as a response to the inquiry (a database change, a phone connection being made, a light turned on, or else).

Figure 2:
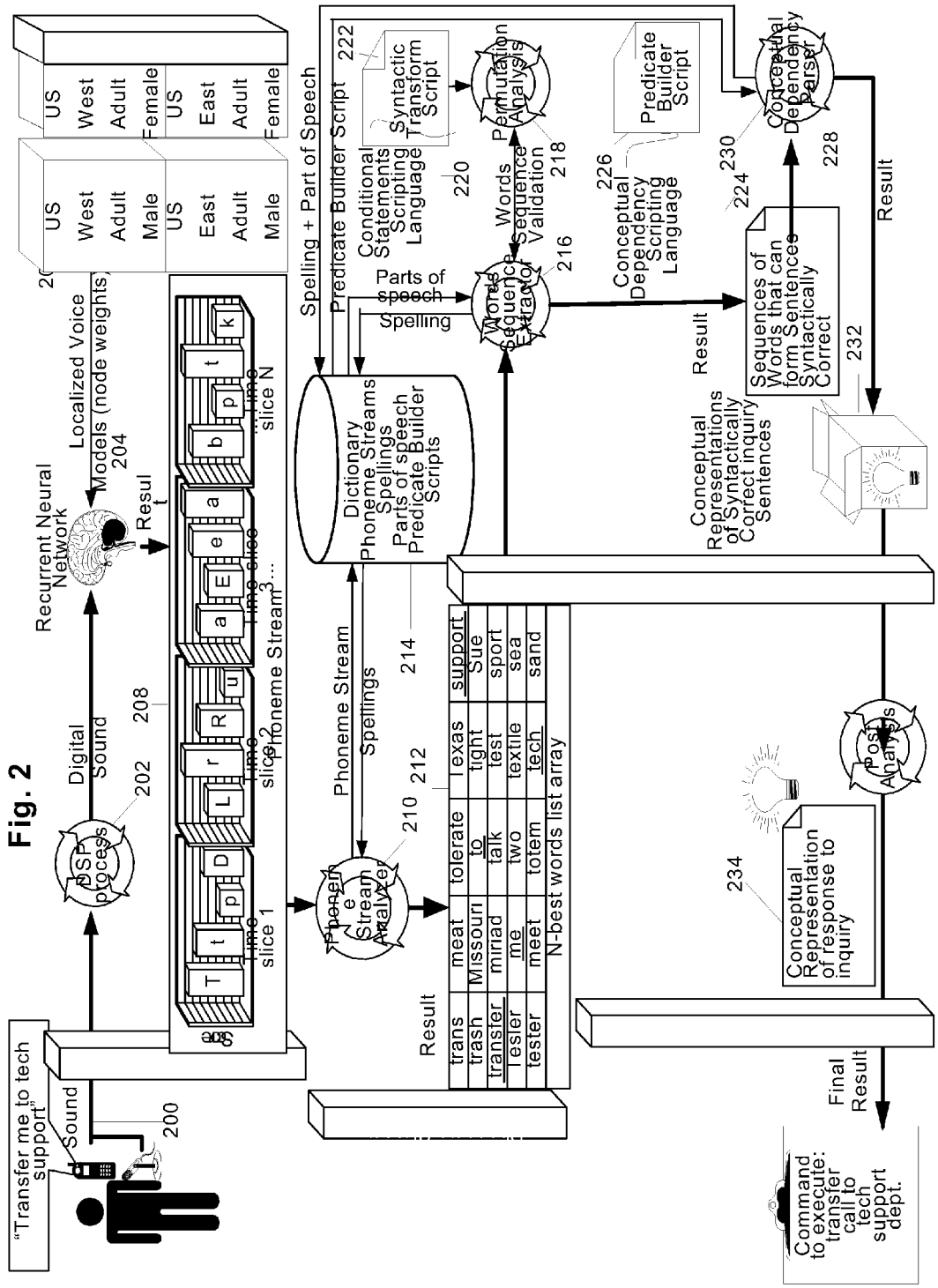
FIG. 2 is a schematic of one embodiment of the system of the invention.

Referring to FIG. 2, a flow diagram for the operation of the method of the invention is depicted. The first aspect of the method involves phoneme recognition. At 200, a customer of an operator of the system's invention contacts the system through some communication medium and inputs an inquiry in the form of audio data which is received by the system. At 202, the audio input is digitized by any now known or later developed technique for digitization. At 204, the digitized audio data stream is analyzed for probable phoneme recognition, where probable phonemes for any given time-slice are detected. The probable phonemes are detected using pattern recognition algorithms known to persons skilled in the art, and may be any method now known or later developed. The pattern recognition algorithm utilizes a plurality of pre-defined clusters, seen at 206, each cluster containing a pre-defined set of phonemes with different vocal accents and/or intonations, such as U.S. Western male, U.S. Northeastern female, etc. The pattern recognition algorithm determines the presence of any phonemes in the audio data sample that exceed a minimum pre-determined probability of being present in the audio data sample. The result of the phoneme recognition process is a phoneme stream 208 which comprises a string of characters indicative of recognized phonemes whose probability exceed the minimum probabilistic threshold, and also includes other characters to indicate the start time and end time of the occurrence of that phoneme in the audio data sample as well as the positioning of data within the phoneme stream.

After the probable recognized phonemes have been analyzed and the phoneme stream 208 has been generated, the phoneme stream is analyzed to determine candidate words from the phoneme stream 208. A phoneme stream analyzer 210 builds a list of candidate words 212. The phoneme stream analyzer 210 refers to a pre-built dictionary 214 for information related to words that may be placed in the word list 212, including such information as spellings and parts of speech.

Next, the system builds a list of probable sequences of candidate words that can form syntactically correct sequences 228 using the words sequence extractor 216. This is performed by use of syntactic rules applied to the candidate words 212 using information associated with those words in the Dictionary 214. Multiple sequences may be developed using permutation analysis 218, by applying syntactic rules, or transform scripts 222, that may be adapted for any particular application.

The syntactically correct syntactic organizations that use all the time-slices from the phoneme stream, or at least those time-slices selected by the programming engineer, are then parsed to determine their conceptual representations 232 by the conceptual dependency parser 230. This technique, as originally formulated by Schank, is applied through the use of a conceptual dependency scripting language 224 and Predicate Builder scripts 226. Once the conceptual representation of the inquiry is determined, a conceptual representation of a response is calculated in post analysis 234. The final result is a command to execute in response to the inquiry.

The process of the preferred embodiment can, for ease of discussion, be categorized into four major functional processes: Phoneme Recognition, Phoneme Stream Analysis, Syntactic Analysis and Conceptual Analysis. These processes, along with the corresponding structures and examples of different scripts, are explained in detail in the following sections.

Phoneme Recognition

Figure 3:
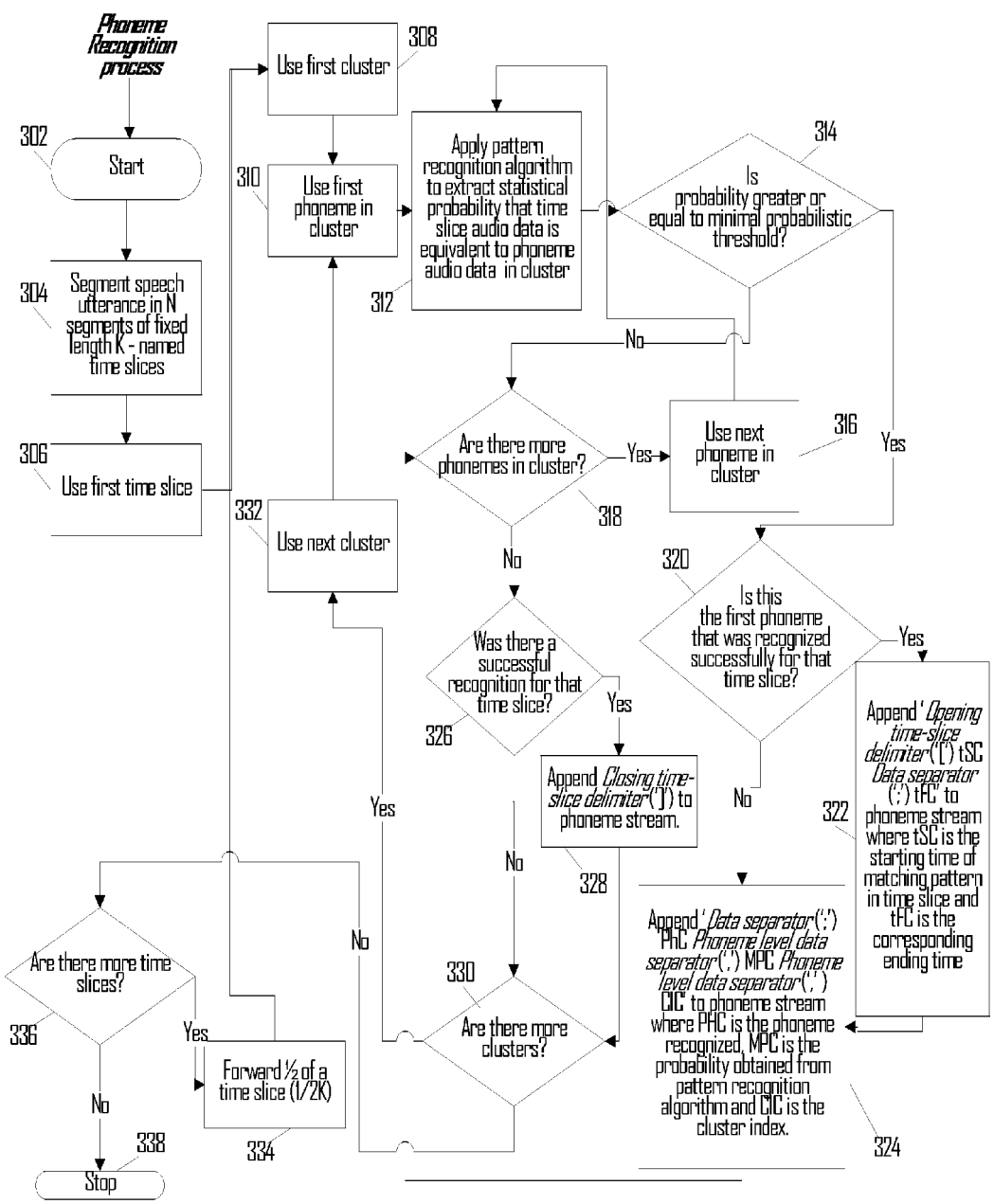
FIG. 3 is a flow diagram of the Phoneme Recognition process according to one embodiment of the invention.

Turning now to FIG. 3, a flow scheme for the Phoneme Recognition process in the preferred embodiment of the invention is depicted. The result of the Phoneme Recognition process is a single phoneme stream of recognized phonemes that comprises a finite sequence of N characters $PS_{1-N}$.

The phoneme stream produced in FIG. 3 uses the following special characters:

1. Opening time-slice delimiter ('['): identifies the beginning of a new time-slice in the phoneme stream with at least one recognized phoneme.

2. Closing time-slice delimiter (']'): identifies the end of the time-slice in the phoneme stream.

3. Data separator (';'): the Data separator is used between the Opening and Closing time-slice delimiters to separate the starting time and ending time values as well as to separate all data related to each phoneme recognized in a single time-slice.

4. Phoneme level data separator (','): the Phoneme level data separator is used to separate the phoneme from the probability and the probability from the cluster index used to recognize the phoneme in a time-slice of the phoneme stream (between the Opening and Closing time-slice delimiters).

In Step 302, the process of Phoneme Recognition begins with an audio signal as an input to the system. Methods and formats for inputting audio into the system are well known in the art. For example, audio may be input into the system by reading a buffer of audio impulse generated numeric values obtained from a microphone connected to a computer or reading any buffer in memory or on storage that represents audio impulse generated by any mean. Any of these known methods and formats may be used with the system.

The system has predefined clusters $Cl_{1-N}$, each cluster $Cl_i$ holding data required to estimate pattern equivalence for each phonemes $Ph_{1-N}$.

In Step 304, the received audio signal is split into any number of segments of fixed time length K. The fixed time length K in Step 304 is a constant value, preferably between 5 milliseconds and 40 milliseconds, most preferably between 10 milliseconds and 20 milliseconds. The fixed time length for the fixed time length K is determined by experimentation and typically does not vary through a single execution of the phoneme recognition process.

In Step 306, the first time-slice $K_1$ taken from time zero having a fixed time length of K is set in the system as the current time-slice $K_C$. In Step 308, the first cluster $Cl_1$ is set as the current cluster $Cl_C$. In Step 310, the first phoneme $Ph_1$ in the current cluster $Cl_C$ is set as the current phoneme $Ph_C$.

A pattern recognition algorithm is performed in Step 312 that compares the current phoneme $Ph_C$ of the current cluster $Cl_C$ to the audio data of current time-slice $K_C$. The pattern recognition algorithm may be one of many known today to those skilled in the art. By way of example and not intending to limit the invention in any manner, the pattern recognition algorithm may include a recurrent neural network, a time delay neural network, a Gamma-filtered time delay neural network, a static neural network trained with MFC coefficients, a Self-Organizing Maps in an AKA Kohonen neural network, Formant analysis, a multivariate Gaussian classifier or any other adequate pattern recognition process now known or later developed.

In Step 314, the matching probability $MP_C$ for the recognition of $Ph_C$ in the audio data of $K_C$ is compared to a predetermined minimal probabilistic threshold MPT for $Cl_C$. MPT is a constant value associated with each cluster $Cl_i$ and does not change in time during processing for that given cluster $Cl_i$. MPT is determined by experimentation for each cluster, and is the probabilistic value obtained from audio test cases where correct phonemes are recognized successfully while minimizing occurrences of wrong phonemes.

If the $MP_C$ for $Ph_C$ is less than the minimal probabilistic threshold MPT for the current cluster $Cl_C$, the system determines if there are more phonemes $Ph_i$ in current cluster $Cl_C$ that have not been compared to the audio data of $K_C$. If additional phonemes $Ph_i$ are found in current cluster $Cl_C$, in Step 318 the next phoneme $Ph_{C+1}$ in current cluster $Cl_C$ is set as the current phoneme $Ph_C$.

If $MP_C$ is greater or equal than MPT for the current cluster $Cl_C$, the process continues at Step 320. In Step 320, the system determines if recognized phoneme $Ph_C$ is the first phoneme with an $MP_C$ that exceeded MPT for the time-slice $K_C$. If so, at Step 322, characters of the formula 'Opening time-slice delimiter ('[') $t_{SC}$ Data separator (';') $t_{FC}$' are appended to the phoneme stream where $t_{SC}$ is the starting time of matching phoneme $Ph_C$ in the audio data measured from the start of the audio used as input to the process, and $t_{FC}$ is the ending time of matching phoneme $Ph_C$ within the audio data measured from the start of the audio used as input to the process. The phoneme stream is a continuous but finite sequence of characters $PS_{1-N}$ stored in memory in the system that represent the sequence of probable phonemes $Ph_i$ that were recognized over the predefined MPT to their respective cluster $Cl_i$ with their associated probability $MP_i$, starting time $t_{si}$ and ending time $t_{Fi}$ are expressed from the elapsed times from the start of the audio data used as input to the process.

If a recognized phoneme $Ph_C$ is not the first time a phoneme $Ph_i$ with a $MP_C$ that exceeded MPT for the current time-slice $K_C$ was detected by the pattern recognition algorithm, in Step 324, characters of the formula 'Data separator (';') $Ph_C$ Phoneme level data separator (',') $MP_C$ Phoneme level data separator (',') $Cl_C$' are appended to the phoneme stream.

From Step 324, the process moves to Step 318 to determine if there are additional phonemes $Ph_i$ in the current cluster $Cl_C$ that have not had MP determined for the audio data of time-slice $K_C$. If there are additional phonemes $Ph_i$ in current cluster $Cl_C$, $Ph_{C+1}$ is set as $Ph_C$ and the MP for each additional phoneme $Ph_i$ in cluster $Cl_C$ is determined as described in Step 312. The process continues as previously described until all phonemes through $Ph_N$ in current cluster $Cl_C$ have had MP determined for the audio data of time-slice $K_C$ in Step 318.

Once it is determined in Step 318 that all phonemes $Ph_{1-N}$ of cluster $Cl_C$ have been compared to audio data of time-slice $K_C$, in Step 326 the system determines if there were any phonemes $Ph_i$ for which the MP exceeded the MPT for the cluster $Cl_C$. If so, in Step 328 the Closing time-slice delimiter is appended to the phoneme stream of recognized phonemes from cluster $Cl_C$. At Step 330, the system determines if all clusters $Cl_i$ have been analyzed. If not, the next cluster $Cl_{C+1}$ is set as current cluster $Cl_C$ and the process begins again at Step 332 until all clusters $Cl_{1-N}$ have been analyzed.

If in Step 326 the system determines that there were no successful phoneme recognitions, i.e., there was no $Ph_C$ in current cluster $Cl_C$ for which $MP_C$ exceeded MPT for the audio data of time-slice $K_C$, the system determines in Step 330 if all clusters $C_{1-N}$ have been analyzed. If there are more clusters $Cl_i$, the system designates the next cluster $Cl_{C+1}$ as current cluster $Cl_C$ at Step 332. The process of phoneme recognition begins again at Step 310 and continues until all clusters $C_{1-N}$ have been analyzed.

If at Step 330 the system determines that all clusters $Cl_{1-N}$ have been analyzed, at Step 336 the system tests if there is additional audio data in addition to that contained in the current time-slice $K_C$. If so, at Step 334 the system selects audio data for a following time-slice $K_{C+1}$ for a time-slice of fixed time length K beginning at a time ½ of the fixed time length K (½ K) past the beginning of current time-slice $K_C$. The system begins the Phoneme Recognition process again at Step 308 where $K_C$ equals $K_{C+1}$. The system continues to analyze time-slices in the audio signal in this manner, advancing the beginning of each time-slice $K_i$ having fixed time length K from the beginning of the current time-slice $K_C$ by a time between 0.4K and 0.6K, but preferably ½K, until the entire audio signal has been analyzed. If at Step 336 there are no more time-slices after the current time-slice $K_C$ having a fixed time length K and beginning at a time that is advanced past the beginning of current time-slice $K_C$ by a time of ½K, the system notes at Step 338 the end of the Phoneme Recognition process.

The result of the Phoneme Recognition process at Step 338 is a single phoneme stream of recognized phonemes from the audio data into the system, which phoneme stream comprises a finite sequence of N characters $PS_{1-N}$. This phoneme stream is then analyzed to build a list of probable words recognized in the phoneme stream.

Phoneme Stream Analysis

Figure 4:
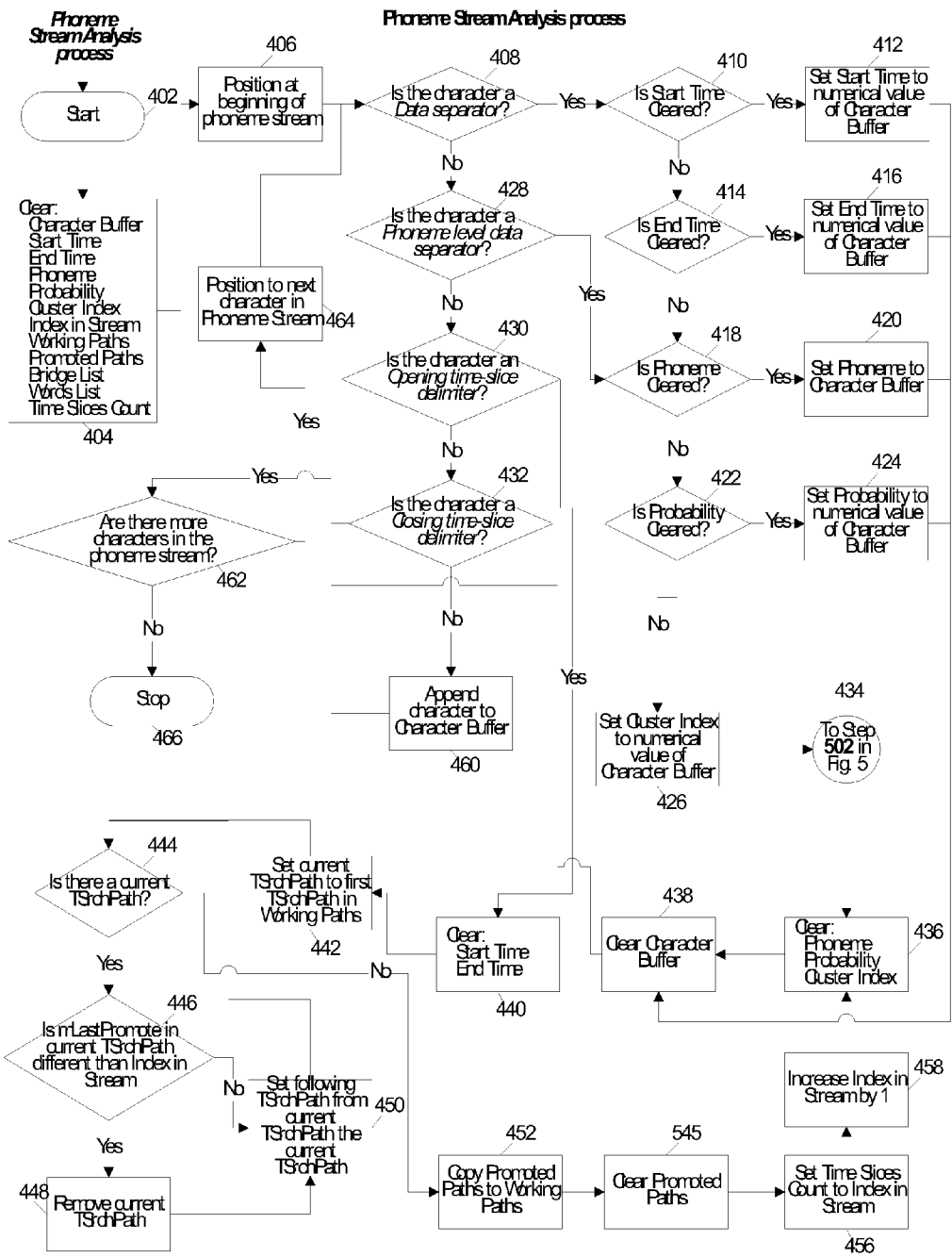
FIG. 4 is a flow diagram of the Phoneme Stream Analysis process according to one embodiment of the invention.

FIG. 4 depicts a flow scheme for the Phoneme Stream Analysis process in the preferred embodiment of the invention. The Phoneme Stream Analysis process decodes the phoneme stream $PS_{1-N}$ produced by the Phoneme Recognition process explained in FIG. 3 and produces a unique list of words, candidate words, ordered by their respective starting phoneme index in the phoneme stream stored in a TRecoLst structure as seen in Box 602 and Box 604 of FIG. 6.

In order to permute candidate phonemes from every time-slice with other candidate phonemes from the following time-slice and produce all candidate words from such permutations, search paths are used. Each search path, as seen in the TSrchPath structure definition in Box 606 in FIG. 6, holds a single phoneme permutation sequence obtained from the analysis of contained phonemes of a phoneme stream. That phoneme permutation sequence in TSrchPath is kept in mPhonemeStream and needs to be a sequence that refers to a partial pronunciation of at least one word in the dictionary. As an example, a search path could contain a phoneme sequence in mPhonemeStream like the pronunciation of 'deliv', which is part of the pronunciation of the pronunciation of the word 'delivery' that is contained in the dictionary. As soon as a single phoneme is added to mPhonemeStream in a search path where the resulted mPhonemeStream is not a partial pronunciation stored in the dictionary, the search path is dropped. As an example, adding the 'c' phoneme to 'deliv' would result in the search path being dropped since there are no such words in the dictionary that starts with the pronunciation 'delivc'. A search path is dropped by not being promoted. That is, for each time-slice, the Phoneme Stream Analysis process works on Working Paths WP—which contains search paths that were obtained from the subset of promoted search paths from previous time-slice. As new phonemes are appended to existing search paths in WP, only those that are allowed provided that a dictionary forward is valid—signaling that a valid partial pronunciation is under construction—will be promoted. For the following time-slice, only promoted search paths will be used as a basis for WP and WP is dropped. While performing that process, if a complete sequence of phonemes is detected in mPhonemeStream—a complete sequence meaning that it is actually related to the complete pronunciation of a word instead of only a partial pronunciation—the word is added in the words list WL. Bridging also needs to be processed during Phoneme Stream Analysis. Bridging is related to single phonemes that are shared between two words. As an example, if a speaker utters 'that text too', the 't' phoneme between 'that' and 'text' was bridged between both words (there is only one phoneme although it was used to pronounce both words) as well as the 't' phoneme between 'text' and 'too'.

FIG. 4 is tightly related to FIG. 5, FIG. 6, FIG. 7 and FIG. 8 that describe sub-processes used by the Phoneme Stream Analysis process. The Phoneme Stream Analysis process may be implemented in other ways known to those skilled in the art. By way of example and not intending to limit the invention in any manner, FIG. 4 describes the preferred process used in the invention. Any alternative process that uses a phoneme stream and produces a two-dimensional array of recognized words ordered by their starting phoneme index is equivalent.

In Step 402, the process of Phoneme Stream Analysis begins with the phoneme stream $PS_{1-N}$ that resulted from the Phoneme Recognition process in Step 338 of FIG. 3. In Step 404, variables used in the Phoneme Stream Analysis process are cleared. Character Buffer CB is a range in memory that can hold some content to be filled later in the Phoneme Stream Analysis process. Start Time ST and End Time ET are numbers. Phoneme PH is a single character, and must be a letter either uppercase or lowercase. Probability PB, Cluster Index CI and Index in Stream IS are numbers. Working Paths WP and Promoted Paths PP, are TPaths structure as seen in Box 608 of FIG. 6. Bridge List BL is a TBridge structure as seen in Box 610 of FIG. 6. Words List WL is a TRecoLst structure as seen in Box 604 of FIG. 6. Time-Slices Count TSC is a number that holds the total of time-slices in the phoneme stream analyzed. The Phoneme Stream Analysis process also uses the global variable Indexes IND that is a TIndex as seen in Box 808 of FIG. 8. IND is the unique dictionary structure required in order to perform all dictionary related operations.

As previously discussed, the phoneme stream that resulted in Step 338 of FIG. 3 is a finite sequence of N characters $PS_{1-N}$. In Step 406 of the Phoneme Stream Analysis process, the current phoneme stream character $PS_C$ is set to the first character of the phoneme stream $PS_1$. In Step 408, $PS_C$ is evaluated to test if it is a Data separator character. In Step 428, $PS_C$ is evaluated to test if it is a Phoneme level data separator character. In Step 430, $PS_C$ is evaluated to test if it is an Opening time-slice delimiter. In Step 432, $PS_C$ is evaluated to test if it is the Closing time-slice delimiter.

If Step 408, Step 428, Step 430 and Step 432 all fail, then character $PS_C$ is appended to CB. In Step 462, if $PS_C$ is the final character of the phoneme stream $PS_N$, the process is halted at Step 466. If $PS_C$ is not the final character $PS_N$ of the phoneme stream, at Step 462 the current phoneme stream character $PS_C$ is set to the next character in the phoneme stream $PS_{C+1}$ at Step 462 and the process resumes at Step 408.

If $PS_C$ is equal to the Data separator character at Step 408, at Step 410, ST is inspected to determine if it is cleared. If ST is cleared, ST is set to the numerical value of the content of CB in Step 412. If ST is not cleared, at Step 414 ET is inspected to determine if it is cleared. If ET is cleared, ET is set to the numerical value of the content of CB in Step 416.

If ET is not cleared, at Step 418, PH is inspected to determine if it is cleared. Similarly, if $PS_C$ is equal to Phoneme level data separator, at Step 428, at Step 418, PH is inspected to determine if it is cleared. If PH is cleared, PH is set to the value of the content of CB in Step 420. If PH is not cleared, at Step 422, PB is inspected to determine if it is cleared. If PB is cleared, PB is set to the numerical value of the content of CB in Step 424.

If PB is not cleared, at Step 426 CI is set to the numerical value of the content of CB. In Step 434, the sub-process Process Search Paths is called at Step 502 in FIG. 5.

If $PS_C$ is the Closing time-slice delimiter at Step 430, at Step 440 ST and ET are cleared. As seen in Box 608 of FIG. 6, WP and PP are composed of a one-dimensional array of N TSrchPath $SP_{1-N}$. In Step 442, the current TSrchPath $SP_C$ is set to the first TSrchPath in WP $SP_1$. In Step 444, it is determined if the current TSrchPath $SP_C$ is before the last TSrchPath in WP $SP_N$. Step 446 inspects if the member of the structure TSrchPath mLastPromote $LP_C$, as seen in Box 606 of FIG. 6, of the current TSrchPath $SP_C$ has a different value than IS. If $LP_C$ is different than IS the current TSrchPath $SP_C$ is removed from WP. In Step 450, the current TSrchPath $SP_C$ is set to the following TSrchPath $SP_{C+1}$. In Step 452, PP is copied into WP. In Step 545, PP is cleared. In Step 456, TSC is set to IS. In Step 458, IS is increased by one. In Step 436, PH, PB, and CI are cleared.

If $PS_C$ is not equal to Data separator at Step 408, Phoneme level data separator at Step 428, the Opening time-slice delimiter at Step 430 nor the Closing time-slice delimiter at Step 432, $PS_C$ is appended to CB at Step 458. In Step 438, CB is cleared. In Step 462, if $PS_C$ is not $PS_N$, the $PS_C$ is advanced to the next character in the phoneme stream $PS_{C+1}$ at Step 464. The Phoneme Stream Analysis process is then repeated from Step 408 until $PS_C$ is equal to $PS_N$, at which point the Phoneme Stream Analysis process ends at Step 466 with WL that contains the one dimensional array of TReco structures $TR_{1-N}$ of TReco, as seen in Box 602 of FIG. 6, corresponding to the probable words that were recognized from the phoneme stream $PS_{1-N}$.

Figure 5:
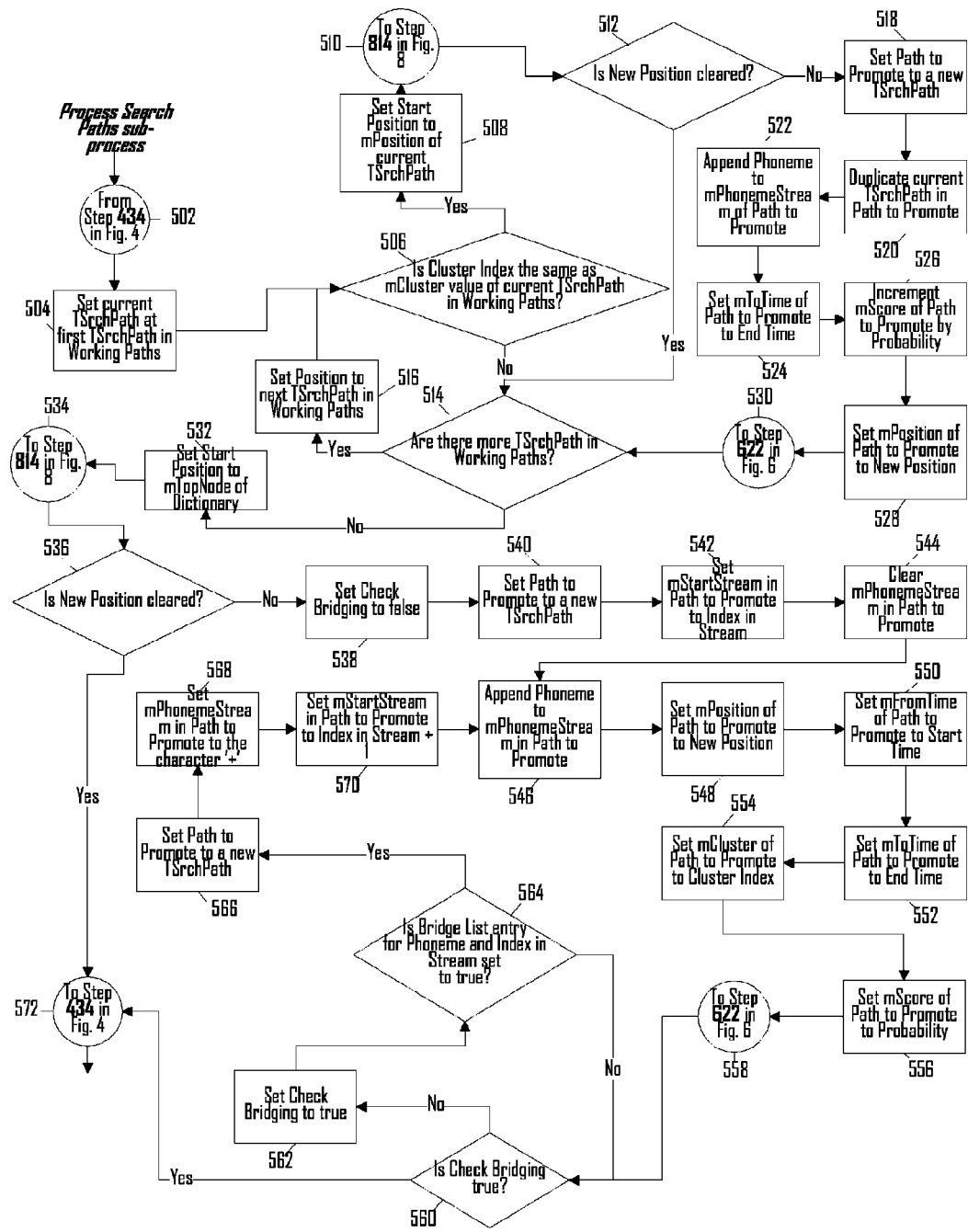
FIG. 5 is a flow diagram of the Process Search Paths sub-process according to one embodiment of the invention.

FIG. 5 depicts a flow scheme for a Phoneme Stream Analysis sub-process named Process Search Paths in the preferred embodiment of the invention. The Process Search Paths sub-process is part of the Phoneme Stream Analysis process explained in FIG. 4 and is invoked from Step 434 in FIG. 4. The Process Search Paths sub-process modifies Working Paths, Promoted Paths, Words List and Bridge List provided Phoneme, Start Time, End Time, Probability, Cluster Index, Index in Stream and Dictionary. The main goal of the Process Search Paths sub-process is to populate Words List with all possible TReco that can be detected from all combinations of phonemes in the phoneme stream—passed one phoneme at a time—until all phonemes in the phoneme stream are processed. The Process Search Paths sub-process is called for each phoneme in a time-slice and that phoneme is appended to mPhonemeStream of all existing search paths, and only search paths where mPhonemeStream result in a partial or complete pronunciation in the dictionary are copied in Promoted Paths PP.

In Box 502, a Process Search Paths sub-process is called from Step 434 in FIG. 4.

Each TSrchPath structure in WP and PP contains a partially formed valid pronunciation in mPhonemeStream. By partially formed valid pronunciation, it is meant that mPhonemeStream in each TSrchPath contains the beginning of pronunciation related to a word in the dictionary IND, but do not hold yet the full pronunciation required in order to add a word in WL. The fact that TSrchPath structures reside in WP instead of PP means that they are part of the working set used in order to extract the ones that can be promoted—in which case the TSrchPath in WP that can be promoted is duplicated in PP. The TSrchPath structures in PP are the ones that were promoted for the current time-slice IS. Once a phoneme stream time-slice, delimited by the Closing time-slice delimiter in the phoneme stream, has been completely analyzed for all possible phonemes, all TSrchPath from PP are copied to WP (as seen in Step 452 of FIG. 4), and the Promoted Paths of the current time-slice becomes the Working Paths of the following time-slice.

In Step 504, the current TSrchPath $SP_C$ is set to the first TSrchPath $SP_1$ in WP. In Step 506, mCluster value in $SP_C$ is inspected to determine if it is the same value as CI. If the values are not the same in Step 506, Step 514 determines if $SP_C$ is prior to $SP_N$ in WP. If $SP_C$ is prior to $SP_N$ in Step 514, Step 516 sets $SP_C$ to the next TSrchPath $SP_{C+1}$.

Figures 1, 8:
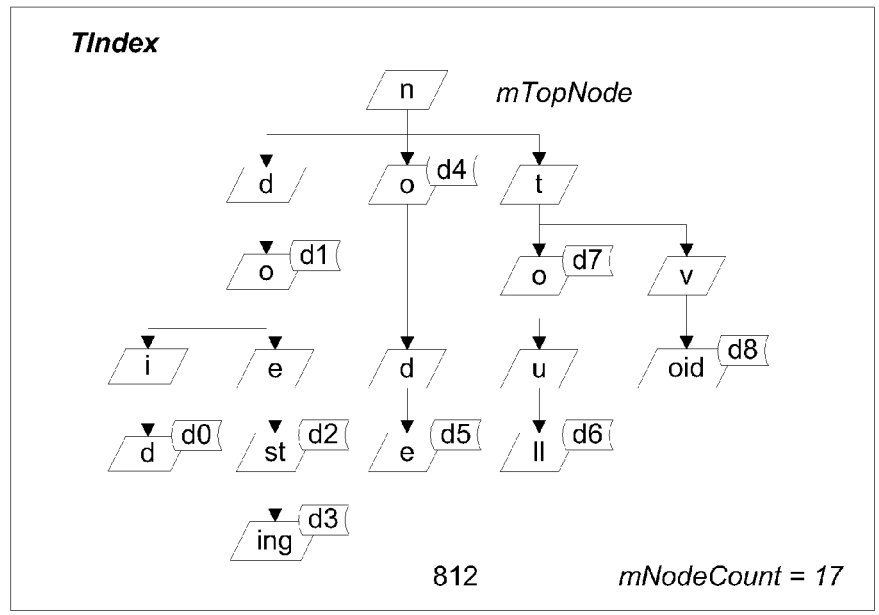
FIG. 8 is a schematic of the Dictionary structures and a flow diagram of the Dictionary Forward sub-process according to one embodiment of the invention.
Figures 2, 8:
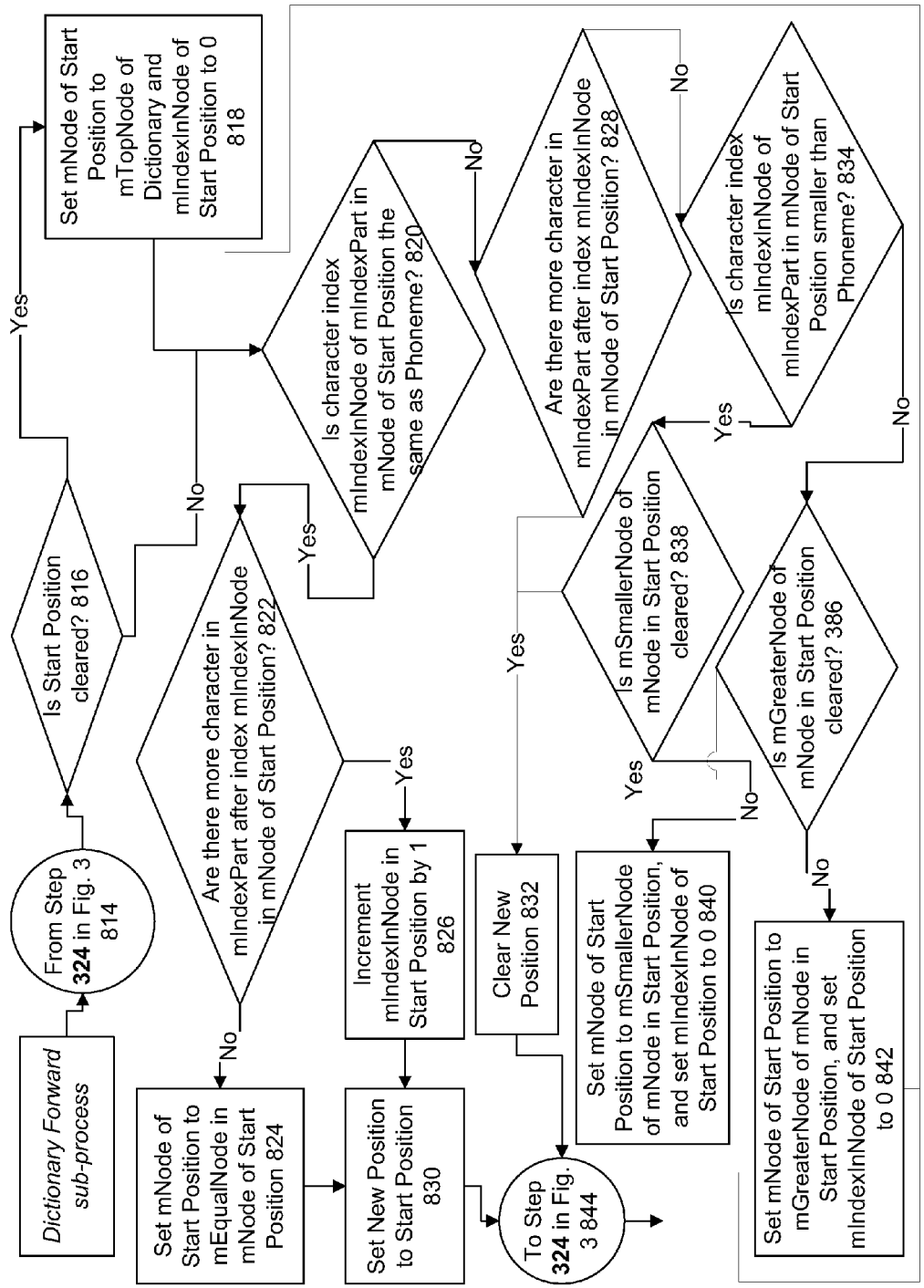

If mCluster in $SP_C$ is the same value as CI in Step 506, Step 508 sets Start Position STP to mPosition in $SP_C$ and the Dictionary Forward sub-process at Step 814 of FIG. 8 is called in Step 510. Following completion of the Dictionary Forward sub-process, New Position NP is inspected to determine if it is cleared in Step 510. If NP was clear at Step 510, Step 512 inspects WP to determine if there is any TSrchPath after the current TSrchPath. If there is any TSrchPath after the current TSrchPath, Step 514 makes the following TSrchPath from the current TSrchPath the current TSrchPath. Step 512 is re-invoked until $SP_C$ is $SP_N$ in WP.

If NP was not cleared at Step 510, Step 516 defines a Path to Promote PtP TSrchPath variable and sets it to a new cleared TSrchPath. In Step 518, the content of $SP_C$ is duplicated into PtP. Step 520 appends PH to mPhonemeStream in PtP. In Step 522, mToTime in PtP is set to ET. Step 524 increments the value of mScore in PtP by PB. In Step 526, mPosition in PtP is set to NP returned by the call of the sub-process Dictionary Forward in Step 510. Step 530 calls the sub-process Promote Path at Step 622 of FIG. 6. Step 512 is then reprocessed until $SP_C$ is $SP_N$ in WP.

Once Step 512 determines that $SP_C$ is $SP_N$ in WP, Step 532 sets STP to mTopNode in IND and the Dictionary Forward sub-process at Step 814 of FIG. 8 is called in Step 534.

In Step 536, NP set from the sub-process invoked at Step 532 is inspected to determine if it is clear. If NP is clear at Step 536, Step 572 resumes the process following Step 434 in FIG. 4.

If NP is not clear, a new defined logical variable Check Bridging CB is set to false at Step 538. In Step 540, PtP is set to a new cleared TSrchPath. Step 542 sets mStartStream in PtP to IS. In Step 544, mPhonemeStream in PtP is cleared.

In Step 546, PH is appended at the end of mPhonemeStream in PtP. Step 548 sets mPosition in PtP to NP set by the Dictionary Forward sub-process in Step 534. Step 550 sets mFromTime in PtP to ST. In Step 552, mToTime in PtP is set to ET. Step 554 sets mCluster in PtP to CI. In Step 556, mScore in PtP is set to PB. Step 558 calls the sub-process Promote Path at Step 622 in FIG. 6.

In Step 560, the value of Check Bridging CB is inspected. If CB is false, it is set to true at Step 562. Step 564 inspects the two-dimensional array of logical BL at the entry that corresponds to the phoneme index in stream at IS and the phoneme value PH. If that value is false, there is no bridging for that case and the process resumes following Step 434 in FIG. 4.

If the value at Step 564 is true, then there is a bridging case to cover in the sub-process. In Step 566, PtP is set to a new cleared TSrchPath structure. In Step 568, mPhonemeStream in PtP is set to the character '+'. Step 570 sets mStartStream in PtP to IS incremented by one. The sub-process then goes on and reprocesses Steps 546 to 560 as it did earlier. Step 560 will then confirm that CB is true and the process will resume following Step 434 in FIG. 4.

Figures 1, 6:
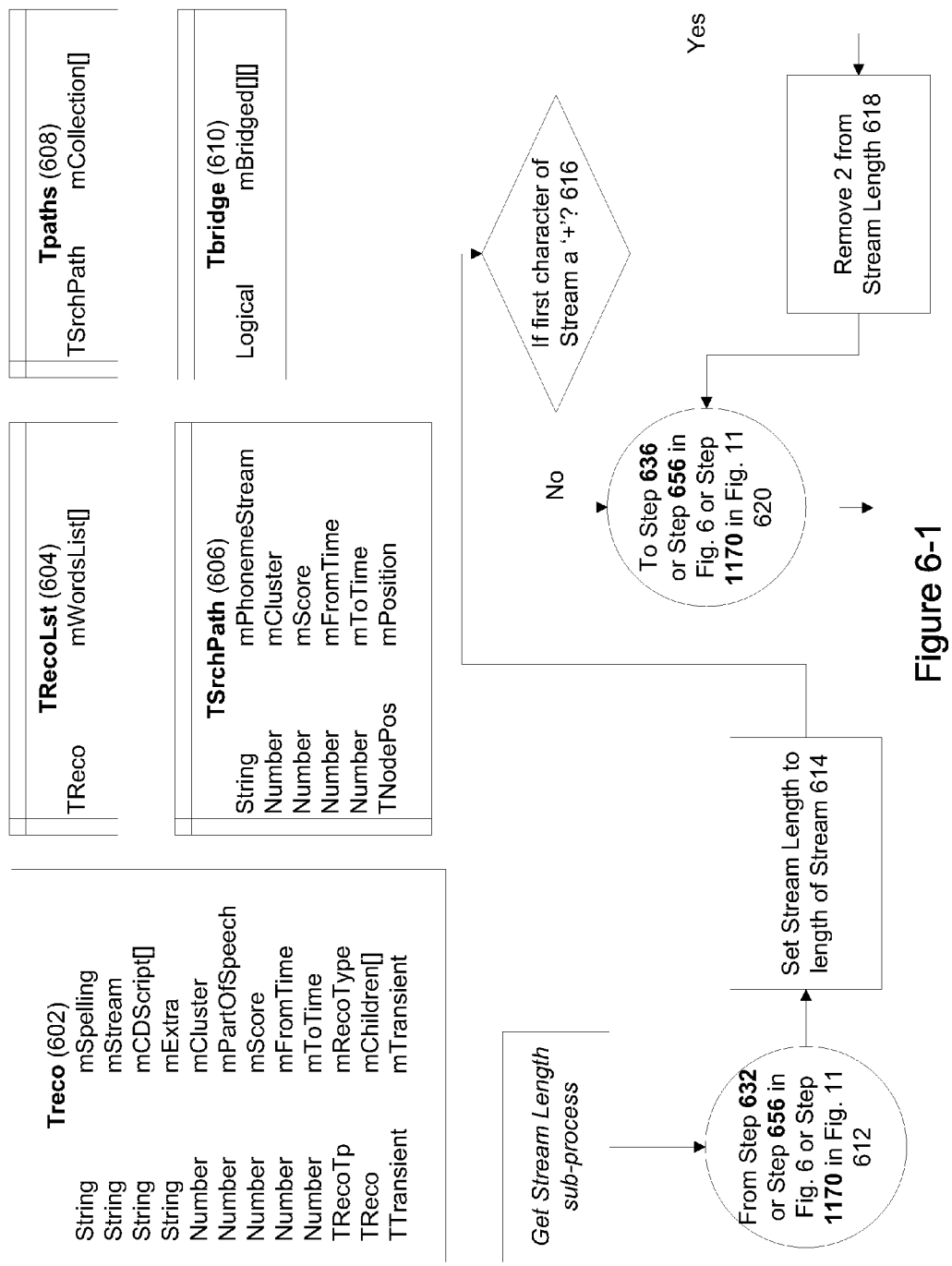
FIG. 6 is a schematic of the Phoneme Stream Analysis structures and flow diagrams of the Get Stream Length sub-process and the Promote Path sub-process according to one embodiment of the invention.
Figures 2, 6:
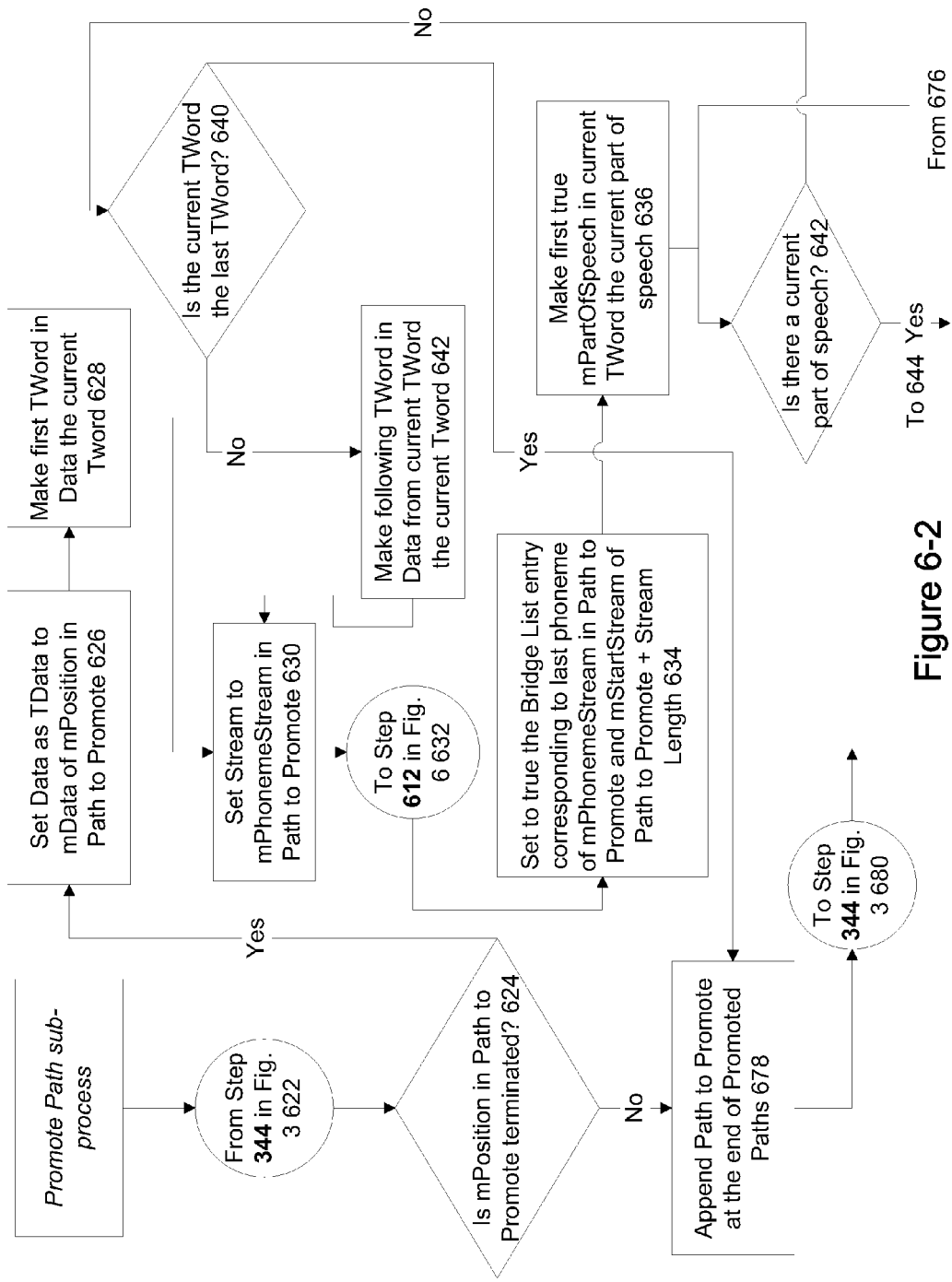
Figures 3, 6:
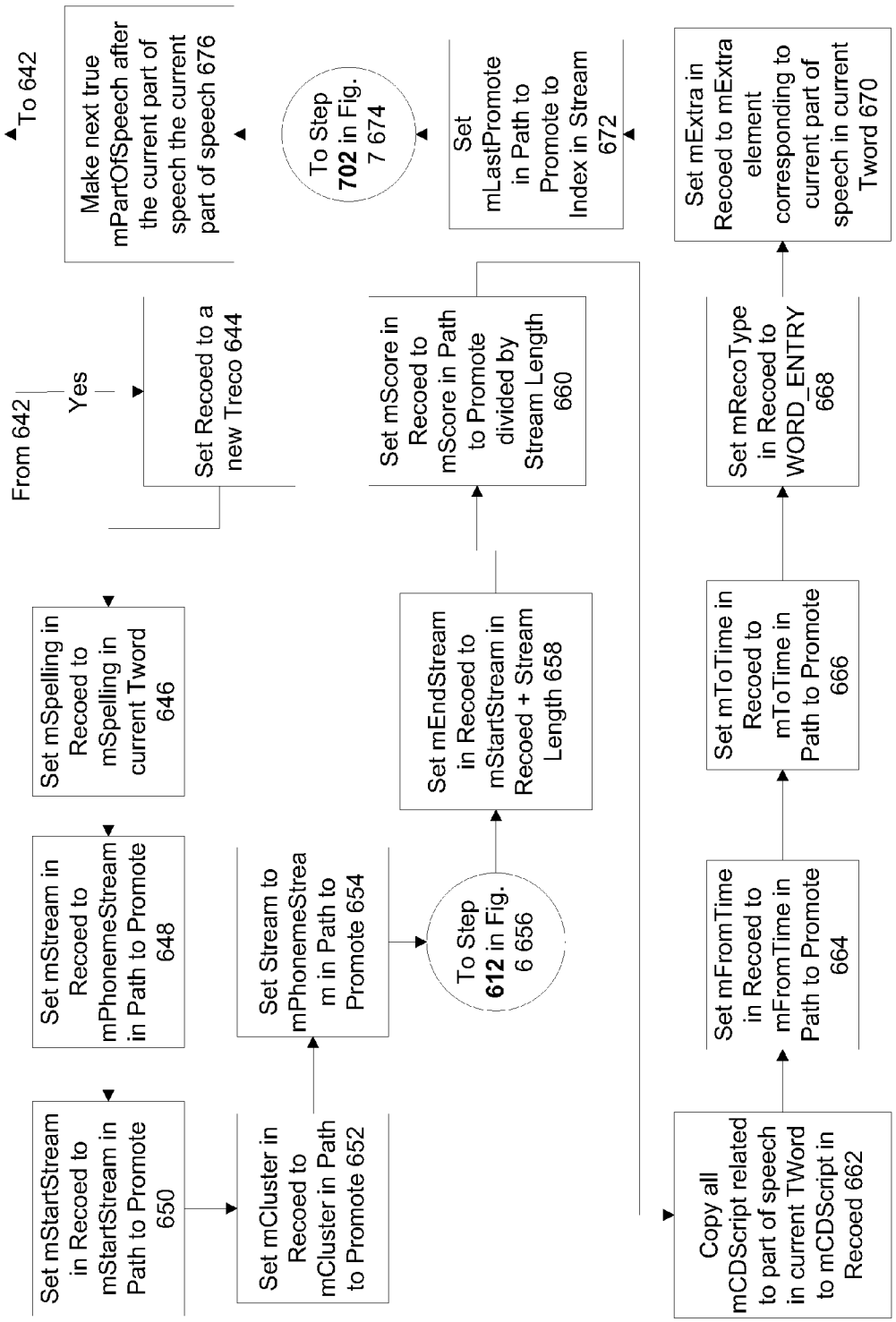

FIG. 6 depicts structure definitions as well as a flow scheme for two sub-processes used in the Phoneme Stream Analysis Process explained in FIG. 4 in the preferred embodiment of the invention. The sub-process Get Stream Length is used in order to determine how many phonemes were used in the provided phoneme stream Stream SM. This is useful since a phoneme stream may have been the result of a bridging, and a single phoneme may be shared between two different recognized words in the words list. The Get Stream Length sub-process returns a number value in Stream Length SL that represents how many phonemes were used in the given phoneme stream SM. The Promote Path sub-process is used in order to populate Words List with all TReco obtained from the search paths. While doing so, it uses Bridge List in order to keep track of all phonemes and their positions which could affect the bridging of words.

In Box 602, a predetermined and programmed into the system TReco structure is defined as a mSpelling value as a string that holds the spelling of the word, a mStream value that contains the phoneme stream uttered to produce the word as a string, a mCDScript value as a one dimensional array of string that holds Predicate Builder scripts later required for conceptual analysis, a mCluster value as a number that holds the cluster index that recognized the word, a mStartStream value as a number that holds the phoneme index where the word was started to be spoken in the utterance, a mEndStream value as a number that holds the phoneme index where the word was done being spoken in the utterance, a mPartOfSpeech value as a number holds the number value of the part of speech associated with the TReco, a mScore value as a number holds the calculated score for the recognized word, a mFromTime value as a number holds the starting time of the spoken word in the utterance, a mToTime value as a number holds the ending time of the spoken word in the utterance, a mRecoType value as a TRecoTp having two possible values (WORD_ENTRY or SYNTAX_ENTRY), the one-dimensional TReco array mChildren holds the references to all children of the current TReco structure, and the TTransient structure mTransient which is explained in FIG. 23.

In Box 604, a TRecoLst structure is defined. A TRecoLst is composed of a mWordsList value as a one-dimensional array of TReco that contains all candidate words built from every possible permutation of phonemes from the phoneme stream related to the utterance.

In Box 606, a TSrchPath structure is defined. A TSrchPath is composed of a mPhonemeStream value as a string which contains the phoneme stream successfully processed, a mCluster value as a number that holds the cluster index used to build the search path, a mScore value as a number that accumulates the score for each recognized phoneme in the search path, a mStartStream value as a number that holds the phoneme index where the search path has began within the utterance, a mFromTime value as number that holds the starting time within the spoken utterance, a mToTime value as number that holds the ending time within the spoken utterance, a mPosition value as a TNodePos, as described in Box 810 of FIG. 8, that holds the current position within the dictionary, and a mLastPromote as a number that holds the phoneme index related to the last promotion of the path.

In Box 608, a TPaths structure is defined. A TPaths is composed of a mCollection value as a one-dimensional array of TSrchPath.

In Box 610, a TBridge structure is defined. A TBridge structure is composed of a mBridged value as a two dimensional array of logical values. One dimension corresponds to the phoneme indexes in the utterance. The second dimension of the array corresponds to each probable spoken phoneme. This structure is used in order to hold the ending phoneme flag for each possible ending phoneme index. If the word 'to' (pronunciation 'tu') was spoken from phoneme index 5, the entry TBridge [6][(Number)'u'] would be set to true identifying that a word ended at phoneme 6 (5+1) with the phoneme 'u' was recognized.

Figures 1, 11:
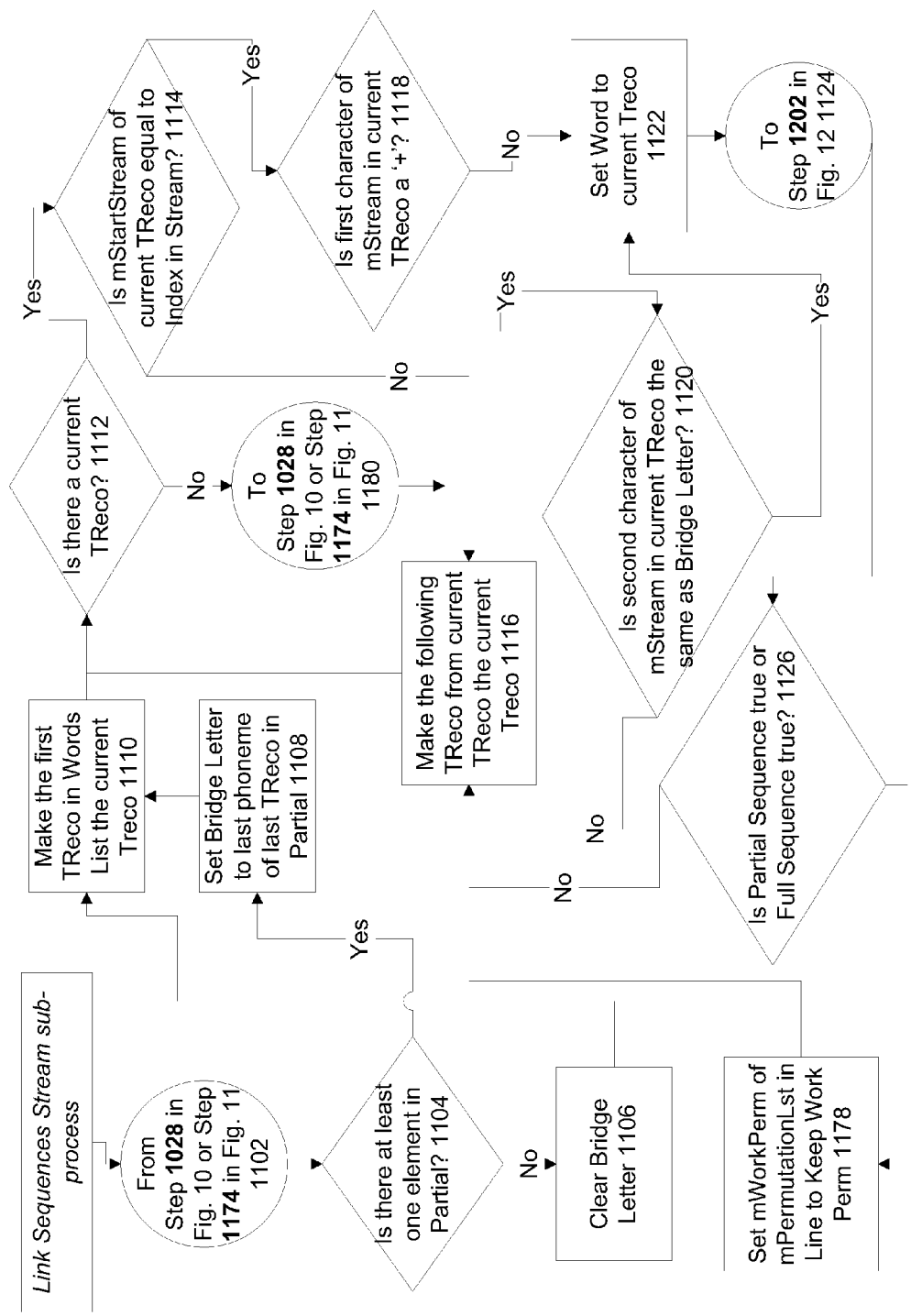
FIG. 11 is a flow diagram of the Link Sequences Stream sub-process according to one embodiment of the invention.
Figures 2, 11:
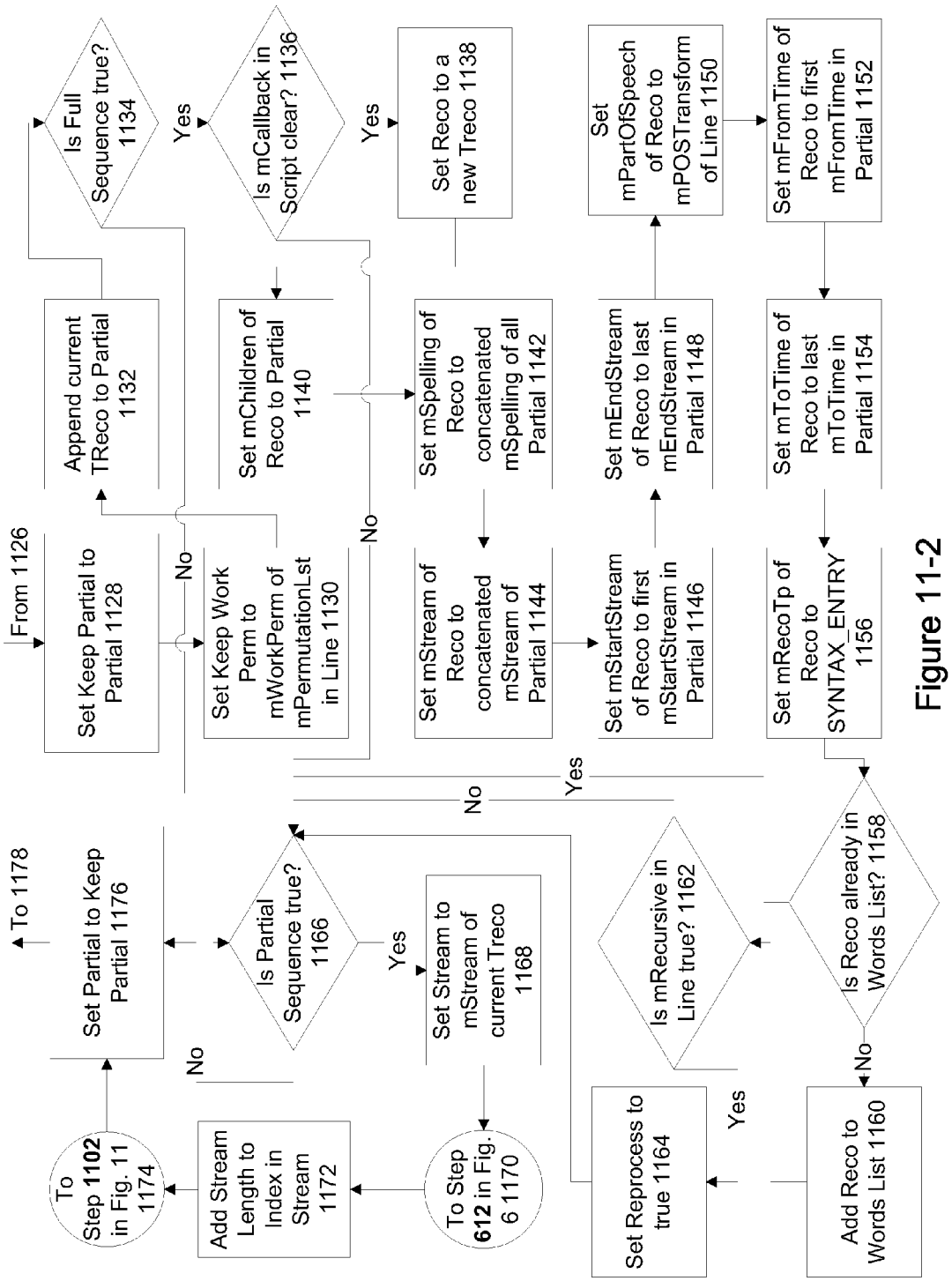

In Box 612, a Get Stream Length sub-process is called from Step 636 or Step 656 in FIG. 6 or Step 1170 in FIG. 11. The Get Stream Length sub-process associates a stream length to a stream while taking into account the fact that pronunciation is built through bridging. As an example "that text too", the TReco holding "text" will have the associated pronunciation "+text" since the 't' phoneme was bridged with the final 't' of "that". In which case, Get Stream Length sub-process will have returned 3. Step 614 sets SL to the length of SM by determining how many characters are used in the phoneme stream SM. In Step 616, the first character of SM is inspected to determine if it is a '+' character. If the first character of SM is a '+' character, SL is subtracted 2 at Step 618. The Get Stream Length sub-process resumes following Step 636 or Step 656 of FIG. 6 or Step 1170 of FIG. 11, depending on which step called the sub-process, at Step 620.

In Box 622, the Promote Path sub-process is called from Step 530 or Step 558 of FIG. 5.

In Step 624, mPosition in PtP is inspected to identify if it represents a terminated TNode. To be terminated means to have some mData content associated with the mNode of mPosition. If it is not terminated, the sub-process appends PtP to the end of PP at Step 678 and then resumes following Step 530 or Step 558, depending on which step called the sub-process, of FIG. 5 at Step 680. If mPosition in PtP is terminated, the content of mData from mNode of mPosition in PtP is copied to a new variable Data Dt as TData at Step 626. A TData structure, as described in Box 804 of FIG. 8, holds N TWord $TW_{1-N}$. In Step 628, the first TWord $TW_1$ in Dt is set as the Current TWord $TW_C$.

In Step 630 the variable Stream SM is set to mPhonemeStream in PtP and calls the sub-process named Get Stream Length at Step 612 of FIG. 6 in Step 632. The Get Stream Length sub-process at Step 612 of FIG. 6 sets the variable SL as a number with the result. In Step 634, the BL entry associated with the phoneme index mStartStream in PtP plus SL and the value of the last phoneme in mPhonemeStream in PtP is set to true. That results in identifying in BL that a word was recognized with the specified ending phoneme at a given phoneme index within the utterance. A TWord structure may be associated with multiple parts of speech through the mPartOfSpeech logical array. This association is done when a Dictionary IND is loaded into the system prior to the beginning of the process. The association of a spelling with pronunciation and parts of speech is predetermined and static through the use of the invention. In Step 636, the first mPartOfSpeech in TWC entry in the array that is set to true is determined to be the current part of speech $POS_C$. In Step 638, the sub-process determines if there is a $POS_C$. If there is no $POS_C$, meaning that all parts of speech were processed, the process moves at Step 640. The sub-process then repeats Step 642 until $TW_C$ reached $TW_N$. In Step 640, the sub-process determines if $TW_C$ is $TW_N$. Step 642 sets $TW_C$ to $TW_{C+1}$ if required.

If there is a $POS_C$ to process at Step 638, then a new TReco structure is created and put in the variable Recoed RC at Step 644. In Step 646, mSpelling in RC is set to mSpelling in $TW_C$. In Step 648, mStream in RC is set to mPhonemeStream in PtP.

Figure 7:
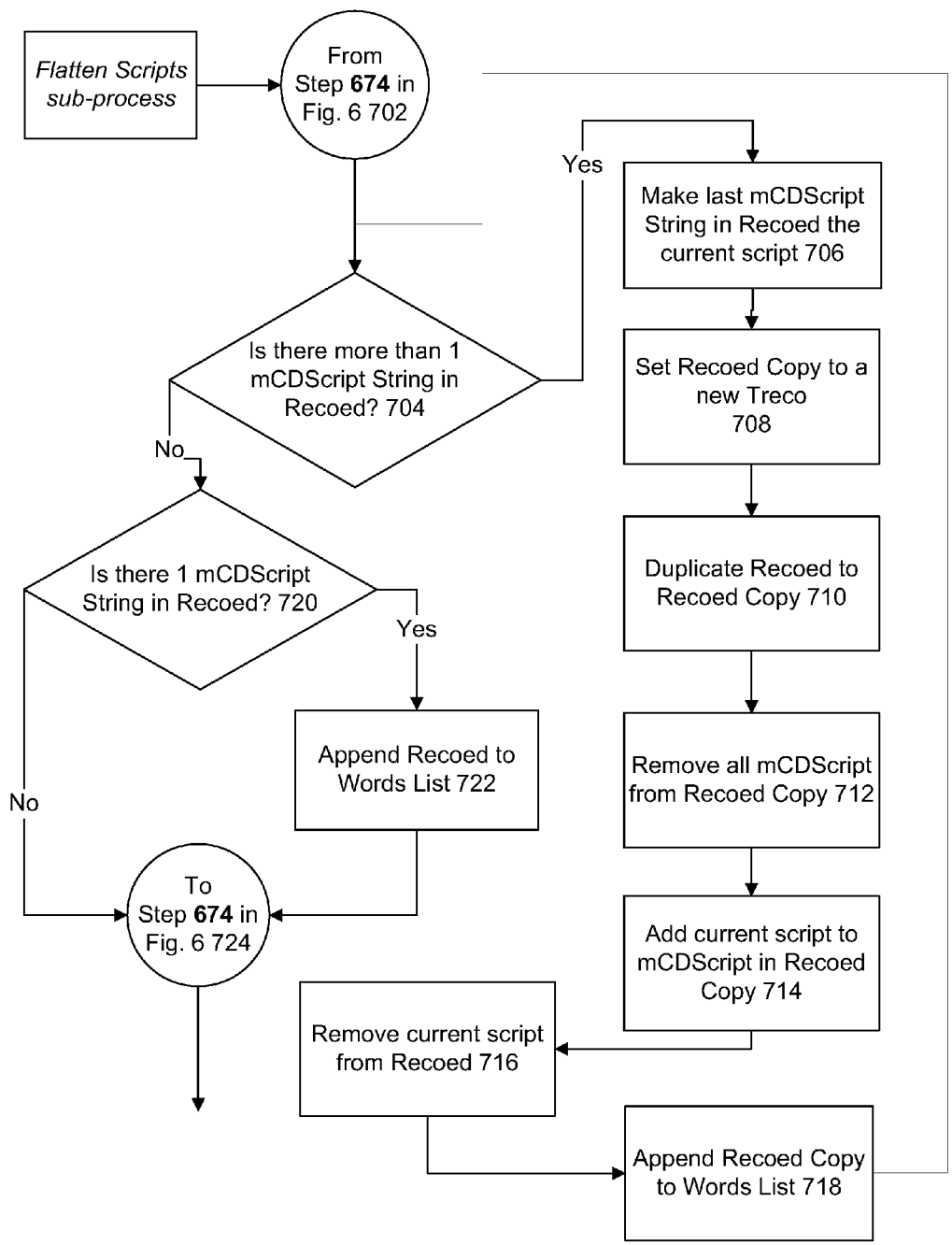
FIG. 7 is a flow diagram of the Flatten Scripts sub-process according to one embodiment of the invention.

In Step 650, mStartStream in RC is set to mStartStream in PtP. In Step 652, mCluster in RC is set to mCluster in PtP. Step 654 sets SM to mPhonemeStream in PtP. In Step 656, the sub-process Get Stream Length at Step 612 of FIG. 6 is called. The sub-process Get Stream Length at Step 612 of FIG. 6 sets the variable SL as a number on output. In Step 658, mEndStream in RC is set to mStartStream in RC plus SL. In Step 660, mScore in RC is set to mScore in PtP divided by SL. In Step 662, all mCDScript related to current part of Speech from TW$_C$ are copied to mCDScript array in RC. Auto-script Predicate Builder scripts associated with the current part of speech, as explained in FIG. 17, would also get copied to an element of mCDScript array in RC. In Step 664, mFromTime in RC is set to mFromTime in PtP. In Step 666, mToTime in RC is set to mToTime in PtP. In Step 668, mRecoType in RC is set to WORD_ENTRY. In Step 670, mExtra in Recoed is set to the mExtra element, if any, corresponding to POS$_C$ in TW$_C$. In Step 672, mLastPromote in PtP is set to Index in Stream IS. In Step 674, the Flatten Scripts sub-process at Step 702 in FIG. 7 is called. In Step 676, the next part of speech that is set to true POS$_{C+1}$ following the current part of speech POS$_C$ is set to become the current part of speech POS$_C$. Step 638 is then re-invoked until all parts of speech in TW$_C$ are processed. The process returns to Step 530 or Step 558 of FIG. 5, depending on which step called the sub-process.

FIG. 7 depicts a flow scheme for the Flatten Scripts sub-process in the preferred embodiment of the invention. Every TReco structure may be associated with multiple Predicate Builder scripts through the one-dimensional array of string mCDScript. This is not practical for the algorithm associated with the conceptual analysis process since it would mean applying the algorithm on multiple possible permutations for each TReco structure, consequently complicating logics significantly. Instead of doing so, any TReco structure containing multiple string in its mCDScript is duplicated as many times as it has strings, and is associated only one string in mCDScript. That will mean that a TReco structure only has a single string in mCDScript instead of a complete one-dimensional array of string. Consequently, there shall be no need for permutations of Predicate Builder scripts stored in mCDScript in the Conceptual Analysis process later described.

In Step 702, the Flatten Scripts sub-process is called from Step 674 in FIG. 6. Step 704 inspects mCDScript in RC to determine if there is more than one string contained in it. Step 706 sets the current script S$_C$ to the last string in mCDScript of RC. Step 708 creates a new TReco variable Recoed Copy RCP. Step 710 copies the content of RC in RCP. Step 712 removes all strings contained in mCDScript from RCP. Step 714 adds S$_C$ to mCDScript in RCP. Step 716 removes S$_C$ from mCDScript in RC. Step 718 adds the TReco structure RCP to WL.

If Step 704 determines that there is not more than 1 mCDScript string contained in it, Step 720 inspects mCDScript to determine if the is exactly 1 string in it. If yes, in Step 722, RC is added to WL. If no, the sub-process proceeds to Step 724. Step 724 resumes the process following Step 674 in FIG. 6.

FIG. 8 depicts a flow scheme for a Dictionary Forward sub-process as well as structure definitions related to the dictionary in the preferred embodiment of the invention. The Dictionary Forward sub-process is an algorithm to perform an index search provided the phoneme stream primary index and resulting with a TNodePos structure which identifies the position within a node in the index tree. The primary index is defined as the unique entrant required in the organized elements in memory or stored memory, called the dictionary, in order to retrieve data associated with it. For this invention, the primary index are phonemes that comprise the phoneme stream that is a pronunciation for a given word.

The invention often refers to a unique dictionary IND that stores all words W$_{1-N}$ and corresponding pronunciations PSI$_{1-N}$ which may be recognized from speech. In order to extract a word W$_i$ from the dictionary, a phoneme stream corresponding to the pronunciation of that word PSI$_i$ is required. Each Word W$_i$ comprises at least one pronunciation PSI$_i$, which itself comprises N phonemes Ph$_{1-N}$. In order to find the node where a word W$_i$ resides, the Dictionary Forward sub-process needs to be invoked for each phoneme Ph$_i$ that comprises the phoneme stream PSI$_i$ while setting Start Position STP as the result of the previous invocation of the Dictionary Forward sub-process, i.e. the result for the previous phoneme Ph$_{i-1}$, or a cleared STP for the first invocation of a new TSrchPath. IND also stores other related data for each word W$_i$ and pronunciation PSI$_i$, as seen in Box 802, 804 and 806, such as, for example, parts of speech POS$_{i,1-N}$ associated with a word W$_i$, and all Predicate Builder scripts CD$_{i,1-N}$ associated with a word W$_i$ and part of speech POS$_{i,j}$.

The preferred method for extracting data related to a given pronunciation PSI$_i$ of a Word W$_i$ in the dictionary IND is described in FIG. 8, but, the indexing method may be one of many known today to those skilled in the art. By way of example and not intending to limit the invention in any manner, the indexing method used may also include sequential searching, searching an ordered table, binary tree searching, balanced tree searching, multi-way tree searching, digital searching, hashing table searching or any other adequate indexing and data retrieval process now known or later developed by those skilled in the art.

In Box 802, a predetermined and programmed into the system TWord structure is defined as a string mSpelling containing the spelling of the word W$_i$, a one dimension array of logical values mPartOfSpeech, a two-dimensional array of string mCDScript, and a one-dimensional array of string mExtra. mExtra is synchronized with the mPartOfSpeech array. mExtra is generally empty, but will contain extra information for targeted parts of speech. As an example, the word with the spelling "one" will contain the extra data "1" associated with the part of speech CARDINAL_NUMBER to identify the numerical equivalence.

The invention requires the definition of parts of speech to perform. Parts of speech POS are syntactic related nature of words that are used in the invention. Each part of speech is associated a unique and constant value. Predefined parts of speech and their respective values for the English implementation of the invention can be designated as follow:

UNKNOWN=0, NOUN=1, PLURAL=2, PROPER_NOUN=3, NOUN_PHRASE=4, VERB_USU_PARTICIPLE=5, VERB_TRANSITIVE=6, VERB_INTRANSITIVE=7, VERB=8, ADJECTIVE=9, ADVERB=10, CONJUNCTION=11, PREPOSITION=12, INTERJECTION=13, PRONOUN=14, WH_PRONOUN=15, DEFINITE_ARTICLE=16, INDEFINITE_ARTICLE=17, ORDINAL_NUMBER=18, CARDINAL_NUMBER=19, DATE=20, TIME=21, QUANTIFIER=22, ADJECTIVE_PHRASE=23, PREPOSITION_PHRASE=24, VERB_PHRASE=25, WH_NP=26, AUX=27, GERUNDIVE_VERB=28, GERUNDIVE_PHRASE=29, REL_CLAUSE=30 and SENTENCE=31.

The invention also allows for dynamic definition of new parts of speech. Through transform scripts, as explained in FIGS. 15 and 16, and shown in FIG. 9, a new part of speech can be included in any transform script. As shown in FIG. 9D, new parts of speech like AIRLINE, FLIGHT, FLIGHTS, GATE or CITY are defined by introducing them in any relevant transform script line after the Affectation identifier ('->'). Each logical value within mPartOfSpeech array identifies if any given word $W_i$ is associated a specific part of speech $POS_i$ corresponding to the value at the index (true=associated, false=not associated) of the numerical value of $POS_i$. For the word 'James', mPartOfSpeech[3] is true (identifying that word is associated the POS PROPER_NOUN) and every other entry would typically be false.

In $CD_i$, Predicate Builder scripts are stored for each associated part of speech $POS_{i,j}$. $CD_i$ is a two-dimensional array since any given word may hold multiple Predicate Builder scripts for any associated part of speech $POS_{i,j}$ (this relates to the reality that any given word may have multiple meanings). For the TWord $W_i$ holding the spelling 'James', mCDScript [3][1] will hold a Predicate Builder script that identifies a person named 'James' and every other entry of mCDScript would typically not hold any content.

Any given character can be associated a unique numerical value so that an ordered sequence of characters enables the system to compare characters on their numerical equivalence. By way of example and not intending to limit the invention in any manner, the ASCII index value, Unicode index related value, multi-byte number related value, or any other way of associating a numerical value to a character, well known to those skilled in the art, can be used to associate a predetermined unique numerical value to any character.

In Box 804, a predetermined and programmed into the system TData structure is defined as a one-dimensional array of TWord structures mWords. Each TData structure is kept in a TNode $ND_i$ and is what holds the information of the dictionary IND associated with the node $ND_i$ when a Dictionary Forward sub-process potentially sets a non-cleared TNodePos in New Position NP.

In Box 806, a predetermined and programmed into the system TNode structure is defined as a string mIndexPart, a TNode mParentNode, mEqualNode, mSmallerNode and mGreaterNode and the TData mData. A cleared mData, i.e. a mData that does not contain any TWord, identifies a non-terminated TNode. Any TNode with a mData that is not cleared, i.e. a mData that contains at least one TWord, identifies a terminated TNode. A terminated TNode $ND_i$ can also be linked to other terminated and/or non-terminated TNode $ND_j$. As shown in Box 812, each TNode structure residing in memory or stored memory needs to be related to each other in such a way that the organized TNode tree, called the TIndex, can be used to extract any $W_i$ provided a pronunciation $PSI_i$.

In Box 808, a predetermined and programmed into the system TIndex structure is defined as a TNode mTopNode and a number mNodeCount to hold the total number of TNode in the given TIndex. By way of example and not intending to limit the invention in any manner, in the context of this invention only one TIndex, called the dictionary IND, is required, although multiple TIndex may be used so long as data related to any given word $W_i$ and its related pronunciation $PSI_i$ can be extracted through an indexing system with multiple TIndex or equivalent indexing method.

In Box 810, a predetermined and programmed into the system TNodePos structure is defined as a TNode mNode and a number mIndexInNode. The TNodePos structure is used in order to keep track of any position within the TIndex tree structure. By keeping the TNode mNode and mIndexInNode to refer to positions within the TNode $ND_i$ that may hold mIndexPart that are more than a single character, as seen in Box 812, it becomes possible to refer to any position within the TIndex tree structure without further requirement.

In Box 812, a TIndex tree structure example is shown with some content to help understanding. As primary index in Box 812 some spellings are used instead of pronunciations (spellings 'no', 'did', 'do', 'nest', 'nesting', 'to', 'node', 'null' and 'void'). Each terminated TNode corresponding to associated spelling contains the TData d0 . . . d8. The process to extract data from such TIndex tree structure is explained in the Dictionary Forward sub-process, although in practice the primary index used in the invention are phoneme streams instead of spellings.

It is the programming engineer's responsibility to create such indexing structure as the one described in Box 812, or any other equivalent indexing structure, in order for the algorithm described in the Dictionary Forward sub-process to execute as described. Population of such indexing structure, or equivalent structure, is a task that is common to those skilled in the art and does not require further explanation in this application.

In Box 814, the Dictionary Forward sub-process is called from Step 510 or Step 534 in FIG. 5.

In Step 816, STP is inspected to identify if it is cleared. If it is cleared, mNode of STP is set to mTopNode in IND and mIndexInNode in STP is set to 0 at Step 818. In Step 820, the character pointed to by STP—character index mIndexInNode of the string mIndexPart of mNode in STP—is tested to determine if it is the same as PH. If PH is not the same as the character pointed to by STP at Step 820, mNode in STP is inspected at Step 828 to determine if mIndexInNode is equal to the last character index mIndexPart of mNode in STP. If it is not the last character, NP is cleared in Step 832 and the Dictionary Forward sub-process resumes following Step 510 or Step 534, depending on which step called the sub-process, of FIG. 5 at Step 844. If mIndexInNode in STP is the last character mIndexPart of mNode in STP, the process invokes Step 834.

In Step 834, the character pointed to by STP is inspected to identify if it is smaller than PH, i.e. if the ASCII index value of the character pointed to by STP is smaller than the ASCII index value of the character PH as an example. If it is smaller, the process invokes Step 838 where mSmallerNode of mNode in STP is inspected to identify if it is cleared. mSmallerNode of mNode in STP is assumed to be cleared if it does not hold a TNode value. If it is cleared, NP is cleared at Step 832 and the process resumes following Step 510 or Step 534, depending on which step called the sub-process, of FIG. 5 at Step 844. If it is not cleared, that is, mSmallerNode of mNode in STP holds a TNode value, mNode of STP is set to mSmallerNode of mNode in STP and mIndexInNode in STP is set to 0.

The Dictionary Forward sub-process then re-invokes Step 820. In Step 834, if the character pointed to by STP is not smaller than PH, Step 838 is invoked. Character comparison is performed the same way as in Step 834 where a unique numerical value—the ASCII index value as an example—associated with a given character is compared to the corresponding unique numerical value associated with the other character. In Step 836, it is assumed that the character pointed to by STP is greater than PH (since the equal and smaller than tests both failed). Step 836 inspects mGreaterNode of mNode in STP to identify if it is cleared. mGreaterNode is assumed to be clear if it does not hold a TNode value. If it is cleared, NP is cleared in Step 832 and the process resumes following Step 510 or Step 534, depending on which step called the sub-process, of FIG. 5 at Step 844. If it is not cleared, that is, mGreaterNode of mNode in STP holds a TNode value, mNode in STP is set to mGreaterNode of mNode in STP and mIndexInNode in STP is set to 0.

If, in Step 820, the character pointed to by STP is the same as PH, by comparing the ASCII index values as an example, Step 822 is invoked. In Step 822, STP is inspected to identify if it points to the last character of mIndexPart from its mNode. If there are more characters after the character pointed to by STP, mIndexInNode in STP is incremented by 1 at Step 826. If there are no more characters after the character pointed to by STP, mNode in STP is set to mEqualNode of mNode in STP at Step 824. In either case, Step 830 is invoked where NP is set to STP and then the process resumes following Step 510 or Step 534, depending on which step called the sub-process, of FIG. 5 at Step 844.

Once a list of probable words has been determined from the Phoneme Stream Analysis, syntactic rules, or transform scripts, are applied to form a list of syntactically correct sequences of words from those words.

Syntactic Analysis

FIG. 9 describes the content of transform scripts used in the preferred embodiment of the invention. By way of example and not intending to limit the invention in any manner, FIGS. 9A, 9B and 9C describe some transform scripts that can handle the English language, and FIG. 9D describes a transform script that can be used in the English language in order to build an airline response system. The invention does not pretend to limit itself to the English language applied for airline response systems in any way even though this application documents a system that handles utterances for the English language mostly in the context of an airline response system. Also, the syntax used in order to interpret transform scripts is only provided as an example, and there is no intention to limit the invention in any manner.

A programming engineer is free to modify, produce or not use new or existing transform scripts based on the needs of his implementation. His decision should be driven by the requirements related to system's implementation. Transform scripts should be produced by programming engineers that are knowledgeable in the field of linguistics.

The purpose of transform scripts is to describe the rules related to permutation analysis of streams so that sequences of streams—or TReco, since in this application streams refer to TReco structures—that respect such rules can be produced. Phoneme Stream Analysis produced an array of TReco in WL by permuting all recognized phonemes over a predefined threshold. Each of the TReco within WL has an associated mStartStream, which may or may not be different from other TReco. Transform scripts responsibilities are to produce sequences of streams that respect rules stated in it and also respect pronunciation boundaries—i.e. when did they start in the phoneme stream (mStartStream) and where did they end in the phoneme stream (mEndStream). Transform scripts typically reside on file on disk and are loaded in memory in such a way that transform script interpretation is optimized for speed. That means setting some structures in memory at load time so that all elements of information related to permutation analysis are already in place for swift processing at interpretation time. Respecting pronunciation boundaries means that location of where the TReco was recognized in the phoneme stream needs to be consistent between each TReco in a sequence produced. As an example, for the transform script line ["splitting"]["it"], which states that a TReco with mSpelling "splitting" followed by a TReco with mSpelling "it" would be a successful sequence. "splitting" also contains "it" ("Spl_it_ing"). Should no requirement for pronunciation boundaries have been made, the utterance "splitting" would then succeed since both spellings were in WL, "splitting" with a mStartStream of 1 and a mEndStream 7, and "it" with a mStartStream of 4 although only one word was uttered.

By way of example and not intending to limit the invention in any manner, the following syntax of transform scripts was selected in the preferred embodiment of the system in order to extract from each line the required information:

1. Stream delimiters (characters '[' and ']'). To isolate multiple streams from one another and produce sequences of streams based on the transform script line, the Stream delimiters are used. Between the Opening stream delimiter ('[') and the Closing stream delimiter (']') reside some criteria to match for a stream. By way of example, and not intending to limit the invention in any manner, possible criteria to match in provided transform scripts example are parts of speech and spellings.

2. Spelling identifier (sequence of characters between two double quote characters). To match on spelling for a stream, unrestricted spelling can be specified within Spelling identifiers that also needs to be between the Opening and Closing stream delimiter characters.

3. Conditional sequence identifier (opening and closing parenthesis characters). To specify a conditional statement, a single stream or a sequence of streams including their corresponding stream delimiters may be enclosed within the Opening conditional sequence identifier ('(' character) and the Closing conditional sequence identifier (')' character). By way of example, and not intending to limit the invention in any manner, selected syntax in the preferred embodiment of the invention uses a two-way decision syntax for conditional sequence identifiers. A modified syntax and according algorithm could as well implement a N-way decision syntax.

4. Partial spelling match identifier ('_' character). Preceding or following a partial spelling within Spelling identifier characters, the Partial spelling match identifier would identify a 'Start with' or 'Ends with' spelling criteria requirement for the stream.

5. Tag identifier ('<' and '>' characters). Within Stream delimiters, tags may be associated with each stream in a sequence formed. The optional tag name needs to be provided between the Opening tag identifier ('<' character) and the Closing tag identifier ('>' character).

6. Tag delimiter (':' character). After a tag has been identified (using the Opening tag identifier, following by the tag name and then the Closing tag identifier), a Tag delimiter is found on the transform script line.

7. Line name separator (':' character). After the optional line name in a transform script line, the Line name separator is used to separate the line name from the permutation described in the transform script line.

8. Affectation identifier ('->' characters). Automatic transforms (transforms that do not require the approval of a callback sub-process) are specified on a transform script line by following the description of stream sequence criteria to match with an Affectation identifier and a part of speech.

9. Criteria separators ('&' and '|' characters). Between each part of speech and spelling specified between Stream delimiters, Criteria separators are used. Either '&' or '|' can be used as a Criteria separator with equivalent result. Parts of speech and spellings criteria are delimited by Criteria separators. Between parts of speech and spellings, the '|' Criteria separator is typically used—stating that a stream needs to be a specified part of speech or spelling or another one. After all parts of speech specified and before the first spelling, the Criteria separator '&' is typically used—stating that not only parts of speech criteria needs to be respected, but also (and) spelling criteria.

10. Comment identifier ('#'). Anywhere in a transform script line, comments may be added if preceded by the Comment identifier.

Syntax used in transform scripts, and provided as an example, is as follow:

1. Stream criteria to match needs to be between the Opening and closing stream delimiters. Parts of speech to match needs to be stated prior, if necessary, to spelling related matching. As an example, '[VERB & "is"]' identifies any TReco within WL that is a VERB part of speech and that has a mSpelling "is".

2. Every optional stream criteria match needs to be stated between the Opening and Closing conditional sequence identifiers. As an example, ([ADVERB])[ADJECTIVE] identifies a sequence of streams where an optional ADVERB part of speech in mPartOfSpeech of a TReco in WL is followed by a mandatory ADJECTIVE part of speech in mPartOfSpeech of a TReco in WL while respecting pronunciations boundaries between the two TReco structures. Note that a stream sequence of a single TReco with mPartOfSpeech ADJECTIVE is also valid for ([ADVERB])[ADJECTIVE] since the ADVERB part of speech is optional.

3. Spelling match that starts with the Partial spelling match identifier identifies an 'ends with' spelling stream matching criteria. As an example, [VERB & "_ing"] could match the VERB mPartOfSpeech in a TReco where the spelling is "running" since "running" ends with the characters "ing". The invention may as well signal an end with spelling match with the same syntax. As an example, [VERB & "run_"] could match the VERB mPartOfSpeech in a TReco where the spelling is "running" since "running" starts with the characters "run".

4. Transform script lines that do not include the Affectation identifier are to be processed by a call-back sub-process. Call-backs are required for more complex transformation rules in some cases. As an example, the stream sequence 'fifty one' is allowed in order to build an ORDINAL_NUMBER that is 51. That stream sequence is an ORDINAL_NUMBER that follows another ORDINAL_NUMBER. However, the stream sequence 'one fifty' is not a valid one in order to generate an ORDINAL_NUMBER, but it is also a stream sequence of an ORDINAL_NUMBER that follows another ORDINAL_NUMBER. Consequently, for some transform scripts, when sequences are matched, instead of transforming automatically the sequence in a new part of speech, a call-back sub-process is called and it may or may not proceed with the transformation.

Figure 12:
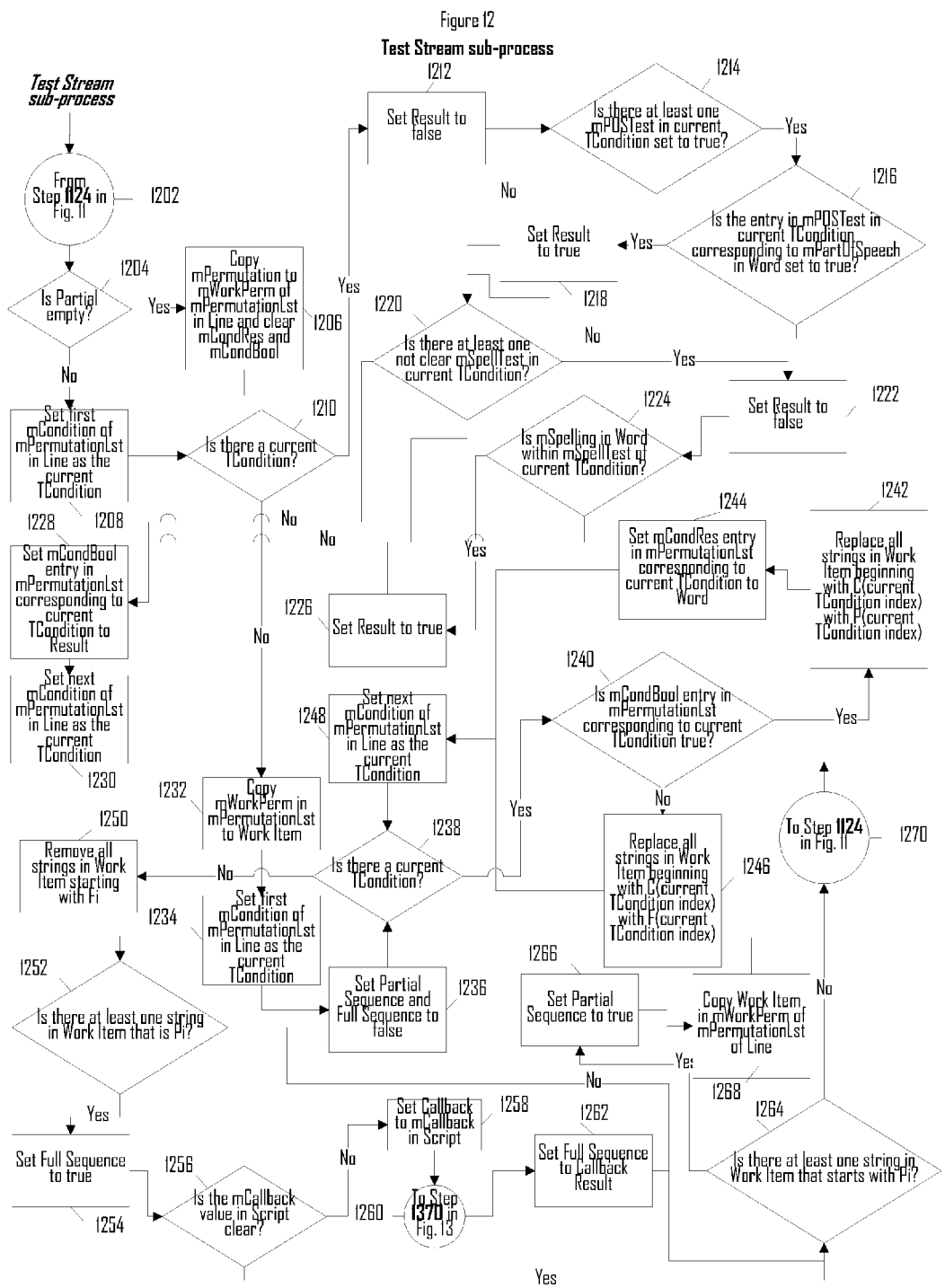
FIG. 12 is a flow diagram of the Test Stream sub-process according to one embodiment of the invention.

5. Tags are between the Opening and Closing tag identifiers. Tags are specified in order to facilitate content extraction within transform script call-back sub-processes (as can be seen in FIGS. 11 and 12).

6. Following the optional Affectation identifier in transform scripts is a part of speech that a new TReco structure enclosing all TReco used to form it (spelling that is cumulative of all TReco used from the transform script) with a mPartOfSpeech that corresponds to the part of speech after the Affectation identifier. As an example, [VERB & "_ing"]-> GERUNDIVE_VERB would create a new TReco structure in WL for all the VERB parts of speech which spelling ends with "ing"-like "running", "falling", etc. Note that the part of speech on the right of the Affectation identifier does not need to be a pre-programmed part of speech. As an example, in FIG. 9D, [NOUN & "gate"]([NOUN & "number"])[<GATE NUMBER>:CARDINAL_NUMBER|ORDINAL_NUMBER]->GATE. The part of speech GATE is not pre-programmed into the system, but is allowed in a transform script line, and will consequently be added to the list of possible parts of speech and be treated equally as the pre-programmed parts of speech. The spoken sequences "gate number twenty two", "gate fifty one" or "gate twenty third" would then generate a new TReco structure in WL that has a mPartOfSpeech GATE. The programming engineer is free to modify, add or delete transform scripts at his convenience depending on the needs that are targeted to be covered. In this case, the GATE part of speech was introduced for the purpose of a hypothetical flight response system and may well not be adequate for other needs, meaning that deletion of the transform script line would be relevant.

FIG. 9A describes an example of transform script content used to perform syntactic transforms for the English language in the preferred embodiment of the invention.

FIG. 9B describes an example of transform script content used to perform numeric transforms for the English language in the preferred embodiment of the invention. Since there is no Affectation identifier, a call-back sub-process needs to be specified for the transform script to be handled properly. The Number Producer Permutation Callback (described in FIG. 14) is used for that purpose. The transform script in FIG. 9B and the Number Producer Permutation Callback handle sequences like "One hundred twenty five", "two hundred twenty third" or "one million and one hundred forty eight thousand and three hundred fifty three" and create a TReco structure with the corresponding number associated to the sequenced stream.

FIG. 9C describes an example of transform script content used to perform time transforms for the English language in the preferred embodiment of the invention. Since there is no Affectation identifier, a call-back sub-process needs to be specified for the transform script to be handled properly. The Time Producer Permutation Callback (described in FIG. 13) is used for that purpose. The transform script in FIG. 9C and the Time Producer Permutation Callback handle sequences like "four thirty pm", "fifteen to one am" or "eight o'clock" and create a TReco structure with the corresponding time associated to the sequenced stream.

FIG. 9D describes an example of transform script content used to build a custom airline response system for the English language in the preferred embodiment of the invention. That transform script interpreted after the transform scripts in FIG. 9B and FIG. 9C but before the transform script in FIG. 9A (as seen in the Syntactic Analysis process in FIG. 10) generates, as one of many things, SENTENCE parts of speech from utterances like "when is flight one hundred and twenty two arriving", "how late is flight one hundred twenty two" or "is American airline flight number six hundred arrived yet".

Figures 1, 10:
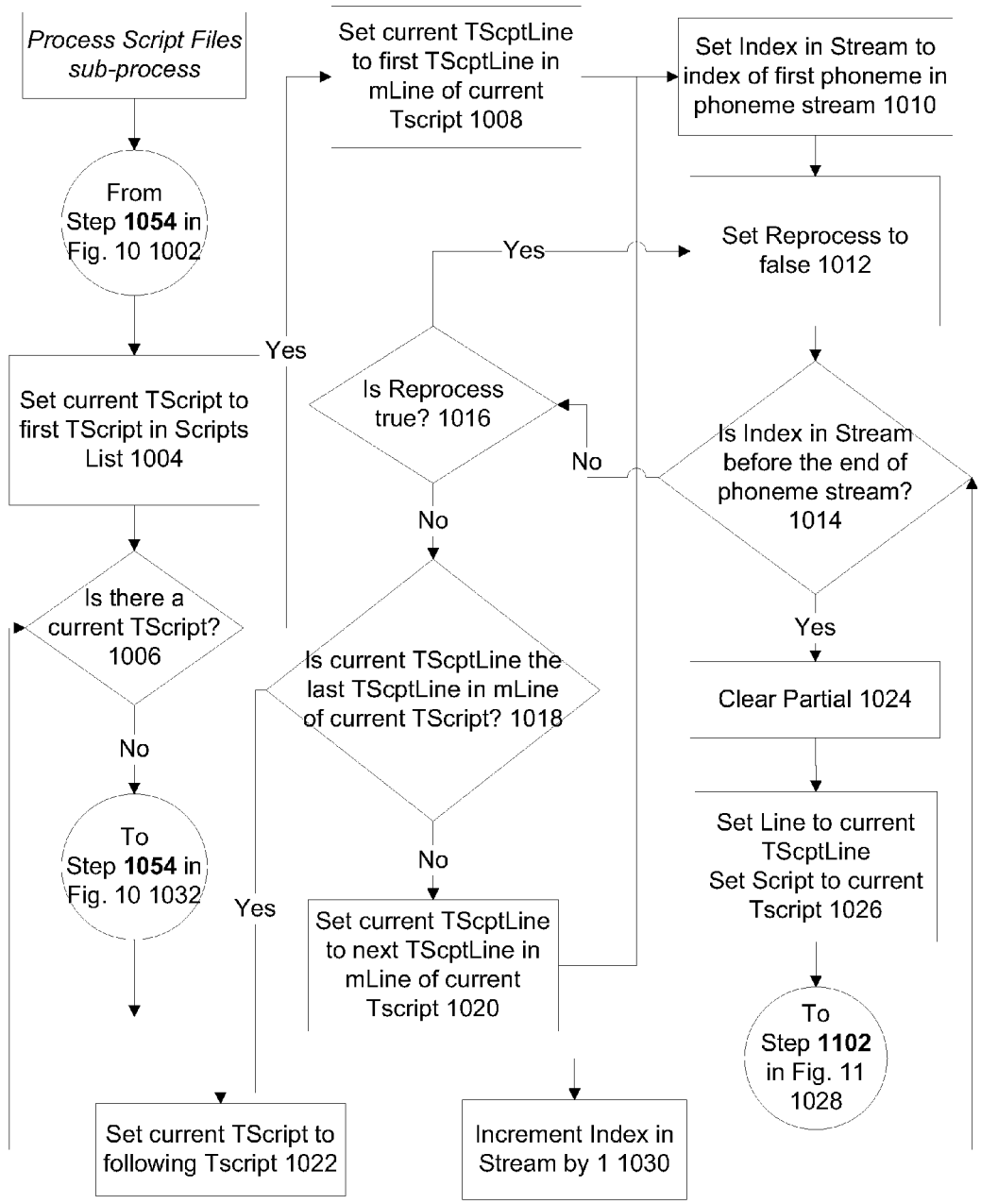
FIG. 10 is a flow diagram of the Process Script Files sub-process and the Syntactic Analysis process according to one embodiment of the invention.
Figures 2, 10:
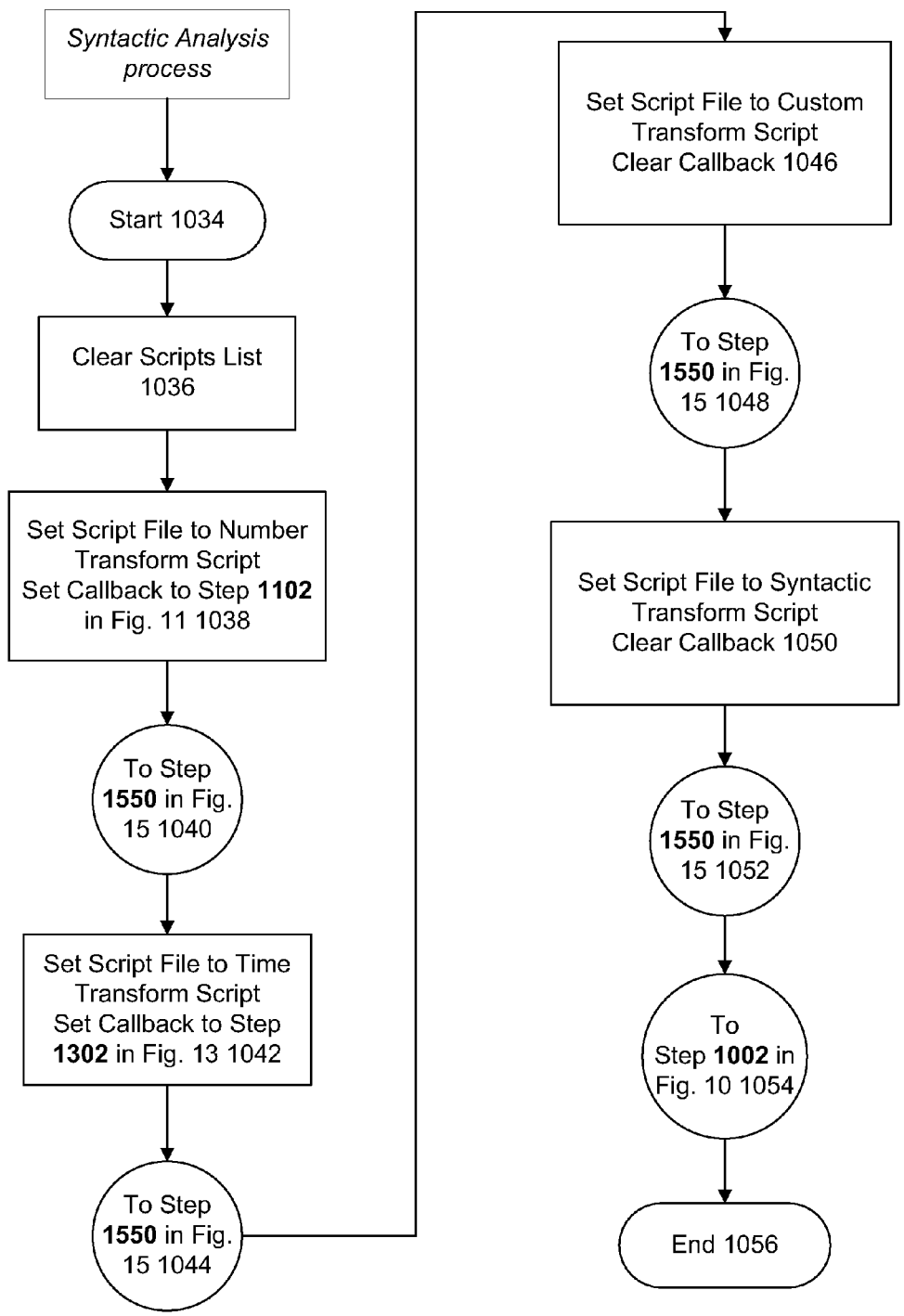

FIG. 10 depicts a flow scheme for the Process Script Files sub-processes as well as the Syntactic Analysis process in the preferred embodiment of the invention. By way of example and not intending to limit the invention in any manner, the Syntactic Analysis process is a simple Bottom-Up parsing process, well known to those skilled in the art (as first suggested by Yngve in 1955 and perfected by Aho and Ullman in 1972), but could as well be implemented as a Top-Down, an Early, a finite-state, a CYK parsing process, well known to those skilled in the art, or any other adequate parsing process now known or later developed which shall result in obtaining comparable outcome although performance may vary depending on the parsing method chosen.

The purpose of the Syntactic Analysis process is to populate the TRecoLst Words List WL variable with TReco structures based on the rules stated in all transform scripts as shown in FIG. 9. The entrant to the Syntactic Analysis process is the TRecoLst variable WL built in the Phoneme Stream Analysis process in FIG. 4, and the output of the Syntactic Analysis process is also the transformed TRecoLst variable WL. The Process Script Files sub-process at Step 1002 in FIG. 10 is used in the Syntactic Analysis process in order to process each loaded script file sequentially.

In Box 1002, the Process Script Files sub-process is called from Step 1054 in FIG. 10.

Scripts List SL has N TScript $S_{1-N}$. In Step 1004, the current TScript $S_C$ in SL is set to $S_1$. Step 1006 determines if $S_C$ is or is prior to $S_N$. SC has N TScptLine $L_{1-N}$. Step 1008 sets the current TScptLine $L_C$ to $L_1$ in $S_C$. Step 1010 sets Index in Stream IS to the index of the first phoneme in the phoneme stream $PS_1$. The phoneme stream PS is the output from the phoneme recognition process as seen in FIG. 2.

In Step 1012, the logical variable Reprocess RP is set to false. RP may be changed to true by any sub-process, in which case it would identify that the current line $L_C$ needs to be reprocessed. That relates to recursive transform script lines. That is, a transform script line may perform an automatic transform script transformation of a part of speech $POS_i$ into a part of speech $POS_j$. Should there be at least one transformation performed from such a transform script line, it is important to reprocess the transform script line since there is a new stream with the part of speech $POS_j$ that was not analyzed in the first pass (the one that was actually created at the first pass). Such reprocessing is performed until no more streams are created from the interpretation of the transform script line.

In Step 1014, IS is inspected to determine if it is prior to the end of PS. PS contains 1–N time-slices. IS can't exceed the Nth time-slice in PS.

In Step 1016, Reprocess is inspected to determine if it is true. Step 1018 verifies if $L_C$ is $L_N$. Step 1020 sets $L_C$ to $L_{C+1}$. Step 1022 sets $S_C$ to $S_{C+1}$.

In Step 1024, a new one-dimensional array of TReco Partial PT is cleared. Step 1026 sets LN to $L_C$ and sets SCR to $S_C$. Step 1028 calls the sub-process Link Sequences Stream at Step 1102 in FIG. 11. Step 1030 increments IS by one. Step 1032 resumes the process following Step 1054 in FIG. 10.

In Step 1034, the Syntactic Analysis process is started with the entrant TRecoLst Words List from the Phoneme Stream Analysis process explained in FIG. 4. Step 1036 clears a new one-dimensional array of TScript variable Scripts List SL.

Figure 14:
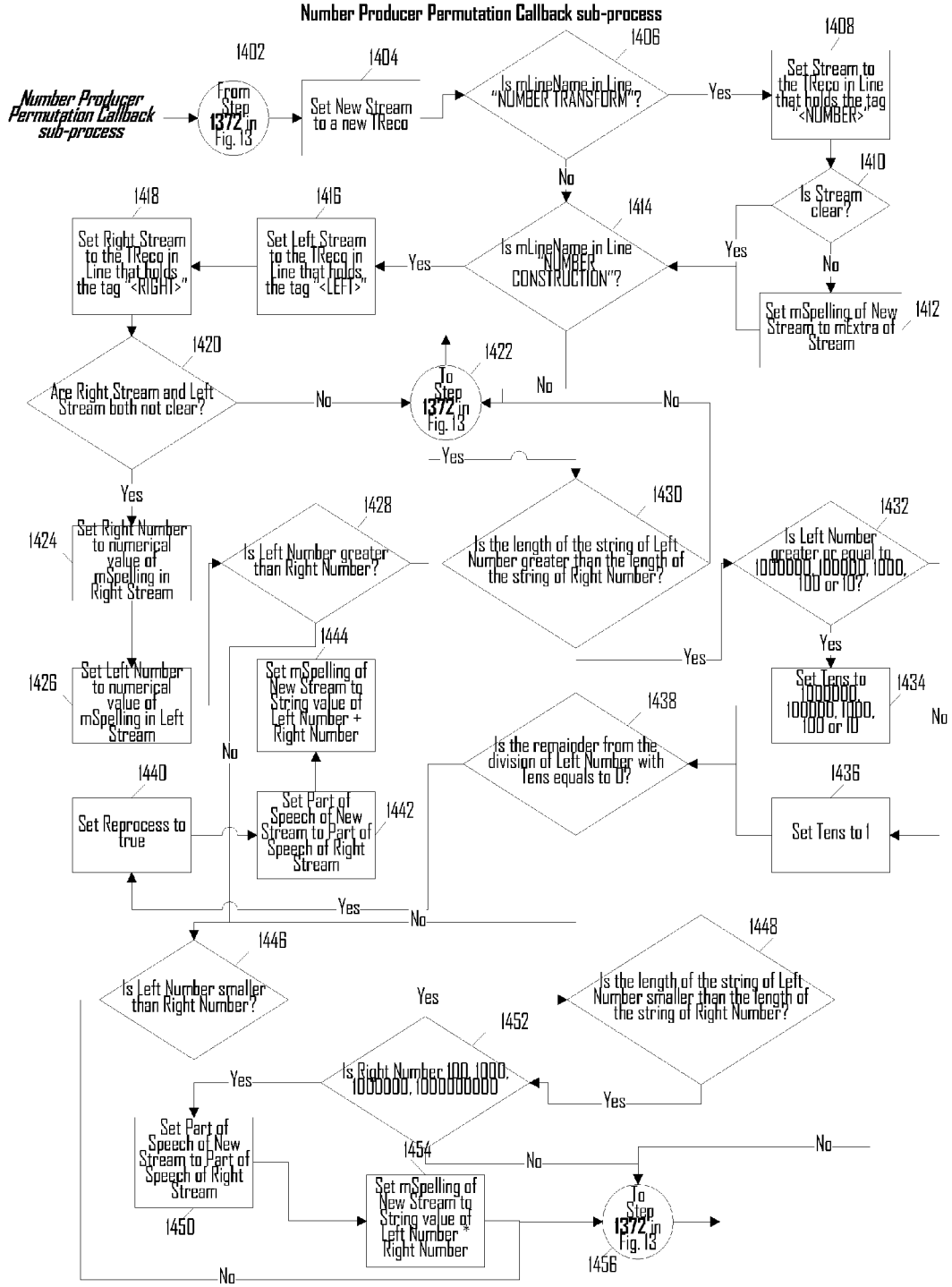
FIG. 14 is a flow diagram of the Number Producer Permutation Callback sub-process according to one embodiment of the invention.

In Step 1038, SF is set to the File variable Number Transform Script from FIG. 9B, CB is set to Step 1402 in FIG. 14. In Step 1040, the sub-process Load Script File is called. Upon loading of the File, SL will have a new TScript element added to it containing the TScript related to the File as seen in Step 1588 of FIG. 15.

Figure 13:
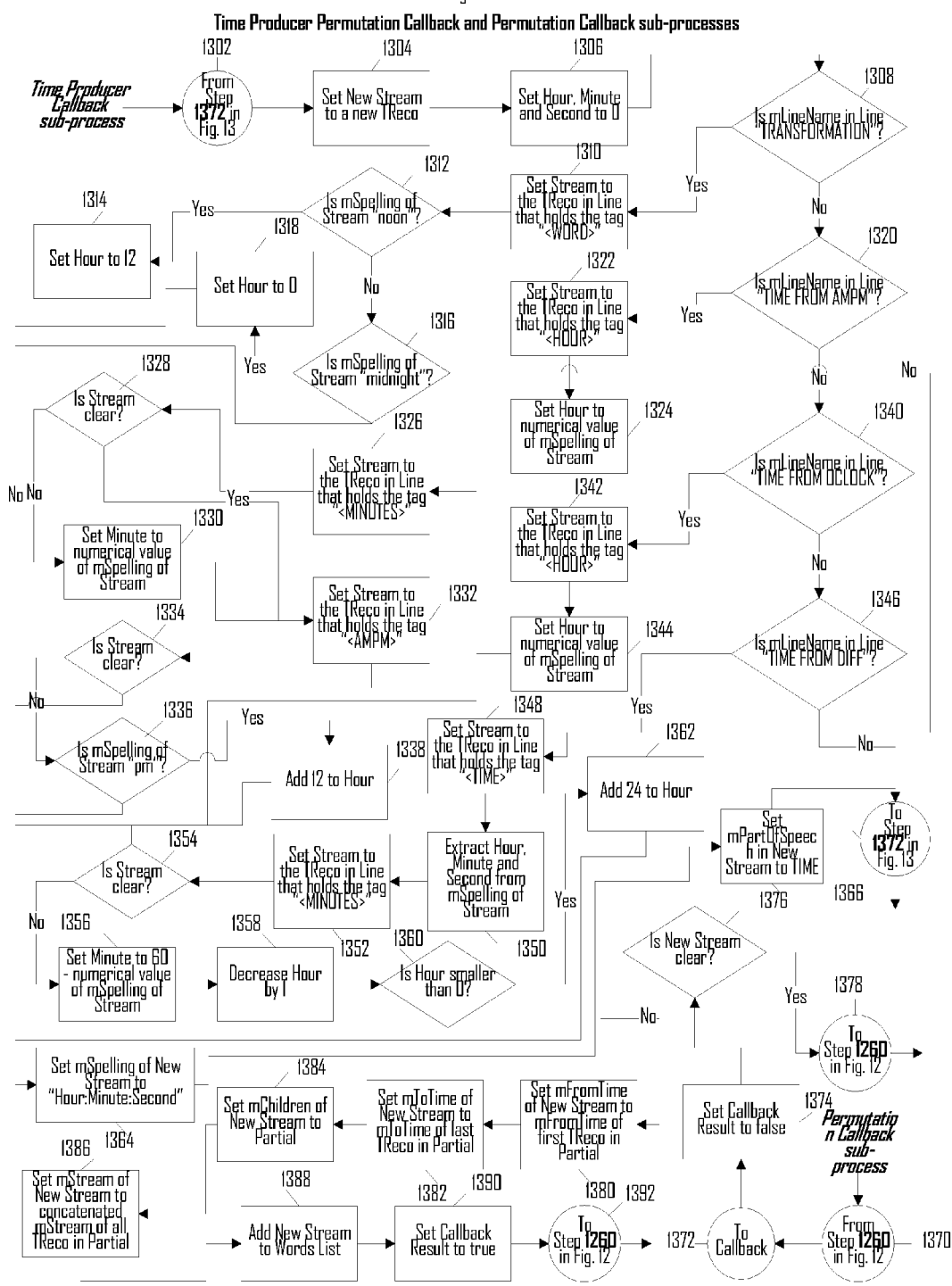
FIG. 13 is a flow diagram of the Time Producer Permutation Callback sub-process and the Permutation Callback sub-process according to one embodiment of the invention.

In Step 1042, SF is set to the File variable Time Transform Script from FIG. 9C, CB is set to Step 1302 in FIG. 13. In Step 1044, the sub-process Load Script File is called. Upon loading of the File, SL will have a new TScript element added to it containing the TScript related to the File as seen in Step 1588 of FIG. 15.

In Step 1046, SF is set to the File variable Custom Transform Script from FIG. 9D, CB is cleared. In Step 1048, the sub-process Load Script File is called. Upon loading of the File, SL will have a new TScript element added to it containing the TScript related to the File as seen in Step 1588 of FIG. 15.

In Step 1050, SF is set to the File variable Syntactic Transform Script from FIG. 9A, CB is cleared. In Step 1052, the sub-process Load Script File is called. Upon loading of the File, SL will have a new TScript element added to it containing the TScript related to the File as seen in Step 1588 of FIG. 15.

In Step 1054, the sub-process Process Script Files is called with the variables SL and WDS.

Step 1056 terminates the Syntactic Analysis process. The result of the Syntactic Analysis process is to populate the list WL with TReco structures that obey the rules in the transform scripts for Conceptual Analysis to process them.

FIG. 11 depicts a flow scheme for a Link Sequences Stream Sub-process in the preferred embodiment of the invention. The Link Sequences Stream Sub-process is part of the Syntactic Analysis process and its function is to extract from the TRecoLst Words passed to it, TReco structures that can be linked to the previous TReco structure in Partial so that valid syntactic sequences of words are gradually built while respecting word pronunciations boundaries.

In Box 1102, the Link Sequences Stream sub-process is called from Step 1028 in FIG. 10 or Step 1174 in FIG. 11.

In Step 1104, PT is inspected to determine if there is at least one TReco in it. If not, Step 1106 clears the character variable Bridge Letter BL. If yes, Step 1108 sets BL to the last phoneme of mStream of the last TReco in PT.

WL contains N TReco $W_{1-N}$. In Step 1110, the current TReco $W_C$ is set to $W_1$ in WL. Step 1112 determines if $W_C$ is or is before $W_N$. In Step 1114, mStartStream in $W_C$ is inspected to determine if it is equal to IS. Step 1116 makes $W_{C+1}$ the current TReco $W_C$ and the sub-process returns to Step 1112 to determine if $W_C$ is or is before $W_N$.

If mStartStream in $W_C$ is equal to IS in Step 1114, in Step 1118, mStream is inspected in $W_C$ to determine if it starts with the character '+'. If true, Step 1120 verifies if the second character of mStream in $W_C$—the character after '+'—is the same as BL. If true, in Step 1122, WRD is set to $W_C$. If not true at Step 1118, the sub-process proceeds directly to Step 1122 and WRD is set to $W_C$.

In Step 1124 the sub-process Test Stream at Step 1202 in FIG. 12 is called. Step 1126 verifies if PS or FS is true. The PS and FS logical values are set in Test Stream sub-process. PS with a value of true identifies that SM is valid (respects the rules stated in LI) and that a partial sequence can be formed with SM. FS with a value of true identifies that SM is valid (respects the rules stated in LI) and that a full sequence can be formed with SM. Both PS and FS are independent of each other, meaning that detection of a partial sequence is not related to the detection of a full sequence and the other way around. If both PS and FS are false, SM can't be used while respecting the rules stated in LI.

In Step 1128, a new one-dimensional array of TReco variable Keep Partial KPT is set to PT. Step 1130 sets a new one-dimensional array of string variable Keep Work Perm KWP to mWorkPerm of mPermutationLst in LI. Step 1132 appends $W_C$ to PT as a new element in the one-dimensional array.

In Step 1134, FS is inspected to determine if it is true. Step 1136 inspects mCallback in SPT to determine if it is clear. If mCallback in SPT is not clear at Step 1136, then the sub-process proceeds to Step 1166.

If mCallback in SPT is clear at Step 1136, then in Step 1138 a new TReco variable Reco RC is defined. Step 1140 sets mChildren in RC to Partial. Step 42 sets mSpelling in RC to the string that is formed by concatenating all mSpelling in all TReco of PT from the first to the last one and putting a space character between each of them. Step 1144 sets mStream of RC to the string that is formed by concatenating all mStream in all TReco of PT from the first to the last one. Step 1146 sets mStartStream of RC to mStartStream of the first TReco in PT. Step 1148 sets mEndStream of RC to mEndStream of last TReco in PT. Step 1150 sets mPartOfSpeech of RC to mPOS-Transform in LI. Step 1152 sets mFromTime in RC to mFromTime of first TReco in PT. Step 1154 sets mToTime in RC to mToTime of last TReco in PT. Step 1156 sets mRecoTp in RC to SYNTAX_ENTRY.

In Step 1158, WL is inspected to determine if RC is already in the one-dimensional array of TReco. Step 1160 adds RC to WL as a new element in the array. Step 1162 inspects mRecursive in LI to determine if it is true. Step 1164 sets the logical variable Reprocess to true. The variable Reprocess is inspected in FIG. 10, and as true value states that the TScptLine needs to be re-evaluated. If RC is already in the one-dimensional array of TReco at Step 1158, the sub-process proceeds to Step 1166.

In Step 1166, PS is inspected to determine if it is true. If yes, Step 1168 sets SM to mStream in $W_C$. Step 1170 calls the sub-process Get Stream Length at Step 612 of FIG. 6. Step 1172 adds the value returned from the sub-process Get Stream Length at Step 1202 in FIG. 12 SL to IS.

In Step 1174, the Link Sequences Stream sub-process at Step 1102 in FIG. 11 is called, and the partial sequence is processed in the Link Sequences Stream sub-process to determine if other permutations may be detected starting with the partial sequence. Step 1176 sets PT to KPT. If PS is not true at Step 1166, the sub-process proceeds directly from Step 1166 to Step 1176. Step 1178 sets mWorkPerm of mPermutationLst in LI to KWP. As Step 1116 forwards the current TReco in WL, it shall process all TReco structures in WL, at which point Step 1180 resumes the process following Step 1028 in FIG. 10 or Step 1174 in FIG. 11 depending on which step called the Link Sequences Stream sub-process.

FIG. 12 depicts a flow scheme for a Test Stream sub-process in the preferred embodiment of the invention. The Test Stream sub-process is invoked in order to test a single TReco Word to identify if it respects at least one remaining condition in the TScptLine Line so that a partial sequence and/or a full sequence could be completed, as returned from the sub-process in the logical Partial Sequence and Full Sequence.

In Box 1202, the Test Stream sub-process is called from Step 1124 in FIG. 11. It requires the TReco Word WRD to have been set by the caller, as well as TScptLine Line LI, TScript Script SPT, the one-dimensional array of TReco Partial PT and the TRecoLst Words List WL. Upon termination, the Test Stream sub-process sets two logical values: Partial Sequence PS and Full Sequence FS. PS signals that SM respected the rules stated in LI and that a partial sequence can consequently be formed with it. FS signals that SM respected the rules stated in LI and that a full sequence can consequently be formed with it.

In Step 1204, PT is inspected to determine if it is empty—i.e. if it contains a total of zero TReco. In Step 1206, mPermutation is copied to mWorkPerm of mPermutationLst in LI. All values in mCondRes and mCondBool in mPermutationLst in LI are also cleared at Step 1208.

Figure 16:
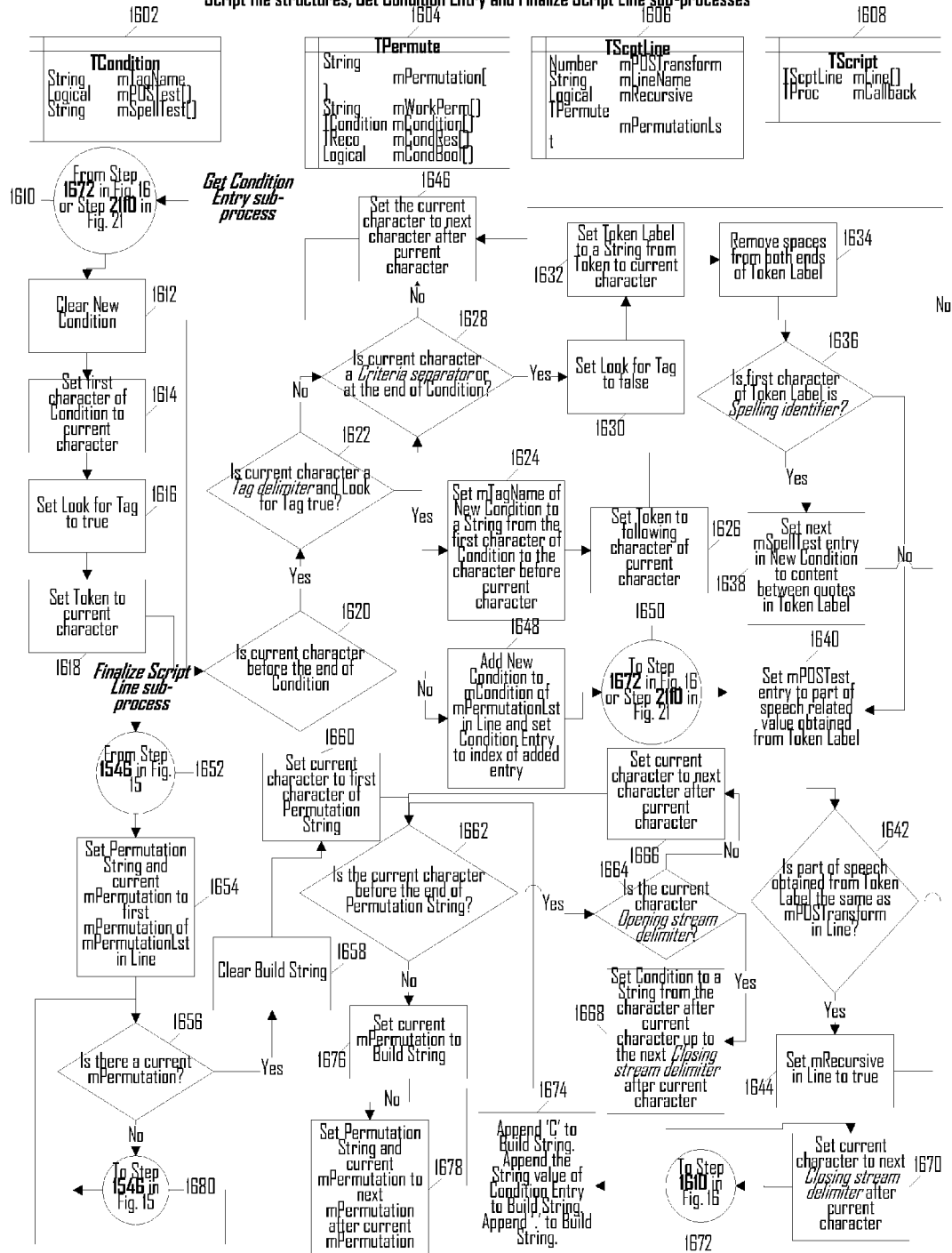
FIG. 16 is a schematic of transform script file structures and also is a flow diagram of the Get Condition Entry sub-process and the Finalize Script Line sub-process according to one embodiment of the invention.

As seen in Box 1604 of FIG. 16, a TPermute has N TCondition $CD_{1-N}$. In Step 1208, the current TCondition $CD_i$ is set to $CD_1$ of mPermutationLst in LI. Step 1210 verifies that there is a $CD_i$.

In Step 1212, Result RS is set to false. Step 1214 inspects mPosTest in $CD_i$ to determine if there is at least one value in the logical one-dimensional array set to true. In Step 1216, the mPOSTest entry index corresponding to the value associated with the Part of Speech mPartOfSpeech in WRD is inspected to determine if it is true. Should the mPartOfSpeech in WRD be VERB, as explained in FIG. 4, the value mPOSTest[8] would be inspected since the numerical value associated with VERB part of speech is 8. In Step 1218, RS is set to true.

In Step 1220, mSpellTest in $CD_i$ is inspected to determine if at least one entry in the one-dimensional array is not cleared. That is, mSpellTest is indirectly populated by a transform script line that may or may not have stated some spelling criteria for the stream. A clear mSpellTest would be one that resulted from a transform script line where no spelling criteria would have been specified for the stream. Step 1222 sets RS to false. Step 1224 verifies if mSpelling in WRD is allowed provided all mSpellTest in $CD_i$. An entry in mSpellTest in $CD_i$ may start or end with the Partial spelling match identifier. Should that be the case, mSpelling in WRD is only required to have a partial match with the mSpellTest spelling in $CD_i$ (as an example, a mSpelling in WRD like "running" would match a mSpellTest in $CD_i$ which contains "_ing"). Step 1226 sets RS to true.

In Step 1228, the mCondBool $CB_i$ entry of mPermutationLst in LI corresponding to the same index as $CD_i$ is set to RS. Step 1230 changes $CD_i$ to be $CD_{i+1}$. Step 1210 is re-invoked which inspects $CD_i$ until it escapes the loop when $CD_i$ is $CD_N$ at Step 1228.

Once $CD_{1-N}$ were processed from Step 1208 through Step 1230, Step 1210 detects that there are no current $CD_i$—since $CD_i$ is $CD_{N+1}$—and Step 1232 is invoked. In Step 1232, the one-dimensional array of string mWorkPerm of mPermutationLst in LI is copied to a new one-dimensional array of string variable named Work Item WI. Strings of the format 'CX.CY.CZ' are contained in mWorkPerm where X, Y and Z are numbers corresponding to the index in mCondition to be respected in order to form a full sequence. Step 1234 sets the first TCondition mCondition $CD_1$ of mPermutationLst in LI to be the current TCondition $CD_i$. Step 1236 sets PS and FS to false.

Step 1238 verifies if $CD_i$ is before $CD_{N+1}$. Step 1240 inspects the element $CB_i$—at the same index as the current TCondition $CD_i$—of mPermutationsLst in LI to determine if it is set to true. If true, Step 1242 replaces all strings in WI that starts with 'Ci . . . ' with 'Pi . . . ' (as an example, the string 'C.1.C3.C4' would be changed to 'P1.C3.C4' if i was one). Step 1244 sets mCondRes entry index i $CR_i$ of mPermutationLst in LI to WRD.

If $CB_i$ is not set to true at Step 1240, at Step 1246, all strings in WI that starts with 'Ci . . . ' are replaced with 'Fi . . . ' (as an example, the string 'C.1.C3.C4' would be changed to 'F1.C3.C4' if i was one).

In Step 1248, $CD_i$ in mPermutationLst in LI is changed to become $CD_{i+1}$ in mPermutationLst in LI. Step 1238 is then re-invoked until $CD_i$ is $CD_{N+1}$.

In Step 1250, all strings in WI that starts with 'Fi' are removed from the one-dimensional array of string. Step 1252 inspects each element of WI to determine if at least one of them is 'Pi'. Step 1254 sets FS to true. Step 1456 inspects if mCallback in SPT is clear—i.e. is there a call-back associated with the script. Step 1258 calls the sub-process Permutation Callback with the variables LI, mCallback in SPT, PT and WL. Step 1260 calls the Permutation Callback sub-process at Step 1370 in FIG. 13. Step 1262 sets FS to CBR set by the Permutation Callback sub-process.

In Step 1264, all strings in WI are inspected to determine if at least one of them starts with 'Pi' without being 'Pi'—i.e. one of them needs to start with 'Pi' (like 'P2.P3' for i that is 2) but is not limited to 'Pi' (like 'P2' for i that is 2). Step 1266 sets PS to true. Step 1268 copies WI to mWorkPerm of mPermutationLst in LI.

Step 1270 resumes the process following Step 1124 in FIG. 11.

FIG. 13 depicts a flow scheme for a Time Producer Permutation Callback sub-process as well as a permutation callback sub-process in the preferred embodiment of the invention. The Time Producer Permutation Callback sub-process is invoked as a result of a successful identification of sequences of TReco from the script in FIG. 9C. The programming engineer can utilize any routine now known or later developed to validate stream sequences which describe a time that may have been uttered. FIG. 13 describes the preferred method related to time sequence validation. The Time Producer Permutation Callback sets New Stream NS to a stream that contains the time, or clears NS if no time may be constructed from the sequence. The Permutation Callback sub-process is responsible for adding NS to WL if NS is not cleared.

In Box 1302, the Time Producer Permutation Callback sub-process is called from Step 1372 in FIG. 13.

In Step 1304, NS is set to a new TReco. In Step 1306, Hour HR, Minute MN and Second SC number variables are all set to zero.

In Step 1308, mLineName in LI is inspected to determine if it is equal to "TRANSFORMATION". If yes, Step 1310 sets the variable Stream SM to the TReco in LN that holds the tag "<WORD>". In order to detect a tag in a TScptLine, the mCondition array in mPermutationLst is inspected one element at a time until a TCondition is detected where mTag-Name corresponds to the tag that is being looked for. When that tag is successfully detected, the corresponding entry in mCondRes to the entry in mCondition in mPermutationLst is identified as the TReco corresponding to the tag. A clear SM identifies that the tag was not detected in LN. In Step 1312, mSpelling of SM is inspected to determine if it is equal to "noon". Step 1314 sets HR to 12. If mSpelling in SM is not equal to "noon", in Step 1316, mSpelling of SM is inspected to determine if it is equal to "midnight". Step 1318 sets HR to 0. The sub-process proceeds to Step 1364.

If mLineName in LN in Step 1308 is not equal to "TRANSFORMATION", in Step 1320, mLineName in LI is inspected to determine if it is equal to "TIME FROM AMPM". If yes, Step 1322 sets the variable Stream SM to the TReco in LN that holds the tag "<HOUR>". Step 1324 sets HR to the numerical value of mSpelling of SM. Step 1326 sets the variable Stream SM to the TReco in LN that holds the tag "<MINUTES>". In Step 1328, SM is inspected to determine if it is cleared. If SM is not cleared, Step 1330 sets MN to the numerical value of mSpelling in SM. Step 1332 sets the variable Stream SM to the TReco in LN that holds the tag "<AMPM>".

If SM is cleared at Step 1328, the sub-process proceeds to Step 1332. In Step 1334, SM is inspected to determine if it is cleared. If SM is not cleared, in Step 1336, mSpelling of SM is inspected to determine if it is equal to "pm". Step 1338 adds 12 to HR and the sub-process proceeds to Step 1364. If SM is cleared at Step 1334, the sub-process proceeds to Step 1364.

If mLineName is not equal to "TIME FROM AM/PM" in Step 1320, in Step 1340, mLineName in LI is inspected to determine if it is equal to "TIME FROM OCLOCK". If yes, Step 1342 sets the variable Stream SM to the TReco in LN that holds the tag "<HOUR>". Step 1344 sets HR to the numerical value of mSpelling of SM. The sub-process then proceeds to Step 1364.

If at Step 1340 the mLineName is not equal to "TIME FROM OCLOCK", in Step 1346, mLineName in LI is inspected to determine if it is equal to "TIME FROM DIFF". If yes, Step 1348 sets the variable Stream SM to the TReco in LN that holds the tag "<TIME>". Step 1350 extracts HR, MN and SC from mSpelling of SM. Since the TReco in LN that holds the tag "<TIME>" is a TIME part of speech, the spelling is always HR:MN:SC as built from Step 1364. It is then possible to predictably extract HR, MN and SC from mSpelling. Step 1352 sets the variable Stream SM to the TReco in LN that holds the tag "<MINUTES>". In Step 1354, SM is inspected to determine if it is cleared. If no, Step 1356 sets MN to 60 minus the numerical value of mSpelling in SM. Step 1358 decreases HR by one. Step 1360 inspects HR to determine if it is smaller than 0. In Step 1362, HR is added 24. The sub-process proceeds to Step 1364. If at Step 1354 SM is cleared, the sub-process proceeds to Step 1364.

If mLineName in LN is not equal to "TIME FROM DIFF" in Step 1346, the sub-process resumes following Step 1372 in FIG. 13 at Step 1368.

In Step 1364, mSpelling of NS is set to "HR:MN:SC". Step 1366 sets mPartOfSpeech of NS to TIME. Step 1368 resumes the process following Step 1372 in FIG. 13.

In Step 1370, the Permutation Callback sub-process is called from Step 1260 in FIG. 12. The Permutation Callback sub-process calls CB and adds NS to WL only if CB did set a value to CB (CB is not clear). The Permutation Callback sub-process will set CBR to true if a stream was added to WL, false otherwise.

The TProc CB variable is a sub-process reference. In the preferred embodiment of the invention, there are two possible values for it: Time Producer Permutation Callback at Step 1302 in FIG. 13 or Number Producer Permutation Callback at Step 1402 in FIG. 14. The programming engineer is free to use any other sub-process reference or not use the ones from the preferred embodiment of the invention.

In Step 1372, CB is called. CB is required to set or clear the TReco structure New Stream NS. Step 1374 sets CBR to false. Step 1376 inspects NS to determine if it is cleared. Should NS be cleared at Step 1376, Step 1378 resumes the process following Step 1260 in FIG. 12.

If NS is not cleared at Step 1376, in Step 1380, mFromTime in NS is set to mFromTime in the first TReco of PT. Step 1382 sets mToTime in NS to mToTime in the last TReco of PT. Step 1384 sets mChildren in NS to PT. Step 1386 sets mStream in NS to concatenated mStream of all TReco in PT from the first TReco to the last one. Step 1388 adds NS to WL. Step 1390 sets CBR to true. Step 1392 resumes the process following Step 1260 in FIG. 12.

FIG. 14 depicts a flow scheme for a Number Producer Permutation Callback sub-process in the preferred embodiment of the invention. The sub-process is invoked as a result of a successful identification of sequences of TReco from the script in FIG. 9B. The programming engineer can utilize any routine now known or later developed to validate stream sequences which describe a number that may have been uttered. FIG. 14 describes the preferred method related to number sequence validation. The Number Producer Permutation Callback sets New Stream NS to a stream that contains the number, or clears NS if no number may be constructed from the sequence. The Permutation Callback sub-process is responsible for adding NS to WL if NS is not cleared.

In Box 1402, the sub-process Number Producer Permutation Callback is called from Step 1372 in FIG. 13.

In Step 1404, NS is set to a new TReco. Step 1406 determines if mLineName in LN is "NUMBER TRANSFORM". If yes, Step 1408, sets a Stream SM to the TReco that holds the tag "<NUMBER>" in LN.

In Step 1410, SM is inspected to determine if it is clear. A clear SM identifies that the tag was not detected in LN. Step 1412 sets mSpelling of NS to the mExtra content corresponding to the part of speech CARDINAL_NUMBER. For the spelled word "twelve", the mExtra element corresponding to CARDINAL_NUMBER is expected to be "12". The sub-process proceeds to Step 1414. If at Step 1410 SM is cleared, the sub-process proceeds directly to Step 1414.

In Step 1414, mLineName in LN is inspected to determine if it is "NUMBER CONSTRUCTION". If Step 1414 fails to identify mLineName in LN as "NUMBER CONSTRUCTION", Step 1422 resumes the process at Step 1372 in FIG. 13.

If mLineName in LN is equal to "NUMBER CONSTRUCTION" at Step 1414, in Step 1416, Left Stream LS is set to the TReco in LN that holds the tag "<LEFT>". In Step 1418, Right Stream RS is set to the TReco in LN that holds the tag "<RIGHT>".

In Step 1420, LS and RS are inspected to determine if they are both not clear values. If either of LS or RS at Step 1420 is clear, Step 1422 resumes the process following Step 1372 in FIG. 13.

In Step 1424, Right Number RN is set to the numerical value of mSpelling in RS. Note that if RN is zero at Step 1424, RN is set to the numerical value of mExtra in RS. In Step 1426, Left Number LN is set to the numerical value of mSpelling in LS. Note that if LN is zero at Step 1426, LN is set to the numerical value of mExtra in LS.

If either of LS and RS are clear at Step 1420, in Step 1428, the sub-process determines if LN is a greater number than RN. This would identify sequences of the additive type. For example, Step 1428 succeeds for sequences of the type "twenty five" (since 20 is greater than 5). If LN is greater then RN, In Step 1430, the sub-process verifies that the string built from LN has a greater length than the length of the string built from RN. For example, Step 1430 fails for sequences of the type "twenty fifteen" (The string "20" has a greater length than the string "5", but not the string "15").

If yes at Step 1430, the sub-process next ascertains the order of magnitude of the number in terms of the power of ten. In Step 1432, LN is inspected to determine if it is greater or equal to 100000, 100000, 1000, 100 or 10. Should LN be 1000, Tens TS would be set to 1000 at Step 1432. Step 1434 then sets TS to the corresponding value depending if LN is greater or equal to each tested value in Step 1432. Should LN be 15, TS is set to 10 at Step 1434. If LN is not greater or equal to any of these values, TS is set to 1 at Step 1436.

Once the order of magnitude of the number has been determined, in Step 1438, LN/TS is inspected to determine if the remainder is zero. Sequences like "fifteen two" would fail at Step 1438 since 15/10 does not generate a remainder of zero but a remainder of five. Obtaining a remainder of zero is a mandatory condition to fulfill for a valid sequence of numbers of the additive type.

If yes at Step 1438, in Step 1440, the global variable Reprocess is set to true. Reprocess global variable will be later inspected in FIG. 10 (Step 1016) to determine if a TScptLine is recursive. Step 1442, sets mPartOfSpeech of NS to mPartOfSpeech of RS. If the sequence analyzed would be "fifty third", the TReco structure holding "third" would have a mPartOfSpeech that is ORDINAL_NUMBER, the sequence "fifty third" would then also be ORDINAL_NUMBER. Step 1444 sets mSpelling of NS to the string value of the number generated by LN+RN. The sub-process resumes following Step 1372 in FIG. 13.

If at Step 1438 the remainder from the division of LN/TS is not equal to zero, meaning that sequence is not of the additive type, in Step 1446, it is determined if LN is smaller than RN. The purpose of the following steps is to handle sequences of the type "fifteen thousand". Those sequences are named the multiplicative type.

Step 1448 determines if the string of LN is smaller than the string of RN. Sequences of the type "fifteen ten" fail at Step 1448 (since the string "15" is not smaller than the string "10"). Step 1452 tests RN to determine if it is 100, 1000, 1000000 or 1000000000. Step 1450 sets mPartOfSpeech of NS to mPartOfSpeech of RS. In Step 1454, mSpelling of NS is set to the string value of LN*RN. Step 1456 resumes the process following Step 1372 in FIG. 13. If at Step 1452 RN is not equal to 100, 1000, 1000000 or 1000000000, the sub-process resumes following Step 1372 in FIG. 13 at Step 1456.

Figure 15:
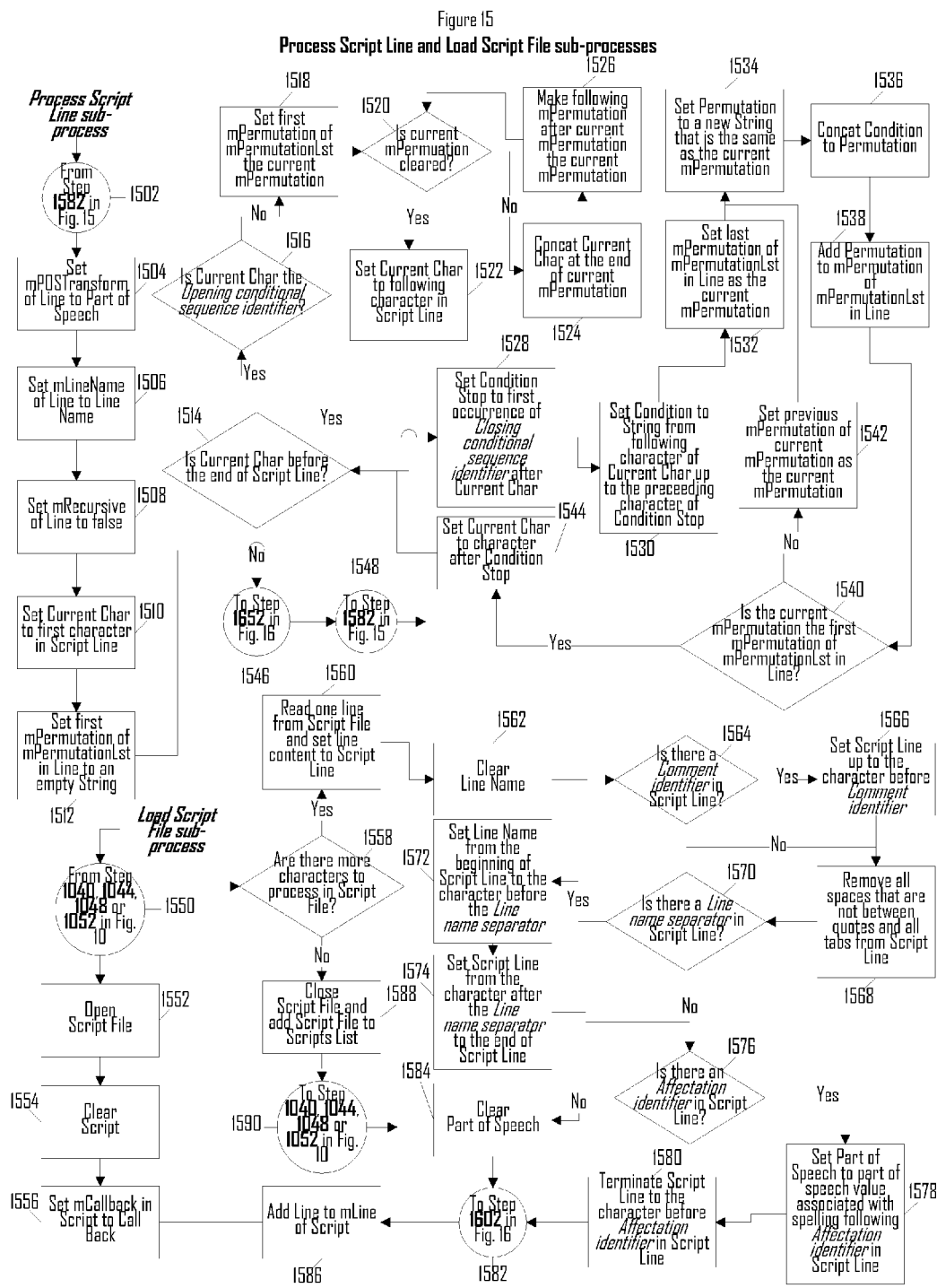
FIG. 15 is a flow diagram of the Process Script Line sub-process and the Load Script File sub-process according to one embodiment of the invention.

FIG. 15 depicts a flow scheme for script file reading sub-processes in the preferred embodiment of the invention.

In Box 1502, a Process Script Line sub-process is called from Step 1582 in FIG. 15. The Process Script Line sub-process processes the string contained in Script Line SL, which is typically a single line from a transform script file, and populates the TScptLine structure Line LN accordingly with processed characters from SL so that LN ends up containing all information related to permutations described in SL.

In Step 1504, mPOSTransform in LN is set to POS passed to the sub-process. POS may be UNKNOWN, in which case there would not be any automatic transformation associated with SL. An automatic transformation transform script line is a transform script line that specifies a part of speech after the optional Affectation identifier characters as explained in FIG. 9. That signals to the algorithm that an automatic transformation should occur without the requirement for a call-back sub-process to be invoked.

In Step 1506, mLineName in LI is set to LN. LN may be clear, in which case there would not be any line name associated with LI.

In Step 1508, the logical value mRecursive in LI is set to false. Step 1510 sets a new pointer variable Current Char CC to point to the first character of SL. Step 1512 clears the first mPermutation of mPermutationLst in LI. The sub-process then invokes Step 1514.

In Step 1514, CC is inspected to determine if it is pointing before the end of SL. Step 1516 determines if CC is pointing to an Opening conditional sequence identifier. If CC is not pointing to an Opening conditional sequence identifier at Step 1516, Step 1518 sets the first mPermutation of mPermutationLst in LI to be the current mPermutation. Step 1520 determines if the current mPermutation is cleared. A cleared TPermute structure, as in the current mPermutation, is a TPermute structure that was not populated by any process prior. If it is not cleared, Step 1524 concatenates the character pointed by CC at the end of the current mPermutation. Step 1526 sets the following mPermutation from the current mPermutation the current mPermutation. Step 1520 is repeated until it detects a mPermutation that is cleared. Once it determines that a mPermutation is cleared, Step 1522 sets CC to point to the next character after where it was pointing and Step 1514 is then re-invoked.

In Step 1516, if CC is pointing to an Opening conditional sequence identifier, Step 28 sets the pointer Condition Stop CS to the first occurrence of a Closing conditional sequence identifier after CC. In Step 1530, Condition CDN is set to the string that is formed from the following character of CC up to the preceding character of CS.

In Step 1532, the last mPermutation that is not cleared of mPermutationLst in LI is set to the current mPermutation. Step 1534 declares a new string named Permutation PM that holds the same content as the current mPermutation. In Step 1536, the content of CDN is appended at the end of PM. Step 1538 adds an entry to mPermutation array of mPermutationLst in LI with the content PM.

In Step 1540, it is determined if the current mPermutation is the first mPermutation of mPermutationLst in LI. If it is not the first mPermutation, then Step 1542 sets the current mPermutation to the previous mPermutation of mPermutationLst in LI and then re-invokes Step 1534. Step 1540 is re-invoked until it gets to the first mPermutation in mPermutationLst in LI. Step 1544 then sets CC to point to the character after where CS points and Step 1514 is reprocessed until it determines that CC is not before the end of SL anymore. Step 1546 calls the sub-process Finalize Script Line at Step 1152 in FIG. 11. At Step 1548, the process resumes at Step 1582 in FIG. 15.

In Step 1550, a Load Script File sub-process is called from Step 1040, 1044, 1048 or 1052 in FIG. 10. The Load Script File sub-process describes the loading in memory and filling of a single TScript structure provided a given file Script File SF which contains a transform script that respects syntax as stated in FIG. 9. A transform script may be loaded through other means including, but not limited to, accessing memory range that contains the transform script or obtaining the transform script accessible from system resources.

In Step 1552, the file SF is opened. Step 1554 clears the TScript SC. Step 1556 sets mCallback in SC to Callback CB passed to the sub-process. The value of CB may be cleared identifying that no call-back is expected. A cleared CB value is a value that was never set by any process prior to its inspection or that was cleared prior in the process. In Step 1558, it is determined if there are more characters to process from the reading of the file SF. If there are more character to process, then Step 1560 reads one line from SF and sets the line content to the string Script Line SL. Step 1562 clears Line Name LN. Step 1564 determines if there is a Comment identifier character in SL. If there is a Comment identifier character in SL, Step 1566 sets SL up to the character before the Comment identifier character. Step 1566 removes all spaces that are not between Spelling identifiers and all tabs from SL.

In Step 1570, SL is inspected to determine if there is a character Line name separator in it. If there is a Line name separator character in SL, Step 1572 sets LN to the string that goes from the beginning of SL up to the character before the Line name separator character in SL. In Step 1574, SL is set to begin from the character after the Line name separator character in SL. Step 1576 is then invoked.

If there are no Line name separator character in SL at Step 1570, Step 1576 is invoked. In Step 1576, SL is inspected to determine if there is a sequence of characters forming the Affectation identifier. If there is no Affectation identifier in SL, Part of Speech POS is cleared at Step 1584. If there is a sequence forming the Affectation identifier, Step 1578 sets POS to the part of speech associated with the spelling following the Affectation identifier in SL. If the POS is not a pre-programmed value, the POS is added to the collection of POS. Step 1580 terminates SL to the character before the Affectation identifier in SL.

In Step 1582, the sub-process Process Script Line at Step 1502 in FIG. 15 is called. Step 1586 adds LI set by the sub-process at Step 1582 to the first cleared entry of mLine in SC. Step 1558 is then re-invoked until it is determined that there are no more character to process from SF. Step 1588 closes SF, and adds SC to Scripts List and Step 1590 resumes the process following Step 1040, 1044, 1048 or 1052 in FIG. 10, depending on which step called the Load Script File sub-process at Step 1550 in FIG. 15.

FIG. 16 depicts a flow scheme for script file structures and sub-processes in the preferred embodiment of the invention. FIG. 15 and FIG. 16 describe the sub-processes related to transform script loading into memory. Transform script examples can be seen in FIGS. 9A, 9B, 9C and 9D.

In Box 1602, a predetermined and programmed into the system TCondition structure is defined as an optional mTagName as a string, a mPOSTest as a one-dimensional array of logical values and a mSpellTest as a one-dimensional array of strings. mTagName is optional since the programming engineer may not have an associated call-back sub-process associated with the transform script. Since tags are typically used from call-back sub-processes in order to detect a stream within a sequence of streams, the fact that no call-back exists for a transform script makes mTagName almost irrelevant. The purpose of a TCondition is to hold all information related to criteria parameters for a stream to meet as stated between the opening and closing stream delimiters (as defined in FIG. 9). Stream criteria may be related to part of speech and/or spelling requirements. mPOSTest values entries are related to parts of speech criteria. Entry index one in mPOSTest would indicate by a value of true that part of speech value one is a criteria for the given TCondition. mSpellTest holds potential spelling related criteria in no given order. Any given mSpellTest entry that starts with the Partial spelling match identifier is an end with criteria string match as explained in FIG. 9.

In Box 1604, a predetermined and programmed into the system TPermute structure is defined as a mPermutation and mWorkPerm, both one-dimensional arrays of string, a mCondition one-dimensional array of TCondition, and mCondRes logical one dimensional array. The purpose of a TPermute is to hold all information related to a transform script line other than the line name and automatic part of speech transformation. Each mPermutation entry holds a string of the type "C1.C2.C3" where $C_i$ means that condition i as described in $i^{th}$ entry of mCondition needs to be met. mWorkPerm and mCondRes are later used in script execution.

In Box 1606, a predetermined and programmed into the system TScptLine structure is defined as an optional mPOSTransform value as a number corresponding to the part of speech numeric value or UNKNOWN (which has an associated numerical value of 0 as explained in FIG. 8) if cleared, followed by an optional mLineName as a string that refers to a script line name if it was found in the read script (as an example, "TRANSFORMATION" is the line name of the first line in the transform script in 9C), a mRecursive logical value, and, a mPermutationLst that holds a TPermute structure. The mRecursive logical value is set to true to signal that a transformation that occurs on that transform script line must be followed by a re-interpretation of the same transform script line. For example, a Stream sequence may be described in a transform script line where any part of speech followed by a NOUN_PHRASE part of speech generates a NOUN_PHRASE part of speech. A successful generation of a NOUN_PHRASE through that transform script line would mean that a new NOUN_PHRASE stream has been created. But that newly created NOUN_PHRASE stream would not have been taken into consideration for that same transform script line if the algorithm would proceed immediately to the next transform script line. Consequently, the transform script line is re-evaluated after a successful transform in order not to miss any streams for analysis to see if they can be included in a sequence of streams related to a transform script line, regardless if they were created from the same transform script line. The TPermute structure holds all information extracted from a single transform script line. Should mPOSTransform not be UNKNOWN part of speech, the transform script line is an automatic transform script line since it does not require a call to the call-back sub-process for the transformation to occur. Such transform script lines are the ones that include an Affectation identifier followed by a part of speech. If mPOSTransform is UNKNOWN part of speech, a call-back associated to the entire transform script should be invoked—where the decision can be made to allow the sequence of streams to be formed or not.

In Box 1608, a predetermined and programmed into the system TScript structure is defined as a one-dimensional array of TScptLine structures and a mCallback optional value as a TProc that is the address of a sub-process to call upon running the script. The purpose of a TScript structure is to hold all information related to a transform script. That information is a simple ordered array of TScptLine (each TScptLine holds all information related to a single transform script line) and an optional mCallback value.

Figures 1, 21:
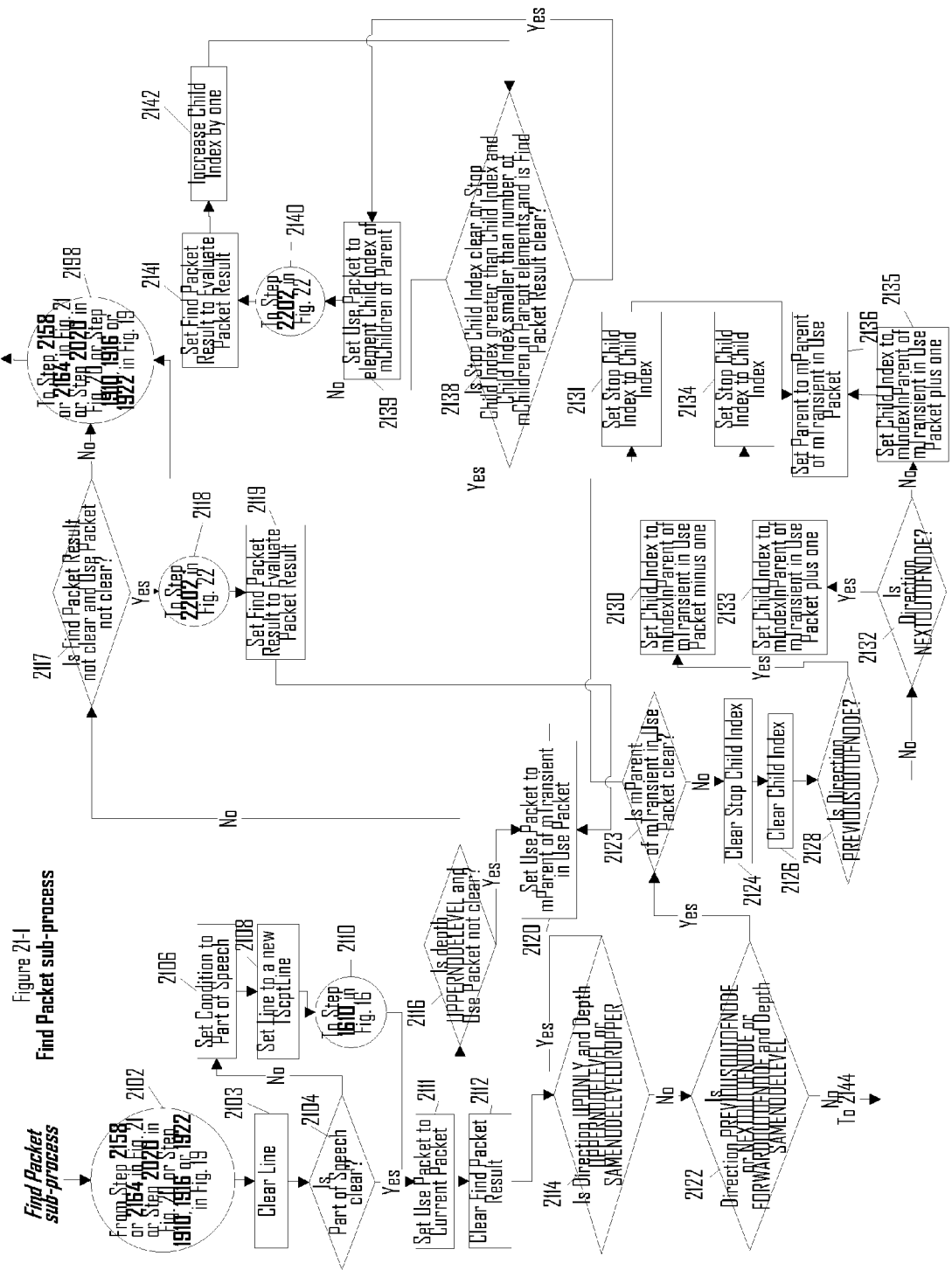
FIG. 21 is a flow diagram of the Find Packet sub-process according to one embodiment of the invention.
Figures 2, 21:
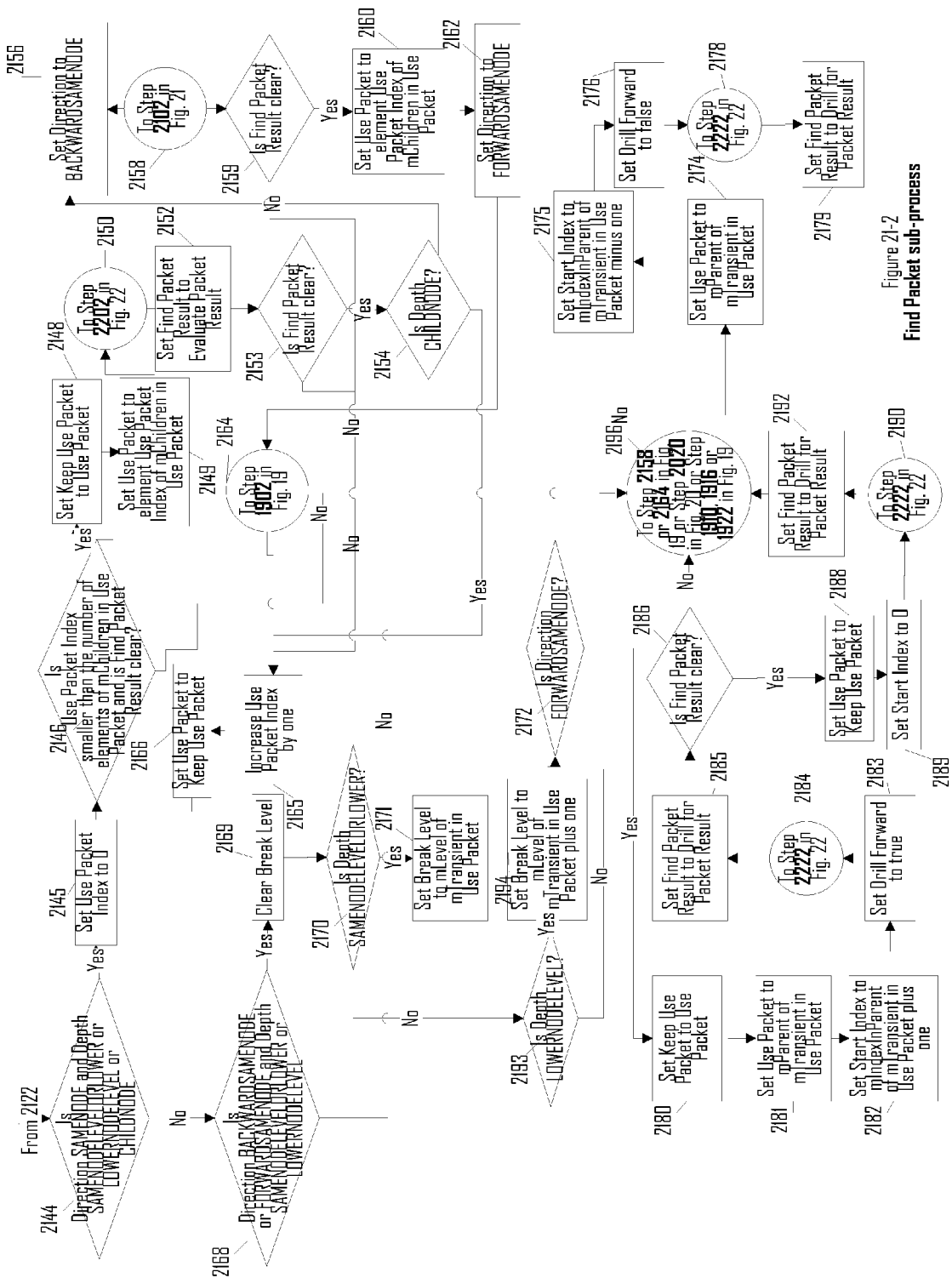

In Box 1610, the sub-process Get Condition Entry is called from Step 1672 in FIG. 16 or Step 2110 in FIG. 21. The purpose of Get Condition Entry sub-process is to fill a single TCondition structure in the TPermute structure and sets Condition Entry CE to the index of the added TCondition. Condition CDN must have been set with the condition string to create a TCondition in LN prior to calling the Get Condition Entry sub-process. Current Character $CH_C$ will scan CDN one character at a time while reacting adequately on determined characters related to the syntax of transform scripts to build successfully the TCondition structure in LN.

In Step 1612, a newly created New Condition NC variable of type TCondition is cleared. Step 1614 sets the first character of the condition CDN created at Step 1668 to the Current Character $CH_C$. Step 1616 sets a newly created logical variable Look for Tag LFT to the value true. In Step 1618, a newly created Token TK variable points to the current character.

In Step 1620, it is determined if the $CH_C$ is before the end of CDN. If $CH_C$ is before the end of CDN at Step 1620, Step 1622 verifies if $CH_C$ is a Tag delimiter character and the value of LFT is true. If the test at Step 1622 succeeds, the value of mTagName in NC is set to the string from the first character of CDN up to the character just before $CD_C$ in Step 1624. In Step 1626, the variable TK is set to point to the character just after $CH_C$.

In Step 1628, $CH_C$ is inspected to determine if it points to the Criteria separator (as explained in FIG. 9) or it is actually pointing at the end of CDN. Step 1630 sets the value of LFT to false. In Step 1632, a Token Label TL is set to the string that goes from the character pointed to by TK up to the character preceding $CH_C$. Step 1634 removes the spaces form each extremities of TL.

In Step 1636, the first character of TL is inspected to determine if it is a Spelling identifier. If it is a Spelling identifier, at Step 1636, Step 1638 sets the first cleared entry of mSpellTest in NC to the content of TL that is between Spelling identifiers. If the first character of TL is not a Spelling identifier at Step 1636, Step 1640 identifies the part of speech associated with the content of TL and then sets the entry of mPOSTest in NC to the numerical value of the part of speech to true. Step 1642 determines if the part of speech obtained at Step 1640 is the same as mPOSTransform in LN. If that is the case, Step 1644 sets the logical value mRecursive in LN to true.

Following Step 1638 or Step 1640, Step 1646 sets $CH_C$ to the character following the current character $CH_{C+1}$. If Step 1628 does not identify a Criteria separator as $CH_C$ and $CH_C$ is not pointing to the end of CDN, then Step 1646 is invoked. The process is repeated until Step 1620 identifies that $CH_C$ is beyond the end of CDN. Once Step 1620 escapes the loop, Step 1648 adds NC to the first available mCondition entry of mPermutationLst in LN and sets the number variable CE to the index of the added entry in mCondition. In Step 1650, the process resumes following Step 1672 in FIG. 16 or Step 2110 in FIG. 21, depending on which step called the sub-process.

In Box 1652, the sub-process Finalize Script Line is called from Step 1546 in FIG. 15.

In Step 1654, the current mPermutation $P_C$ is set to the first mPermutation of mPermutationLst in vLine. Step 1650 also sets a newly created string variable Permutation String PS to the content of the current mPermutation. Step 1656 determines if there is a $P_C$.

In Step 1658, a string variable Build String BS is cleared. Step 1660 sets the current character $CH_C$ to the first character of PS.

In Step 1662, it is determined if $CH_C$ is before the end of PS or not. If Step 1664 determines that $CH_C$ is before the end of PS, Step 1664 verifies if $CH_C$ is an Opening stream delimiter. If $CH_C$ is not an Opening stream delimiter, the sub-process sets $CH_C$ to $CH_{C+1}$ at Step 1666. If $CH_C$ is an Opening stream delimiter character at Step 964, a new string variable Condition CDN is set to the string that is formed from the character following $CH_C$ up to the preceding character from the next Closing stream delimiter after $CH_C$ at Step 1668.

Step 1670 sets $CD_C$ to the character following the next Closing stream delimiter after $CH_C$. In Step 1672, the sub-process Get Condition Entry at Step 1610 in FIG. 16 is called.

In Step 1674, a character 'C' is appended at the end of BS. The string value of CE returned by Get Condition Entry sub-process at Step 1610 in FIG. 16 is appended to the end of BS as well as a '.'. Step 1662 is then re-invoked until it is determined that $CD_C$ is not before the end of PS. Step 1676 then sets $P_C$ to BS. In Step 1678, the $P_C$ is set to $P_{C+1}$ and Step 1656 is re-invoked until it is determined that $P_C$ is $P_N$. Step 1680 resumes the process at Step 1546 in FIG. 15 or Step 2110 in FIG. 21.

Conceptual Analysis

FIG. 17 depicts a flow scheme for a Conceptual Analysis process in the preferred embodiment of the invention. The purpose of the Conceptual Analysis process is to calculate a normalized conceptual representation that represents the concept related to the inquiry uttered by the speaker provided the TRecoLst that contains multiple syntactic permutations calculated in the Syntactic Analysis process.

By way of example and not intending to limit the invention in any manner, the Conceptual Analysis process may be based on Conceptual Dependency theory (CD) as mostly formulated by Roger. C. Schank. Its goal is to normalize concepts by removing all syntax related information from the final conceptual representation. The conceptual representation of two sentences that convey the same idea would then need to be identical. As an example, "What time is it?" and "What is the time?" would both have the same conceptual representation. By way of example and not intending to limit the invention in any manner, a conceptual representation can be represented by a Predicate. A Predicate is a string that has the following format:

PRIMITIVE (ROLE$_1$:FILLER$_1$) ... (ROLE$_N$:FILLER$_N$)

Where PRIMITIVE is a keyword of one's choosing within a limited set of possible primitives—of one's choosing—and may represent an action as well as a state, ROLE$_i$ is a slot to be filled related to PRIMITIVE, and FILLER$_i$ is the value related to ROLE$_i$ and PRIMITIVE and may be a Predicate as well as a string or even a variable. By way of example and not intending to limit the invention in any manner, a variable can be a string that is preceded by the characters '$+' and followed by the characters '+$'. As an example "$+COLOR+$" would represent the "COLOR" variable. In the preferred embodiment of the invention, by way of example and not intending to limit the invention in any manner, variables and variable names are kept in two synchronized one-dimensional arrays of string—first one-dimensional array of string holding the variable names, and second one-dimensional array of string holding the variables content. (ROLE$_i$:FILLER$_i$) is named a role-filler pair. A Predicate may contain any number of role-filler pairs greater or equal to one. The order of role-filler pairs within the Predicate is irrelevant. Variables detected in fillers are interpreted as an identification that role-filler pair has a variable filler. Variables used in primitives or roles are variable tokens as described below and result in the value related to variable to replace the variable token.

Contrary to Schank's theory surrounding the use of primitives, the invention does not limit itself to the 12 primitives stated by Schank. There are significant debates in the field of conceptual dependency about the minimal set of primitives required to describe every flavor of conceptual representation. The purpose of this invention is not to enter in such debate by limiting the programming engineer to a fixed set of primitives; consequently, the programming engineer is free to use the primitive set he desires to represent knowledge. In the flight response system often referred to in the invention, as an example, the AIRLINEPOSTANALYSIS primitive is used. This is obviously not a primitive that could be useful to represent knowledge broadly in a context larger than a flight response system. But, it is extremely useful in the limited context of such flight response system since it can well be interpreted as a non-reducible element of knowledge in that context. This is actually helpful since a full reduction to real primitives would mean that a flight response system be required to detect a report being requested during the Post Analysis process, as an example, from real primitives like MTRANS. This would be a significant task and a major barrier for the programming engineer's efficiency to produce a useful solution in a reasonable amount of time.

In order to help understanding, by way of example and not intending to limit the invention in any manner, some valid conceptual representations follow:

1. "John gave his car to Paul."
ATRANS (OBJECT: CAR)
(FROM: JOHN)
(TO: PAUL)
(TIME: PAST)

ATRANS, in conceptual dependency theory, is one of 12 action primitives used and refers to a transfer of possession—the abstract transfer of possession from one person to another, as in a give or a buy. No physical transfer need take place; the transfer occurs purely on the plane of ownership.

2. "John remembered that he gave his car to Paul."
MTRANS (ACTOR: JOHN)
(MOBJECT: ATRANS (OBJECT: CAR)
   (FROM: JOHN)
   (TO: PAUL)
   (TIME: PAST))
(FROM: LTM)
(TO: CP)
(TIME: PAST)

MTRANS, in conceptual dependency theory, is one of 12 action primitives used and refers to the transmission of an IDEA—some conceptualization is transmitted from one head to another (or within the same head). Tell, forget and remember can all be expressed with MTRANS. An idea is represented by an MOBJECT slot in the CD, which is superficially like OBJECT except that it contains a whole concept as its value.

LTM, in conceptual dependency theory, refers to the location that stores memory in one's mind.

CP, in conceptual dependency theory, refers to the central processor of one's mind. A conceptual representation that MTRANS from LTM to CP is the conceptual representation of remembering something.

As it can be seen in this example, the filler associated with the role MOBJECT is a complete Predicate structure.

3. "A blue car."
PP (OBJECT: CAR)
(COLOR: BLUE)

PP, in conceptual dependency theory as stated by Roger C. Schank and his followers, refers to a picture producer—i.e. anything that can generate a picture in one's mind. In this case, one's mind may easily generate a car picture.

4. "A train and a car that are the same color."
AND (VALUE1: PP (OBJECT: TRAIN)
(COLOR: $+COLOR+$))
(VALUE2: PP (OBJECT: CAR)
(COLOR: $+COLOR+$))

Without specifying the exact color of neither the car nor the train, this Predicate specifies through the variable $+COLOR+$ that both objects need to be the same color.

1. "A train and a car that are not the same color."
AND (VALUE1: PP (OBJECT: TRAIN)
(COLOR: $+COLOR1+$))
(VALUE2: PP (OBJECT: CAR)
(COLOR: $+COLOR2+$))

Without specifying the exact color of neither the car nor the train, this Predicate specifies through the variable $+COLOR1+$ and $+COLOR2+$ that both objects need to be of different colors.

The programming engineer may implement any predicate calculus operation that he sees fit. Predicate calculus operations are helpful to perform post-analysis and also to assist in the Command Handler. The preferred embodiment of the invention, by way of example and not intending to limit the invention in any manner, defines some sub-processes related to predicate calculus manipulations:

1. The predicate calculus operation $P_X$ is a $P_Y$: returns true if $P_X$ is a $P_Y$, returns false otherwise. As an example, PP (OBJECT: TRAIN) (COLOR: RED) is a PP (OBJECT: TRAIN) returns true, i.e. a "red train" is a "train". On the other hand, PP (OBJECT: TRAIN) is a PP (OBJECT: TRAIN) (COLOR: RED) returns false since a "train" is not necessarily a "red train". Furthermore, PP (OBJECT: TRAIN) (COLOR: RED) is a PP (OBJECT: TRAIN) (COLOR: $+COLOR+$) returns true since a "red train" is a "colored trained" and, upon evaluation of the sub-process, the variable $+COLOR+$ is set to RED. Note that PP (OBJECT: TRAIN) (COLOR: RED) is a PP (COLOR: RED) (OBJECT: TRAIN) also returns true since the order of role-filler pairs in a Predicate structure is irrelevant.

2. The predicate calculus operation $P_X$ has a $P_Y$: returns true if $P_X$ is or contains the Predicate $P_Y$, returns false otherwise. As an example, MTRANS (ACTOR: JOHN) (MOBJECT: ATRANS (OBJECT: CAR) (FROM: JOHN) (TO: PAUL) (TIME: PAST)) (FROM: LTM) (TO: CP) (TIME: PAST) has a ATRANS (OBJECT: CAR) returns true, i.e. "Does John remembering that he gave his car to Paul have anything to do with a car changing possession?" returns true. In the same way as the is a sub-process, variables can be used. As an example, MTRANS (ACTOR: JOHN) (MOBJECT: ATRANS (OBJECT: CAR) (FROM: JOHN) (TO: PAUL) (TIME: PAST)) (FROM: LTM) (TO: CP) (TIME: PAST) has a MTRANS (ACTOR: $+SOMEONE+$) (MOBJECT: $+SOMETHING+$) (FROM: LTM) (TO: CP) (TIME: PAST) also returns true and upon evaluation of the sub-process $+SOMEONE+$ is set to JOHN and $+SOMETHING+$ is set to ATRANS (OBJECT: CAR) (FROM: JOHN) (TO: PAUL) (TIME: PAST). This example could be read as the following. "Did someone ($+SOMEONE+$) remember something ($+SOMETHING+$) in the Predicate MTRANS (ACTOR: JOHN) (MOBJECT: ATRANS (OBJECT: CAR) (FROM: JOHN) (TO: PAUL) (TIME: PAST)) (FROM: LTM) (TO: CP) (TIME: PAST)?" In Which case the has a sub-process returns true and $+SOMEONE+$ is set to JOHN, $+SOMETHING+$ is set to the Predicate ATRANS (OBJECT: CAR) (FROM: JOHN) (TO: PAUL) (TIME: PAST) meaning "John gave his car to Paul".

3. The predicate calculus operation $P_X$ replacement of $P_Y$ with $F_Z$. This predicate calculus operation replaces $P_Y$ in $P_X$ with filler $F_Z$ if found. As an example, MTRANS (ACTOR: JOHN) (MOBJECT: ATRANS (OBJECT: CAR) (FROM: JOHN) (TO: PAUL) (TIME: PAST)) (FROM: LTM) (TO: CP) (TIME: PAST) replacement of MTRANS (ACTOR: JOHN) with PAUL. That would result in the Predicate MTRANS (ACTOR: PAUL) (MOBJECT: ATRANS (OBJECT: CAR) (FROM: JOHN) (TO: PAUL) (TIME: PAST)) (FROM: LTM) (TO: CP) (TIME: PAST). The same way as for the other predicate calculus operations, variables may be used. The operation MTRANS (ACTOR: JOHN) (MOBJECT: ATRANS (OBJECT: CAR) (FROM: JOHN) (TO: PAUL) (TIME: PAST)) (FROM: LTM) (TO: CP) (TIME: PAST) replacement of MTRANS (ACTOR: $+SOMEONE+$) with PAUL would result in the same Predicate MTRANS (ACTOR: PAUL) (MOBJECT: ATRANS (OBJECT: CAR) (FROM: JOHN) (TO: PAUL) (TIME: PAST)) (FROM: LTM) (TO: CP) (TIME: PAST) and $+SOMEONE+$ would be set to JOHN upon execution of the sub-process.

The preferred embodiment of the invention, by way of example and not intending to limit the invention in any manner, would, as a minimum, implement the predicate calculus manipulations operations is a, has a and replacement of with. These operations are self explanatory and simple string manipulations operations that can easily be programmed by those skilled in the art.

In order to manipulate Predicate structures in the preferred embodiment of the invention, as way of example and not intending to limit the invention in any manner, a Predicate Builder scripting language is used. The Predicate Builder scripting language is an interpreted language that performs simple text replacement operations in order to generate a single Predicate, i.e. a string that is of the form PRIMITIVE (ROLE$_1$:FILLER$_1$) . . . (ROLE$_N$:FILLER$_N$). Every token that needs special processing in the Predicate Builder scripting language of the preferred embodiment of the invention is located between some designated characters, here the '$+' and '+$' characters. Other characters that are not between '$+' and '+$' are simply added to the calculated result. By way of example and not intending to limit the invention in any manner, categorization of tokens can be as following:

1. Variable token: A variable which content replaces the token. or,

2. Procedural token: A procedure to call where some optional parameters are passed and the optional result replaces the token. or, 3. Entry-point token: An entry-point to the system where some predetermined and programmed into the system content replaces the token. or, 4. Flow-control token: A predetermined and programmed into the system flow-control token like $+IF( )+$, $+IFNOT( )+$, $+ELSE+$ and $+ENDIF+$. or, 5. Definition token: Definition of variable or procedural content through the tokens $+DEFINE( )+$ or $+EVALDEFINE( )+$.

To help understanding, as way of example and not intending to limit the invention in any manner, a Predicate Builder script example follows:

$+DEFINE(tmp.qry)+$ {?ENTITY}
$+IF($+WORKINGCDPREDICATE+$;NULL)+$
$+DEFINE(tmp.qry)+$ {?TIME}
$+ENDIF+$
$+DEFINE(tmp.rs)+$ {MOOD (CLASS:$+tmp.rs__1+$) (QUERY:$+tmp.qry+$) (OBJECT:$+SUBJECT+$)}
$+tmp.rs(INTEROGATIVE)+$
$+UNDEF(tmp.qry)+$
$+UNDEF(tmp.rs)+$ The first line $+DEFINE(tmp.qry)+$ {?ENTITY} is a definition token. The content between brackets is associated to the variable token $+tmp.qry+$. To keep track of such association, the system keeps two one-dimensional arrays of string. One of them holds variable names (in this case "tmp.qry") and the second one, at the same index in the array, holds corresponding content (in this case "?ENTITY").

Next, a line follows having a flow-control token and an entry-point token. $+IF($+IF__1+$;$+IF__2+$)+$ is a flow-control token that lets the script interpret content up to the corresponding $+ELSE+$ or $+ENDIF+$ only if $+IF__1+$ is equal to $+IF__2+$. Should $+IF__1+$ not be equal to $+IF__2+$, scripting would start being interpreted after the corresponding $+ELSE+$ or $+ENDIF+$ depending on the script content. The token $+WORKINGCDPREDICATE+$ is an entry-point token. Just by looking at it, one could not say if it is a variable token or an entry-point token, but implementation of both are different since an entry-point token requires runtime processing in order to generate replacement content and a variable token strictly replaces content.

Next, the line $+DEFINE(tmp.qry)+$ {?TIME} is also a definition token. Note that this line won't be interpreted if the flow-control token $+IF+$ fails on the preceding line to determine that the entry-point token $+WORKINGCDPREDICATE+$ is NULL.

Next, the flow-control token $+ENDIF+$ follows, which corresponds to the previous flow-control token $+IF+$.

The following line is also a definition token. But, this time the content between brackets is associated to the procedural token $+tmp.rs(param1)+$ since the parameter $+tmp.rs__1+$ is referred (stating that it requires a procedural token to be fully expanded). All procedural token may refer to parameters accessible from the variable token that is the same as the name of the procedural token appended with the '__' character and the parameter index. Note that within the definition of the procedural token, the entry-point token $+SUBJECT+$ is also used.

The line $+tmp.result(INTEROGATIVE)+$ is a procedural token. And finally, the lines $+UNDEF(tmp.qry)+$ and $+UNDEF(tmp.rs)+$ are entry-point tokens that clears the variables tmp.qry and tmp.rs.

Interpretation of this Predicate Builder script would go as follow (assume that entry-point token $+WORKINGCDPREDICATE+$ returns NULL and that entry-point token $+SUBJECT+$ is "PP (OBJECT: CAR) (COLOR: RED)").

1. Set $+tmp.qry+$ to "?ENTITY".
2. $+IF($+WORKINGCDPREDICATE+$;NULL)+$ falls thru since $+WORKINGCDPREDICATE+$ returned NULL.
3. Set $+tmp.qry+$ to "?TIME".
4. Set $+tmp.rs+$ to "MOOD (CLASS:$+tmp.rs__1+$) (QUERY:$+tmp.qry+$) (OBJECT:$+SUBJECT+$)".
5. Append to result buffer of Predicate script interpretation the string "MOOD (CLASS:INTEROGATIVE) (QUERY:?TIME) (OBJECT:PP (OBJECT: CAR) (COLOR: RED))". All replacements were then made provided that state of variable tokens and entry-point tokens at time of interpretation.

6. Clear $+tmp.qry+$.
7. Clear $+tmp.rs+$.

The final result from Predicate Builder script interpretation of the script is the string "MOOD (CLASS:INTEROGATIVE) (QUERY:?TIME) (OBJECT:PP (OBJECT: CAR) (COLOR: RED))" which respects the format required to form a Predicate structure.

Definitions, flow-controls, variables and procedurals tokens can be used without constraint in Predicate Builder scripts. Entry-Point tokens need to respect requirements related to parameters to passed to it as well as they need to be used while having a good understanding on the runtime processing corresponding to each token.

Interpreted languages were developed for years and such implementation is well known to those skilled in the art. The Predicate Builder scripting language is another interpreted language that has the specificity of generating Predicate structures (in this case, a string that respects the format earlier stated). The advantages of using the Predicate Builder scripting language over any traditional language such as C, C++ or else is that it is scalable, opened, dedicated to the task of generating a Predicate structure and logics related to Predicate building mostly reside outside binary code.

One or many Predicate Builder scripts can be associated to any word—part of speech pair. This relates to the reality that any word may have multiple meanings, and that meanings do not normally cross the part of speech boundary (as examples, the VERB part of speech "fire" is not expected to have the same meaning as the NOUN part of speech "fire", and the NOUN part of speech "ring" that one wears does not have the same function or meaning than a boxing "ring").

A unique Predicate Builder script may also be associated to any word of a given part of speech. As an example, the CARDINAL_NUMBER or ORDINAL_NUMBER parts of speech. Although the invention is not so limited, it would be impractical to require a unique Predicate Builder script to define the CARDINAL_NUMBER "one" and a different one for "two" and so on. Instead, auto-scripts are used in such situations. An auto-script is a Predicate Builder script that typically can be associated with all words of a predefined part of speech. By way of example and not intending to limit the invention in any manner, when desired, auto-scripts are defined by populating a procedural token $+.autoscript&POS+$ where 'POS' is the part of speech.

To define an auto-script for CARDINAL_NUMBER parts of speech words, the following syntax would typically be used:

$+DEFINE(.autoscript&CARDINAL_NUMBER)+$
{#Put Predicate Builder script here}

For example, in FIG. 9D, the part of speech FLIGHT is defined. The sequences of words "United airline flight number six hundred", "Flight six hundred", "UAL number six hundred" all generate a FLIGHT part of speech. In order to assign a valid Predicate to the FLIGHT part of speech, an auto-script Predicate Builder script needs to be associated with the part of speech FLIGHT (by defining the procedural token .autoscript&FLIGHT). Content of the Predicate Builder script should in that case detect an optional airline company name in any child node of the stream in the syntactic hierarchy, and should also detect a CARDINAL_NUMBER to identify the flight number. Once those elements are extracted from the stream, a database search can then extract all relevant information related to the flight specified in the stream for purposes of response to the inquiry. By way of example and not intending to limit the invention in any manner, the FLIGHT auto-script could generate the following Predicate for the sequences of words stated previously:

PP (CLASS:VEHICLE)
(TYPE:AIRPLANE)
(COMPANY:UA)
(NUMBER:600)
(ORIGIN:JFK)
(DESTINATION:DFW)
(STATUS:ARRIVED)
(DEPARTURETIME:8:59)
(ARRIVALTIME:14:32)
(INITIALDEPARTURETIME:8:52)
(INITIALARRIVALTIME:14:20)
(DEPARTUREGATE:B 21)
(ARRIVALGATE:B 2)

In order to build Predicate structures where all elements related to syntax are removed, it is a bit of a contradiction, but nevertheless a fact that mostly syntactic related operations are required. Already, as it can be seen in Box 2340 of FIG. 23, a hierarchy of syntactic streams are available for conceptual analysis. In this example of an airline response system, the syntactic organization selected by the programming engineer for conceptual analysis is the SENTENCE, and so the following discussion refers solely to sentences. However, the invention is not so limited and the programming engineer may designate any syntactic organization, from any portion of an audio input, for conceptual analysis. For each SENTENCE to be analyze conceptually, the Set Transient Information sub-process shown in FIG. 23 is called. The Set Transient Information sub-process sets the TTransient structure in each TReco structure so that they can be related to each other on a child-parent basis as seen in Box 2340 in FIG. 23.

In Step 1702, the Conceptual Analysis process is started according to the preferred embodiment of the invention. The purpose of the Conceptual Analysis Process is to calculate the Inquiry Predicate IP that represents the conceptual representation of the inquiry as well as the Post Analysis Predicate PAP that represents the conceptual representation of the response to inquiry. In order to do that, all SENTENCE parts of speech that spans from the beginning to the end of the phoneme stream PS are analyzed until successful IP and PAP are calculated or until all SENTENCE parts of speech streams were calculated without successfully generating an IP and PAP.

Inquiry anomalies may be derived from utterances. In the preferred embodiment, there are three potential inquiry anomalies expressed. Inquiry anomalies, ranked from less inquiry anomaly to most inquiry anomaly, are no inquiry anomaly, a WARNING Predicate in the inquiry Predicate or the response Predicate, and an ERROR Predicate in the inquiry Predicate or the response Predicate. The invention may include an approach where inquiry anomalies are expressed with other scaled values, like numbers, as an example; or the invention may also include an approach where inquiry anomalies are not used. As an example, in an hypothetical flight response system which uses the inquiry anomalies from the preferred embodiment, if a speaker said something like "Has American airline flight six hundred and twenty been delayed?" and there is no flight 620 in the database of flights, to form the response, an ERROR Predicate would be added to PAP with a filler containing a string explaining what the error is (something like "I'm sorry, there is no flight six hundred and twenty scheduled for today."). Following the same logic, a warning may result from conceptual analysis. The same utterance may result in a warning if a flight 620 exists, but is operated by United Airlines instead of American Airlines. In that case, a WARNING Predicate is generated and the filler contains "Note that flight 620 is operated by United Airlines instead of American Airlines as you stated".

The programming engineer is free to use the inquiry anomaly, including no inquiry anomaly if desired, that will better serve its purpose. The WARNING and ERROR roles is the inquiry anomaly mechanism chosen in the preferred embodiment of the invention and does not pretend to limit the invention in any manner.

Should a WARNING or ERROR role be detected in a calculated PAP, calculations of subsequent SENTENCE parts of speech streams continue until all of them are calculated or one is calculated that has no WARNING or ERROR role. The assumption is made that a speaker is aware of what can be spoken, and that between two potential utterances that could have been recognized, the more accurate one is picked—i.e. the one that generated no WARNING and ERROR role wins over the one that generated a WARNING role which wins over one that generated an ERROR role.

Furthermore, Conceptual Analysis or Post Conceptual Analysis may decide to reserve a perfectly good IP or PAP. That is done by invoking the $+RESERVE+$ entry point token from a Predicate Builder script. As an example, if the sequence "be 4" is detected during Conceptual Analysis, knowing that it is more probably a mistake for "before", the programming engineer may immediately flag the current conceptual analysis to be a reserve since it may not be a valid analysis, although there is a remote probability that it is valid. Should Conceptual Analysis later process a sequence of words that is also valid and was not flagged as reserve, it would then be picked over the sequence that was flagged as reserve.

Step 1704 clears variables Inquiry Predicate IP, Post Analysis Predicate PAP, Error Post Analysis Predicate EPAP and Reserve Inquiry Predicate RIP used in the Conceptual Analysis process.

Step 1706 sets SM to the first TReco in WL. Step 1708 inspects mPartOfSpeech in SM to determine if it is equal to the SENTENCE part of speech value. If yes, Step 1710 inspects mStartStream in SM to determine if it is equal to 0 and mEndOFStream in SM to determine if it is equal to TSC. If no at either Step 1708 or Step 1710, the process proceeds to Step 1752.

If yes at Step 1710, in Step 1712, mParent of mTransient in SM is cleared. Step 1714 invokes the Set Transient Information sub-process in Step 2304 of FIG. 23 so that a syntactic hierarchy, as shown as an example in Box 2340 of FIG. 23, is calculated. Step 1716 sets Reserve RSV and Reject RCT to false. Step 1718 clears the Predicate Subject SBJ, the Predicate Report Subject RSBJ, the Predicate Working Predicate WPRED and the stream Current Packet CP. Step 1720 sets Subject Search SS to false.

Figure 18:
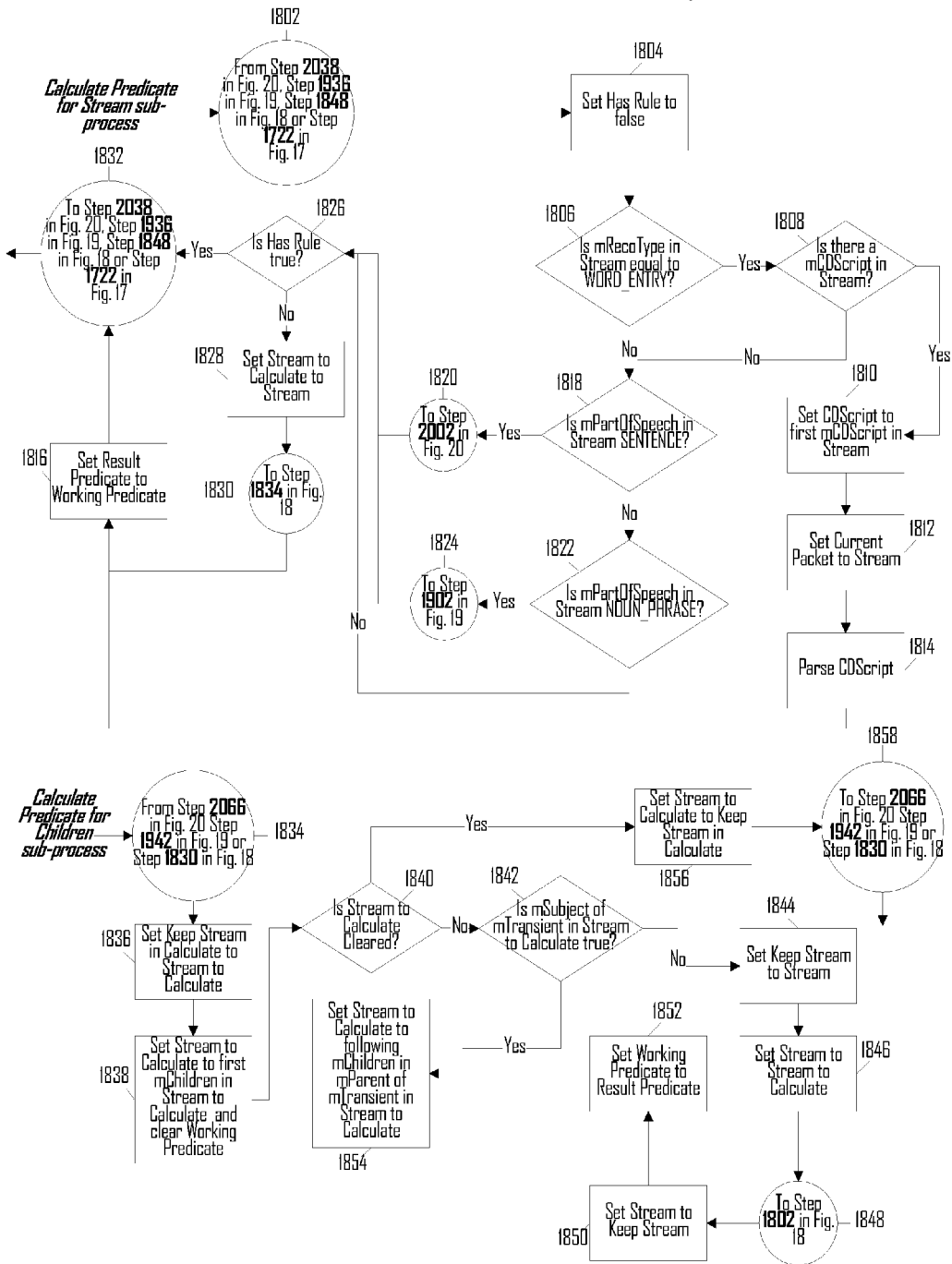
FIG. 18 is a flow diagram of the Calculate Predicate for Stream and Calculate Predicate for Children sub-processes according to one embodiment of the invention.

Step 1722 calls the sub-process Calculate Predicate for Stream at Step 1802 in FIG. 18. The Calculate Predicate for Stream sets the Predicate value Result Predicate RP accordingly. Step 1724 inspects RP to determine if it is clear. If yes, the process proceeds to Step 1750.

If no at Step 1724, Step 1726 performs the Post Analysis process on Result Predicate and generates a Predicate Post Analysis Result Predicate PARP corresponding to the response of RP.

In the preferred embodiment of the invention, the Post Analysis process comprises the selection of concepts to transform from inquiry to response as one or more Predicate structures, defined by the programming engineer, that may be part of the inquiry uttered expressed as the Result Predicate RP structure. This Post Analysis process results in a new Predicate structure being generated in Post Analysis Response Predicate PARP which holds the response to the inquiry to be executed by the Command Handler if selected.

In the airline response system examples of this application—available in the examples section of this application, the programming engineer produced Predicate Builder scripts associated with each word that may be used to utter a command so that a successfully built inquiry Predicate holds at least one Predicate with the primitive AIRLINEPOSTANALYSIS and the role OPERATION. The filler associated with the OPERATION role, as a consequence of the programming engineer's choice, is another Predicate REPORT (VALUE: $+VALUETOREPORT+$) (OBJECT: $+OBJECT+$), VERIFY (ORIGIN: $+CITY+$) (OBJECT:$+OBJECT+$) or VERIFY (DESTINATION:$+CITY+$) (OBJECT:$+OBJECT+$).

Following choices from the programming engineer, both Predicates with the primitive VERIFY are used in order to verify that the origin or destination of a flight, described in $+OBJECT+$, is indeed $+CITY+$, $+VALUETOREPORT+$ in the Predicate with the primitive REPORT may have any of the following values and is associated the concept related to inquiry that follows.

STATUSARRIVED: Has the flight arrived?
ARRIVALTIME: What is the arrival time?
ARRIVALCITY: What is the arrival city?
ARRIVALGATE: What is the arrival gate?
ARRIVALLOCATION: What is the arrival location?
ARRIVALDELTASTATUS: How late or how early is the flight?
TIMETOARRIVAL: How much time is left to the flight's arrival?
STATUSDEPARTED: Has the flight departed?
DEPARTURETIME: What is the flight's departure time?
DEPARTURECITY: What is the flight's departure city?
DEPARTUREGATE: What is the flight's departure gate?
DEPARTURELOCATION: What is the flight's departure location?
DEPARTUREDELTASTATUS: How early or how late is the flight departure?
TIMETODEPARTURE: How much time is left until a flight's departure?
DELTASTATUS: How much time until the departure or arrival of a flight?
STATUS: What is the flight's status?

The Post Analysis process task, as an example in the flight response system, is limited at investigating every Predicate within RP with the AIRLINEPOSTANALYSIS primitive and populate the Predicate PAPR so that it holds the response to produce.

The Post Analysis process is then tightly related to the programming engineer's choices made during Predicate Builder script production. The programming engineer may choose to handle identified concepts while not handling others, and Predicate construction that happens during the Conceptual Analysis process only supports the programming engineer's choices in the sense that Predicate will be built following the rules that were set. The Post Analysis process is as diverse as there are purposes for this invention. Also, there is not only one way to handle a specific implementation of this system for the programming engineer. Another implementation of a flight response system could well have used different assumptions during the Predicate Builder script production phase, that would have resulted in a different Post-Analysis process and would be equally valid, although different, as the implementation shown as example in this application.

Step 1728 inspects PARP to determine if it is clear. If yes, the process proceeds to Step 1766. If no, Step 1730 inspects RCT to determine if it is true. If yes, the process proceeds to Step 1766.

If no, Step 1732 inspects PARP to determine if it is Has a WARNING (CONTENT: $+CONTENT+$) Predicate. As explained earlier, the Has a is a predicate calculus operation that returns true if the Predicate is found anywhere in PARP. If yes, Step 1734 inspects EPAP to determine if it is clear. If yes, the process proceeds to Step 1738. If no, Step 1736 inspects EPAP to determine if it Has a WARNING (CONTENT: $+CONTENT+$) Predicate. If no, Step 1738 sets EPAP to PARP and RIP to RP and the process proceeds to Step 1766. If yes, the process proceeds to Step 1766.

If no at Step 1732, Step 1740 inspects PARP to determine if it Has a ERROR (CONTENT: $+CONTENT+$) Predicate. If yes, the process proceeds to Step 1750. If yes, the process proceeds to Step 1738. If no, the process proceeds to Step 1766.

If no at Step 1740, Step 1742 inspects RSV to determine if it is true. RSV may have been set to true by an entry point token in any of the Predicate Builder script interpreted from Step 1814 in FIG. 18. If no, Step 1744 sets IP to RP and PAP to PARP and the process proceeds to Step 1766. If no, the process proceeds to Step 1746.

Step 1746 inspects RPAP to determine if it is clear. If yes, Step 1748 clears EPAP, sets RPAP to PARP, and sets RIP to RP. If no, the process proceeds to Step 1766.

Step 1750 inspects EPAP to determine if it is clear.

If no at either of Step 1708 or Step 1710, Step 1752 inspects SM to determine if it is the last TReco in WL and inspects IP to determine if it is not clear. If no, the process proceeds to Step 1766.

If yes at Step 1752, Step 1754 inspects PAP to determine if it is clear. If no, the process proceeds to Step 1760. If yes, Step 1756 inspects RPAP to determine if it is clear. If no, Step 1758 sets PAP to RPAP and IP to RIP and the process proceeds to Step 1760. If yes at Step 1756, Step 1762 inspects EPAP to determine if it is clear. If no, Step 1764 sets PAP to EPAP and IP to RIP and the process proceeds to Step 1760. If yes, the process proceeds to Step 1768.

Step 1760 executes PAP. A Predicate can indeed be executed since a Predicate may hold some action primitives that may be interpreted as operations to execute. As an example, if PAP Has a SPEAK (CONTENT: $+CONTENT+$) Predicate, $+CONTENT+$ shall be spoken back to the user through a synthesized voice.

Step 1768 stops the Conceptual Analysis process.

FIG. 18 depicts a flow scheme for a Calculate Predicate for Stream Sub-process and a Calculate Predicate for Children sub-process in the preferred embodiment of the invention.

The Calculate Predicate for Stream sub-process calculates the Predicate for SM which may have any given mPartOfSpeech value. Upon calling Calculate Predicate for Stream sub-process, the value of WPRED is important since WPRED contains the working Predicate that is being incrementally built from the Calculate Predicate for Stream sub-process (it is a potentially recursive sub-process). Once the Predicate was calculated for SM, it sets Result Predicate RP to contain the Predicate calculated.

Figure 19:
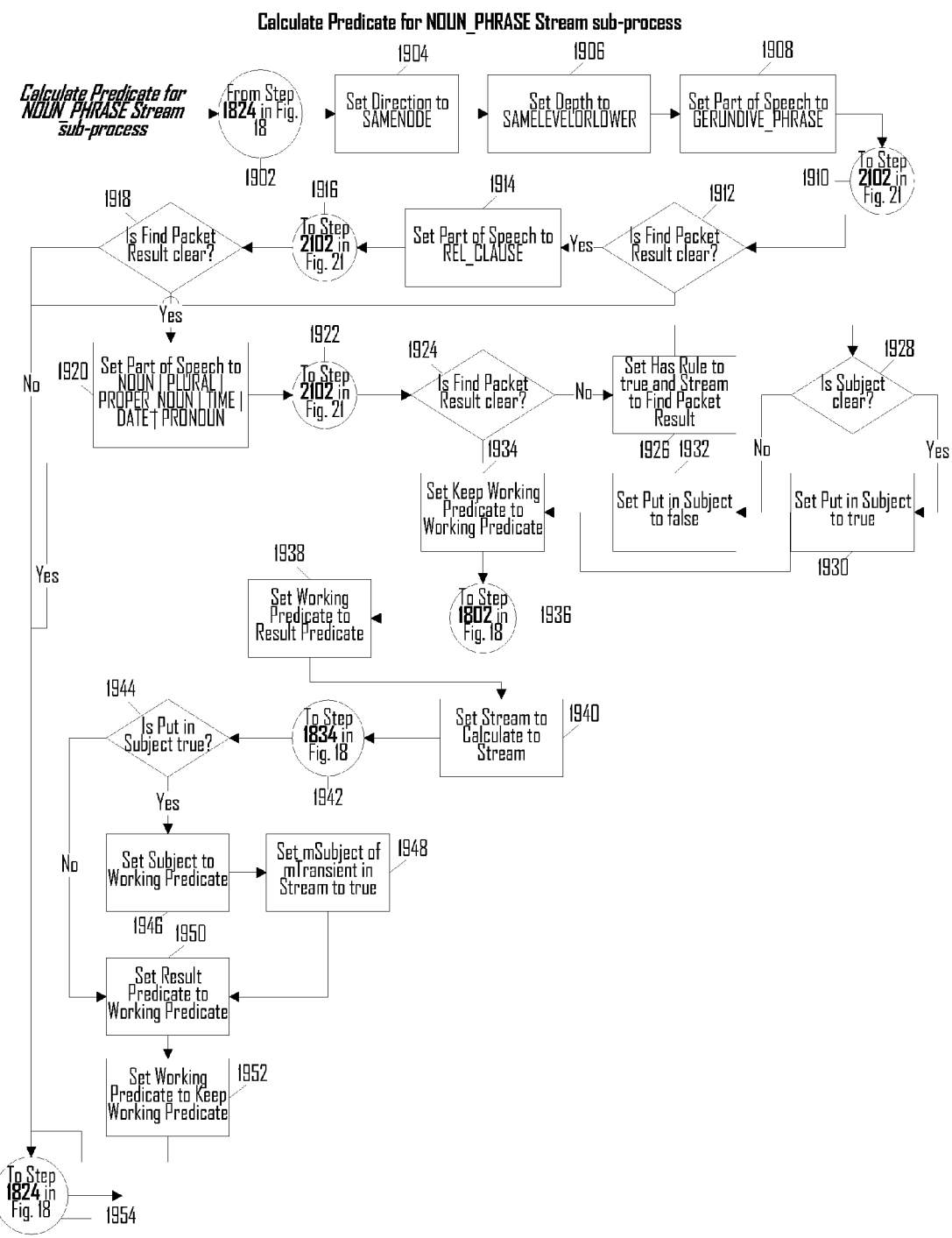
FIG. 19 is a flow diagram of the Calculate Predicate for NOUN_PHRASE Stream sub-process according to one embodiment of the invention.
Figure 20:
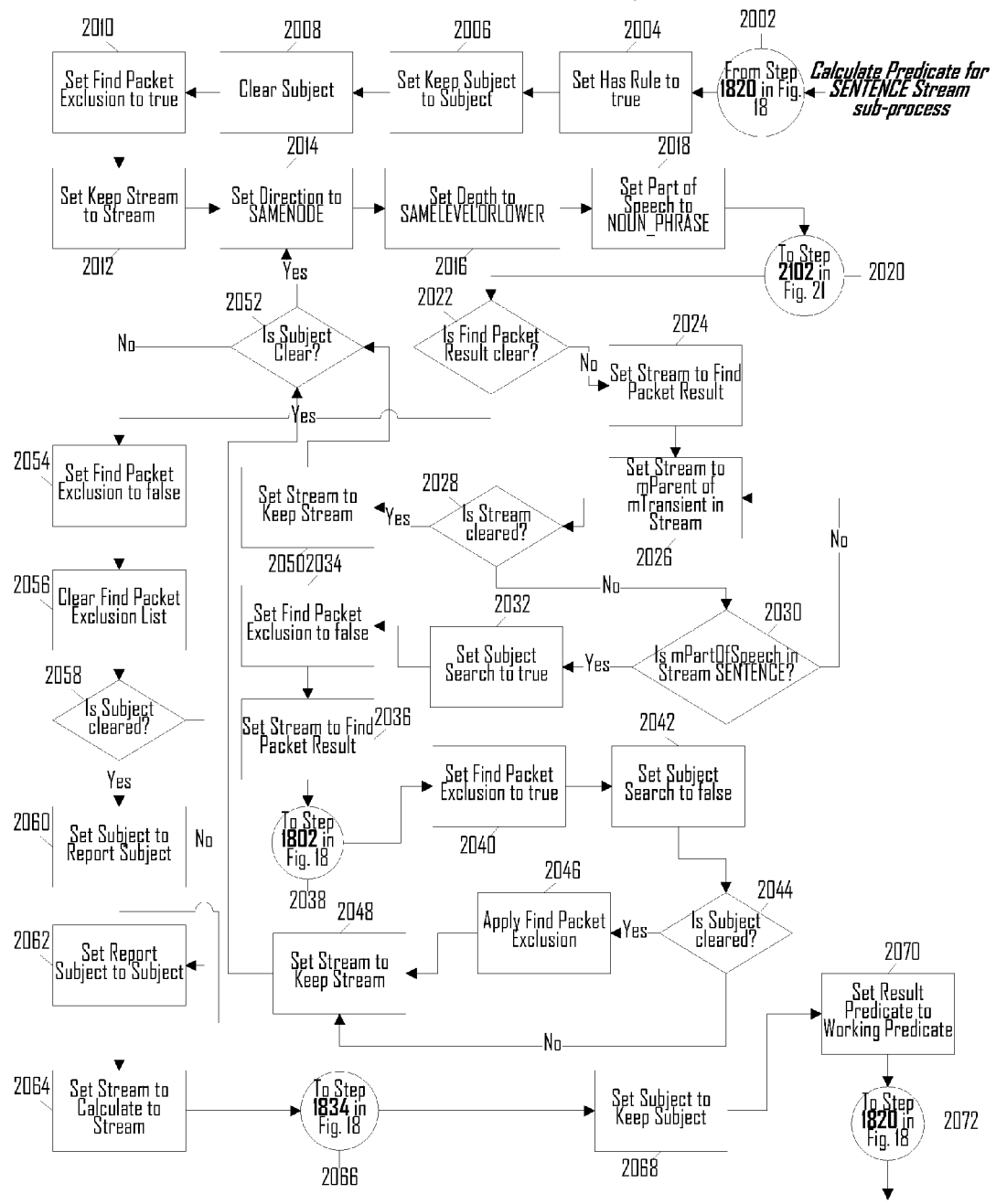
FIG. 20 is a flow diagram of the Calculate Predicate for SENTENCE Stream sub-process according to one embodiment of the invention.

In Box 1802, the Calculate Predicate for Stream sub-process is called from Step 2038 in FIG. 20, Step 1936 in FIG. 19, Step 1848 in FIG. 18 or Step 1722 in FIG. 17. Step 1804 sets Has Rule HR to false. Step 1806 inspects mRecoType in SM to determine if it is equal to WORD_ENTRY. If no, the process proceeds to Step 1818. If yes, Step 1808 inspects if there is a mCDScript entry that is not clear in SM. Since the Flatten Script sub-process was called at FIG. 7 prior to adding the TReco to WL, the algorithm can count on the fact that at most, one Predicate Builder script will be in mCDScript in SM. If yes, Step 1810 sets CDScript CD to the first mCDScript that is not clear in SM. Step 1812 sets CP to SM, and Step 1814 parses CD. Parsing involves applying the string replacements related to a Predicate Builder script in such a way that all tokens were processed and that result is a Predicate. Once the Predicate was calculated, it is automatically put in WPRED at Step 1816 and the process proceeds to Step 1832.

In Step 1816, Result Predicate RP is set to WPRED. If Step 1806 or Step 1808 fails, Step 1818 inspects mPartOfSpeech in SM to determine if it is SENTENCE. If yes, Step 1820 calls the Calculate Predicate for SENTENCE Stream sub-process at Step 2002 in FIG. 20 and the process proceeds to Step 1826. If no, Step 1822 inspects mPartOfSpeech in SM to determine if it is NOUN_PHRASE. If yes, Step 1824 calls the Calculate Predicate for NOUN_PHRASE Stream sub-process at Step 1902 in FIG. 19. If no, the process proceeds to Step 1826. Step 1826 inspects HR to determine if it is true. HR may have been set to true in Calculate Predicate for SENTENCE Stream or Calculate Predicate for NOUN_PHRASE Stream sub-process.

If no, Step 1828 sets Stream to Calculate STC to SM. Step 1830 calls the sub-process Calculate Predicate for Children at Step 1834 in FIG. 18. The sub-process then moves to Step 1816 where RP is set to WPRED and the process proceeds to Step 1832. If yes at Step 1826, the process proceeds to Step 1832. At Step 1832, the process resumes following Step 2038 in FIG. 20, Step 1936 in FIG. 19, Step 1848 in FIG. 18 or Step 1722 in FIG. 17.

In Box 1834, the sub-process Calculate Predicate for Children may be called from Step 2066 in FIG. 20, Step 1942 in FIG. 19 or Step 1830 in FIG. 18. The sub-process will calculate the Predicate of STC that would have been set by the caller and put the result in WPRED before resuming the process at the caller's position.

Step 1836 sets Keep Stream to Calculate KSTC to STC. Step 1838 sets STC to the first mChildren in STC and clears WPRED. Step 1840 inspects STC to determine if it is clear. If no, Step 1842 inspects mSubject of mTransient in STC to determine if it is true. If no, Keep Stream KS is set to SM at Step 1844. Step 1846 sets SM to STC. Step 1848 calls the sub-process Calculate Predicate for Stream at Step 1802 in FIG. 18. Step 1850 sets SM to KS. Step 1852 sets WPRED to RP calculated at Step 1848 and the process proceeds to Step 1854. If yes at Step 1842, the process proceeds to Step 1854.

Step 1854 sets STC to the following mChildren of mParent of mTransient in STC and Steps 1840 to 1854 are repeated until all mChildren were processed, at which point Step 1840 will succeed. If Step 1840 succeeds, Step 1856 sets STC to KSTC. Step 1858 resumes the process following Step 2066 in FIG. 20, Step 1942 in FIG. 19 or Step 1830 in FIG. 18, depending on which step called the sub-process.

FIG. 19 depicts a flow scheme for a Calculate Predicate for NOUN_PHRASE Stream sub-process in the preferred embodiment of the invention.

The sub-process assumes that SM is set to the TReco which stream needs to be calculated. It also assumes that SM has a mPartOfSPeech value of NOUN_PHRASE. Upon completion, the sub-process will have set Result Predicate RP to the Predicate holding the conceptual representation of SM.

In Step 1902, the Calculate Predicate for NOUN_PHRASE Stream sub-process is called from Step 1824 in FIG. 18. Step 1904 sets Direction DIR to SAMENODE. Step 1906 sets Depth DPT to SAMELEVELORLOWER. Step 1908 sets Part of Speech POSS to "GERUNDIVE_PHRASE". Step 1910 calls the Find Packet sub-process at Step 2102 in FIG. 21.

Step 1912 inspects Find Packet Result FPR, which could have been set in Find Packet sub-process, to determine if it is clear. If no, the process proceeds to Step 1954. If yes, Step 1914 sets POSS to "REL_CLAUSE" and Step 1916 calls the Find Packet sub-process at Step 2102 in FIG. 21. Step 1918 inspects FPR to determine if it is clear. If no, the process proceeds to Step 1954. If yes, POSS is set to "NOUN|PLURAL|PROPER_NOUN|TIME|DATE|PRONOUN" at Step 1920 and Step 1922 calls the Find Packet sub-process at Step 2102 in FIG. 21.

Step 1924 inspects FPR to determine if it is clear. If yes, the process proceeds to Step 1954. If no, HR is set to true and SM is set to FPR at Step 1926. Step 1928 inspects SBJ to determine if it is clear. If yes, Put in Subject PiS is set to true at Step 1930 and the process proceeds to Step 1934. If no, the process proceeds to Step 1932 where PiS is set to false, and the process proceeds to Step 1934.

Step 1934 sets Keep Working Predicate KWPRED to WPRED. Step 1936 calls Calculate Predicate for Stream at Step 1802 in FIG. 18. Step 1938 sets WPRED to RP. Step 1940 sets STC to SW. Step 1942 calls the sub-process Calculate Predicate for Children at Step 1834 in FIG. 18.

Step 1944 inspects PiS to determine if it is true. If no, the process proceeds to Step 1950. If yes, SBJ is set to WPRED at Step 1946 and mSubject of mTransient in SM is set to true at Step 1948, and the process proceeds to Step 1950. Step 1950 sets RP to WPRED. Step 1952 sets WPRED to KWPRED.

Step 1954 resumes the process following Step 1824 in FIG. 18.

FIG. 20 depicts a flow scheme for a Calculate Predicate for SENTENCE Stream sub-process in the preferred embodiment of the invention.

The sub-process assumes that SM is set to the TReco which stream needs to be calculated. It also assumes that SM has a mPartOfSpeech value of SENTENCE. Upon completion, the sub-process will have set Result Predicate RP to the Predicate holding the conceptual representation of SM.

In Step 2002, the Calculate Predicate for SENTENCE Stream sub-process is called from Step 1820 in FIG. 18. Step 2004 sets HR to true. Step 2006 sets Keep Subject KSBJ to SBJ. Step 2008 clears SBJ.

The Find Packet sub-process may have a slightly different behavior depending if Find Packet Exclusion FPE is true or false. When true, Find Packet shall never set Find Packet Result FPR to the same value as before until Find Packet Exclusion List is cleared. If FPE is false, there are no restrictions on what value may be set in FPR.

In Step 2010, FPE is set to true. Step 2012 sets Keep Stream KS to Stream. Step 2014 sets DIR to SAMENODE. Step 2016 sets DPT to SAMELEVELORLOWER. Step 2018 sets POSS to "NOUN_PHRASE". Step 2020 calls the Find Packet sub-process at Step 2102 in FIG. 21.

In Step 2022, FPR is inspected to determine if it is clear. FPR should have been set by the Find Packet sub-process at Step 2020. If yes, the process proceeds to Step 2054. If FPR is not clear at Step 2022, Step 2024 sets SM to FPR. Step 2026 sets SM to mParent of mTransient in SM. Step 2028 inspects SM to determine if it is clear. If yes, the process proceeds to Step 2050 where SM is set to KS and the process proceeds then to Step 2052. If not, Step 2030 inspects mPartOfSpeech in SM to determine if it is SENTENCE. If not, Step 2026 is reprocessed. If so, Step 2032 sets Subject Search SS to true.

Step 2034 sets FPE to false. Step 2036 sets SM to FPR. Step 2038 calls the sub-process Calculate Predicate for Stream at Step 1802 in FIG. 18.

In Step 2040, FPE is set to true. Step 2042 sets SS to false. Step 2044 inspects SBJ to determine if it is clear. If no, the process proceeds to Step 2048. If yes, Step 2046 applies the Find Packet Exclusion by adding the value of FPR to the list of values that FPR may not be set to and the process proceeds to Step 2048. At Step 2048 SM is set to KS, and the process proceeds to Step 2052.

In Step 2052, SBJ is inspected to determine if it is clear. If yes, Step 2014 is reprocessed. If not, Step 2054 sets FPE to false. Step 2056 clears the Find Packet Exclusion list so that every single value is allowed in FPR.

In Step 2058, SBJ is inspected to determine if it is clear. If yes, SBJ is set to Report Subject RS at Step 2060 and the process proceeds to Step 2064. If not, RS is set to SBJ at Step 2062 and the process proceeds to Step 2064.

In Step 2064, STC is set to SM. Step 2066 calls the Calculate Stream for Children sub-process at Step 1834 in FIG. 18. Step 2068 sets SBJ to KS. Step 2070 sets RP to WPRED. Step 2072 resumes the process following Step 1820 in FIG. 18.

FIG. 21 depicts a flow scheme for a Find Packet sub-process in the preferred embodiment of the invention. The Find Packet sub-process sets FPR with the stream provided Current Packet CP, DIR, DPT and POSS. TReco structures are related to some others in a syntactic hierarchy, as shown in example in Box 2340 of FIG. 23. In order to go from one TReco to another in a syntactic hierarchy, the Find Packet sub-process is used.

Possible values for DIR are the following: BACKWARDSAMENODE, PREVIOUSSAMENODE, NEXTSAMENODE, FORWARDSAMENODE, BACKWARDOUTOFNODE, PREVIOUSOUTOFNODE, NEXTOUTOFNODE, FORWARDOUTOFNODE, UPONLY or SAMENODE.

Possible values for DPT are the following: SAMENODELEVEL, SAMENODELEVELORLOWER, LOWERNODELEVEL, SAMENODELEVELORUPPER, UPPERNODELEVEL, NOLEVELCONSTRAINT or CHILDNODE.

POSS contains a string value that represents the stream criteria to meet in order to be set in FPR prior to completion of the sub-process. Possible criteria are parts of speech and/or spellings and follow the same syntactic rules as a transform script line between Stream delimiters.

In Step 2102, the Find Packet sub-process is called from Step 2158 or Step 2164 in FIG. 21, Step 2020 in FIG. 20 or Step 1910, 1916 or 1922 in FIG. 19. Step 2103 clears LI. In Step 2104, POSS is inspected to determine if it is clear. If yes, the process proceeds to Step 2111. If not, Step 2106 sets CDN to POSS. Step 2108 sets LI to a new TScptLine. Step 2110 calls the sub-process Get Condition Entry at Step 1610 in FIG. 16, and the process proceeds to Step 2111.

In Step 2111, Use Packet UP is set to CP and Step 2112 clears FPR.

In Step 2114, DIR is inspected to determine if it is equal to UPONLY and DPT is inspected to determine if it is equal to UPPERNODELEVEL or SAMENODELEVELORUPPER. If no, the process proceeds to Step 2122. If yes, in Step 2116, DPT is inspected to determine if it is equal to UPPERNODELEVEL and UP is inspected to determine if it is not clear. If not, in Step 2117, FPR is inspected to determine if it is not clear and UP is also inspected to determine if it is not clear and the process proceeds to Step 2198. If so, Step 2118 calls the sub-process Evaluate Packet at Step 2202 of FIG. 22. Step 2119 sets FPR to Evaluate Packet Result EPR. Step 2120 sets UP to mParent of mTransient in UP. Steps 2117 to 2120 are repeated until FPR is not clear or the highest level in the syntactic hierarchy has been reached, and the process proceeds to Step 2198.

If no at Step 2144, in Step 2122, DIR is inspected to determine if it is equal to PREVIOUSOUTOFNODE or NEXTOUTOFNODE or FORWARDOUTOFNODE and DPT is inspected to determine if it is equal to SAMENODELEVEL. If no, the process proceeds to Step 2144. If yes, in Step 2123, mParent of mTransient in UP is inspected to determine if it is clear. If yes, the process proceeds to Step 2198. If no, at Step 2124, Stop Child Index SCI is cleared. Step 2126 clears Child Index CHI.

In Step 2128, DIR is inspected to determine if it is equal to PREVIOUSOUTOFNODE. If yes, Step 2130 sets CHI to mIndexInParent of mTransient in UP minus one. Step 2131 sets SCI to CHI and the process proceeds to Step 2136.

If DIR is not equal to PREVIOUSOUTOFNODE in Step 2128, Step 2132 inspects DIR to determine if it is equal to NEXTOUTOFNODE. If yes, Step 2133 sets CHI to mIndexInParent of mTransient in UP plus one. Step 2134 sets SCI to CHI and the process proceeds to Step 2136.

If DIR is not equal to NEXTOUTOFNODE at Step 2132, Step 2135 sets CHI to mIndexInParent of mTransient in UP plus one and the process proceeds to Step 2136.

Step 2136 sets Parent PRT to mParent of mTransient in UP.

In Step 2138, SCI is inspected to determine if it is clear or not clear and greater than CHI, and CHI is inspected to determine if it is smaller than number of mChildren in PRT and FPR is inspected to determine if it is clear. If no, the process proceeds to Step 2198. If yes, Step 2139 sets UP to element CHI of mChildren in PRT. Step 2140 calls the sub-process Evaluate Packet at Step 2202 of FIG. 22. Step 2141 sets FPR to EPR and Step 2142 increases the value of CHI by one. Steps 2138 to 2142 are repeated until the condition at Step 2138 fails, at which point the process proceeds to Step 2198.

At Step 2198, the process resumes at Step 2158 or Step 2164 in FIG. 21, Step 2020 of FIG. 20 or Step 1910, 1916 or 1922 in FIG. 19 depending on which step called the sub-process.

If no at Step 2122, in Step 2144, DIR is inspected to determine if it is equal to SAMENODE and DPT is inspected to determine if it is equal to SAMENODELEVELORLOWER or LOWERNODELEVEL or CHILDNODE. If no, the process proceeds to Step 2168. If yes, Step 2145 sets Use Packet Index UPI to 0.

In Step 2146, UPI is inspected to determine if it is smaller than the number of mChildren in UP and FPR is inspected to determine if it is clear. If no, the process proceeds to Step 2196. If yes, Step 2148 sets Keep Use Packet KUP to UP. Step 2149 sets UP to the element UPI of mChildren in UP. Step 2150 calls the Evaluate Packet sub-process at Step 2202 of FIG. 22. Step 2152 sets FPR to EPR.

In Step 2153, FPR is inspected to determine if it is clear. If so, Step 2154, DPT is inspected to determine if it is CHILDNODE. If not, DIR is set to BACKWARDSAMENODE at Step 2156. Step 2158 calls the sub-process Find Packet at Step 2102 in FIG. 21. Step 2159 inspects FPR to determine if it is clear. If no, the process proceeds to Step 2165. If yes, UP is set to element UPI of mChildren in UP at Step 2160. Step 2162 sets DIR to FORWARDSAMENODE. Step 2164 calls the sub-process Find Packet at Step 2102 in FIG. 21. The sub-process then goes to Step 2165.

In Step 2165, UPI is increased by one. Step 2166 sets UP to KUP. Steps 2146 to 2166 are repeated until the condition at Step 2146 fails, at which point the process proceeds to Step 2196.

If no at Step 2144, in Step 2168, DIR is inspected to determine if it is equal to BACKWARDSAMENODE or FORWARDSAMENODE and DPT is inspected to determine if it is equal to SAMENODELEVELORLOWER or LOWERNODELEVEL. If no, the process proceeds to Step 2196. If yes, Break Level BL is cleared at Step 2169.

In Step 2170, DPT is inspected to determine if it is SAMENODELEVELORLOWER. If yes, BL is set to mLevel of mTransient in UP at Step 2171. If no, Step 2193 inspects DPT to determine if it is LOWERNODELEVEL. If no, the process proceeds to Step 2172. If yes, Step 2194 sets BL to mLevel of mTransient in UP plus one and then invokes Step 2172.

If yes at Step 2170, BL is set to mLevel of mTransient in UP at Step 2171 and the process proceeds to Step 2172. In Step 2172, DIR is inspected to determine if it is FORWARDSAMENODE. If not, Step 2174 sets UP to mParent of mTransient in UP. Step 2175 sets Start Index SI to mIndexInParent of mTransient in UP minus one. Step 2176 sets Drill Forward DF to false. Step 2178 calls the sub-process Drill for Packet at Step 2222 of FIG. 22. Step 2179 sets FPR to Drill Packet Result DPR and the process then proceeds to Step 2196.

If DIR is equal to FORWARDSAMENODE at Step 2172, Step 2180 sets KUP to UP. Step 2181 sets UP to mParent of mTransient in UP. Step 2182 sets SI to mIndexInParent of mTransient in UP plus one. Step 2183 sets DF to true. Step 2184 calls the sub-process Drill for Packet at Step 2222 of FIG. 22. Step 2185 sets FPR to DPR.

In Step 2186, FPR is inspected to determine if it is clear. If no, the process proceeds to Step 2196. If yes, Step 2188 sets UP to KUP. Step 2189 sets SI to 0. Step 2190 calls the sub-process Drill for Packet at Step 2222 of FIG. 22. Step 2192 sets FPR to DPR and the process proceeds to Step 2196.

If at Step 2170 DPT is not SAMENODELEVELORLOWER, Step 2193 inspects DPT to determine if it is LOWERNODELEVEL. If so, Step 2194 sets BL to mLevel of mTransient in UP plus one and then invokes Step 2172.

At Step 2196, the process resumes at Step 2158 or Step 2164 in FIG. 21, Step 2020 of FIG. 20 or Step 1910, 1916 or 1922 in FIG. 19, depending on which Step called the sub-process.

FIG. 22 depicts a flow scheme for an Evaluate Packet sub-process and a Drill for Packet sub-process in the preferred embodiment of the invention.

The Evaluate Packet sub-process is used from the Find Packet sub-process to evaluate a stream in regards to the optional condition that was passed in CDN to Find Packet which generated LI in Steps 2106 to 2110 in FIG. 21. The Evaluate Packet also considers the exclusion list while being interpreted. As a general rule to use the Evaluate Packet sub-process, the exclusion list contains a list of values that EPR may not be set to.

In Step 2202, the Evaluate Packet sub-process is called from Step 2240 in FIG. 20 or Step 2118, 2140 or 2150 in FIG. 21. The Evaluate Packet sub-process assumes that UP was set to the TReco to evaluate and the LI is clear or contains the condition to evaluate.

In Step 2204, EPR is cleared. In Step 2206, LI is inspected to determine if it is clear. If not, Step 2208 Word WRDD is set to UP. Step 2210 then calls the Test Stream sub-process at Step 1202 in FIG. 12. Step 2212 inspects FS to determine if it is true. If yes, Step 2214 is invoked.

If Step 2206 determined that LI is clear, the process proceeds to Step 2214. At Step 2214, the exclusion list is inspected to determine if UP is part of it. If no, Step 2216 sets EPR to UP and the process proceeds to Step 2218. If yes at Step 2214, the process proceeds to Step 2218.

Step 2218 resumes the process following Step 2240 in FIG. 22 or Step 2118, 2140 or 2150 in FIG. 21, depending on which step called the sub-process.

The Drill for Packet sub-process is also used from the Find Packet sub-process to find a packet in any children, referred to in mChildren of a TReco structure, or any of its children if not found.

In Step 2222, the Drill for Packet sub-process is called from Step 2250 in FIG. 22 or Step 2178, 2184 or 2190 in FIG. 21. The Drill for Packet sub-process assumes that UP was set by the caller to the TReco to start drilling from, SI is set to the starting index of the mChildren of UP to start drilling, DF is set to true if the sub-process needs to increment SI or false if the sub-process needs to decrement SI, BL is set to the break level and it is also assumed that LI is cleared or contains the condition to meet for a stream to be successfully detected. The sub-process will set Drill for Packet Result DPR to the stream that met conditions provided UP, SI, DF and LI.

In Step 2224, Packet Index PI is set to SI. Step 2228 sets Drill Keep Use Packet DKUP to UP. Step 2230 clears DPR.

In Step 2232, PI is inspected to determine if it is greater or equal to 0 and smaller than the number of elements in mChildren of UP and DPR is also inspected to determine if it is clear. If no, UP is set to DKUP at Step 2260 and the process proceeds to Step 2262. If yes, Step 2234 sets UP to DKUP. Step 2236 sets UP to the element PI of mChildren in UP.

In Step 2238, mLevel of mTransient in UP is inspected to determine if it is greater or equal to BL. If no, the process proceeds to Step 2246. If yes, Step 2240 calls the Evaluate Packet sub-process at Step 2202 of FIG. 22. Step 2242 sets DPR to EPR and the process proceeds to Step 2244.

In Step 2244, DPR is inspected to determine if it is clear. If no, the process proceeds to Step 2254. If yes, the process proceeds to Step 2246.

Step 2246 sets Keep Starting Index KSI to SI. Step 2248 sets SI to 0. Step 2250 calls the Drill for Packet sub-process at Step 2222 in FIG. 22. Step 2252 sets SI to KSI and the process proceeds to Step 2254.

If DPR was determined not to be clear at Step 2244 or following Step 2252, Step 2254 inspects DF to determine if it is true. If yes, Step 2256 increments PI by one and the process proceeds to Step 2232. If no, Step 2258 decreases PI by one and the process proceeds to Step 2232. Step 2232 is then re-invoked until it fails to verify its condition. At which point, Step 2260 sets UP to DKUP. Step 2262 resumes the process following Step 2250 in FIG. 22 or Step 2178, 2184 or 2190 in FIG. 21, depending on which step called the sub-process.

FIG. 23 depicts a flow scheme for the Set Transient Information sub-processes in the preferred embodiment of the invention. The Set Transient Information sub-process sets all values in mTransient in a TReco so that hierarchical order is made out of a TReco and its dependants, i.e. the TReco that were used in order to build it in mChildren in TReco. The result is that a hierarchy like the one shown in Box 2340 in FIG. 23 is produced. The programming engineer may then go from one stream to another within the hierarchy through the sub-process Find Packet explained in FIG. 21.

In Box 2302, a predetermined and programmed into the system TTransient structure is defined as a mParent TReco, a mUpMostParent TReco, a mIndexInParent number, a mLevel number and a logical value mSubject. The TTransient structure is used in a mTransient of a TReco. The Set Transient Information sub-process will set the transient information of SM and its dependants in mChildren in SM.

In Step 2304, the Set Transient Information sub-process is called from Step 2332 in FIG. 23 or Step 1714 in FIG. 17. Step 2306 sets mSubject of SM to false.

In Step 2308, mParent of mTransient in SM is inspected to determine if it is clear. If yes, mUpMostParent of mTransient in SM is set to SM at Step 2310. Step 2312 sets mIndexInParent of mTransient in SM to −1. Step 2314 sets mLevel of mTransient in SM to 0 and the process proceeds to Step 2320.

If mParent in mTransient in SM is not clear at Step 2308, Step 2316 sets mUpMostParent of mTransient in SM to mUpMostParent of mParent of mTransient in SM. Step 2318 sets mLevel of mTransient in SM to mLevel of mParent of mTransient in SM plus one, and the process proceeds to Step 2320.

Step 2320 sets Child Index CHI to 0. Step 2322 inspects mChildren in SM to determine if it contains more than CHI elements. If no, the process proceeds to Step 2338. If yes, Step 2324 sets KS to SM. Step 2326 sets SM to the element CHI in mChildren in SM. Step 2328 sets mParent in SM to KS. Step 2330 sets mIndexInStream of mTransient in SM to CHI. Step 2332 calls the sub-process Set Transient Information at Step 2304 of FIG. 23. Step 2334 sets SM to KS. Step 2336 increments the value of CHI by one. Step 2322 is then re-invoked until CHI becomes equal to the number of mChildren in SM. Once CHI is greater or equal to the number of elements in mChildren in SM, the process proceeds to Step 2338.

In Box 2340, an example of a syntactic hierarchy produced by the Set Transient Information sub-process is shown.

Optimization

Although the detailed description details a fully functional expression of this invention, the operation of this embodiment may be improved by the following applications.

1. Steps 1036 to Step 1050 in FIG. 10 do not need to be repeated for each utterance. Instead, those steps could be executed for the first utterance, and then a logical flag could be set to true to identify that transform scripts were loaded for future utterances.

2. By sorting all phonemes in each time-slice from the most probable ones (highest probability) to the least probable ones (lowest probability), the words list will consequently be sorted from the highest score to the lowest score since search paths would have had process most probable phonemes prior to least probable phonemes. By having the words list sorted out from the highest scored stream to the lowest scored stream for streams that start at the same starting phoneme index, the Syntactic Analysis process will consequently generate words sequences that are also sorted from the highest scored to the lowest scored. This is beneficial since no extra processing is required than sorting phonemes in a single time-slice of the phoneme stream in order to get syntactic hierarchy that are also sorted. Each SENTENCE part of speech produced by the Syntactic Analysis process would then sequentially have been produced in order, from the most probable based on the Phoneme Recognition process, to the least probable. Processing SENTENCE parts of speech in such order is way better than processing them in a trivial order, since, as described in this invention, conceptual analysis terminates once it detects its first successful response Predicate.

3. A Predicate structure could be expressed as a real structure instead of a string. That structure would hold a mPrimitive string (containing the primitive) and a one-dimensional array of RoleFiller structures. Each RoleFiller structure would hold a mRoleName string (containing the role name) and a mFiller that is either a) a Predicate structure, b) a string holding a variable name, or c) a string holding any value.

4. The Predicate structure described in (3) of this optimization section would reside in an address in memory. Once a Predicate Builder script generates a Predicate structure, it would then build the Predicate structure in memory and add a predefined prefix that would state the address of where the Predicate structure resides in memory. That way, in future manipulations of the Predicate structure, once the predefined prefix containing the address is detected, instead of rebuilding the Predicate structure, a simple reference to the existing Predicate structure residing at the specified address would be requested—consequently saving significant processing time.

5. The Phoneme Recognition and Phoneme Stream Analysis processes could be united into one unique process in such a way that a phoneme stream would not need to be encoded in the Phoneme Recognition process, only to be decoded in the Phoneme Stream Analysis process. Such encoding, as the one shown in the preferred embodiment of the invention, is useful in order to trace potential weak links related to Phoneme Recognition, but requires significant processing to decode when performing Phoneme Stream Analysis. Instead, search paths management could be processed immediately during Phoneme Recognition, potentially saving precious time.

6. Caching of conceptual representations already calculated for streams would significantly improve performance. For each stream in a syntactic hierarchy, a caching mechanism could be implemented so that it would be clear at the start of calculating a Predicate structure for a given syntactic hierarchy. Once a Predicate structure was calculated for a stream in the syntactic hierarchy, the Predicate structure would be stored as a reference from the stream. That way, if future Predicate Builder script operations require the same stream to be calculated again, the cached value would be used instead of the entire process to recalculate and get to the same Predicate structure as a result.

7. The Predicate Builder scripting language is an interpreted language. In order to get better performance from Conceptual Analysis, a compiler could be written for the Predicate Builder scripting language. The process of writing compilers is well know to those skilled in the art and further explanation is not required since there is nothing processed specially in the Predicate Builder scripting language described in the invention.

8. In order to minimize how many sequences of words are successfully generated during the Syntactic Analysis process, adding the constraint where only words formed from a unique cluster could be sequenced would help significantly. That could be specified as a configuration parameter to the system for select cases. By way of example and not intending to limit the invention in any manner, a flight response system could implement that added constraint. Since only one speaker is expected to utter a command, it is realistic to expect that speaker to have produced phonemes from a single cluster.

9. Should a speaker-independent approach using clusters be out of reach for any given reason to someone using this invention in a telephony context, enrollment could indeed be allowed. Then, a technology similar to caller-ID in a telephony environment could identify the caller prior to speech processing. By assuming that a specific caller will always initiate the call from a unique phone number—or at least that caller would have identified which phone numbers he is potentially going to use—an association to the speaker's voice model would then be made prior to speech processing which would not require clusters anymore.

10. Should the use of phonemes not produce satisfactory results during the Phoneme Recognition process, triphones that maps to phonemes could be used instead. Triphones are defined and discussed in Jurafsky, Daniel and Martin, James H., Speech and language processing, Prentice Hall, New Jersey, 2000, pages 250-251 and 273-274, the disclosure of which are herein incorporated by reference in a manner consistent with this disclosure. Those skilled in the art are well aware of pronunciation differences of phonemes provided their proximity to other phonemes. Each variation in phoneme pronunciation is called a triphone. Instead of having a cluster voice model holding a unique set of value for each phoneme, it could hold different set of values (one for each triphone of each phoneme) that are referred by the pattern recognition algorithm. The Phoneme Recognition process would then proceed at comparing each triphones to the audio data in the current time-slice. Once one of them succeed, the phoneme is added to the phoneme stream and other triphones for the detected phoneme are not processed for that time-slice since there is no added value at detecting two identical phonemes for the same time-slice.

11. During the Phoneme Recognition process, should phoneme detection not be accurate enough to always recognize a word because some phonemes are not well detected or some time-slices do not detect a phoneme when they should, an error tolerant algorithm could be used to correct such behavior. The error tolerant algorithm could be implemented in such a way that, as an example, a search path would not be dropped immediately if it can't forward in the index tree, instead, it would be dropped only if two consecutive time-slices can't forward in the index tree. As an example, if a speaker utters "I'm comin(g) home" without pronouncing the 'g' phoneme at the end of "coming", an error tolerant algorithm could well have detected the word "coming" from that utterance even though a phoneme is missing. So, an error tolerant Phoneme Stream Analysis process would have dual purposes. First, it would cover many cases where people do not fully pronounce each word in their utterance, even covering for many slang cases. Second, it would make the Phoneme Stream Analysis process more defensive since some phonemes in utterances may be so imperceptible that a Phoneme Stream Analysis process that is not error tolerant may have some difficulties processing the speech input successfully.

12. Error tolerance during the Phoneme Stream Analysis process may not be limited to dropped phonemes as stated in the previous point. It may also be used for a) wrong phonemes, and/or b) dropped phonemes. Performing such error tolerance would obviously increase significantly the size of the candidate words list and a revised scoring mechanism that accounts for candidate words that were produced as a consequence of the error tolerance would be beneficial. This extended error tolerance approach would also only allow one consecutive misrecognized or dropped phoneme before dropping the search path. Two consecutive errors of different natures (e.g. one dropped phoneme followed by one extra phoneme) would also signal the drop of a search path. In order to handle the wrong phoneme error tolerant scenario, once recognized phonemes were processed for all search paths in a time-slice, all un-recognized phonemes would need to be called within that same time-slice so that search paths go forward when allowed by the dictionary. In order to handle the extra phoneme error tolerant scenario, once processing of recognized phonemes is done for a time-slice, promotion of all search paths that did not contain any prior error tolerance related error needs to occur.

13. The Phoneme Recognition process may have some difficulties detecting some triphones—i.e. some phonemes when they are in proximity to other phonemes. In which case, the invention could be adapted for the phoneme to be ignored for targeted words that are difficult to recognize (create two pronunciations for the same word, one that has the phoneme and the other that does not), or even to remove entirely from the invention the triphone or even the phoneme itself. As an example and not intending to limit the invention in any manner, if an implementation of the invention has some serious problem detecting the 't' sound during the Phoneme Recognition process, the 't' sound could, as an extreme counter measure to that, be completely ignored. Then all words in the dictionary would need to have their 't' phoneme removed from their pronunciation, and the invention would still be successful at identifying each spoken word although there would be a higher ratio of mismatches for each positive match.

14. Because of the way humans form utterances, often hesitating or even mumbling within an utterance although they are indeed forming a syntactic organization that can produce a successful conceptual representation, the dictionary could hold pronunciation for mumbling words (like 'eh' in "I'd like to 'eh' know when 'eh' flight 600 will arrive"). This 'eh' pronunciation could refer to a word that would have the spelling "<Eh-INTERJECTION>", a Predicate Builder script that is NULL (not holding any meaning related to the word part of speech pair) and the part of speech INTERJECTION. An INTERJECTION part of speech would be specially handled during the Syntactic Analysis process in the sense that a mismatch on an INTERJECTION part of speech could not make a sequence of words fail for any transform script line that is being validated. So, the 'eh' sound could be found anywhere in the utterance without risking to invalidate any syntactic sequence of words. The same approach could be used more generically for other INTERJECTION words like "please" as an example. The sentence "I'd like to 'please' know when flight 600 will arrive" is valid, as well as the sentence "I'd like to know when flight 600 will arrive 'please'". That is a demonstration of the fact that 'please' is an INTERJECTION part of speech and that it is desired that the Syntactic Analysis process not to fail sequences of words because of the presence of an INTERJECTION part of speech in it.

15. A top-down parsing algorithm in the Syntactic Analysis process would significantly improve performance for cases where large quantity of words needs to be analyzed for syntactically valid sequences to be formed. Since SENTENCE parts of speech are the only ones that are truly important to the preferred embodiment of this invention (so that they can then be analyzed conceptually), a top-down parsing algorithm would mean that SENTENCE parts of speech could be formed first (without having to go through previous sequence validation like NOUN-PHRASE as in the bottom-up parsing algorithm described in this application). Any top-down parsing algorithm that is implemented should be flexible enough to enclose all permutation rules for this invention to enable dictation content to be processed conceptually. The top-down parsing algorithm would most probably take the form of a significantly large index structure that would hold all parts of speech sequences that may generate a SENTENCE part of speech which would have been produced by analyzing all transform scripts that could be built following the same rules as the ones described in the preferred embodiment of this invention. The top-down algorithm could then refer to that specially built index structure in order to validate sequences of words so that SENTENCE parts of speech are built immediately—without preliminary steps like creating NOUN-PHRASE parts of speech as required in a bottom-up parsing. Once a SENTENCE part of speech was built successfully, the Syntactic Analysis process could then apply a bottom-up parsing so that enclosed parts of speech are also generated and that conceptual analysis could process equally as if only a bottom-up parsing algorithm was involved.

16. For the invention to be used to dictate freely content in a word processor, any Hidden-Markov-Model implementation—where the N-best words are used as input for Syntactic Analysis, and N-best words of sequences of words returned by HMM algorithm are also taken into consideration—or the Phoneme Recognition process described in this application could be used to generate the words list while keeping trace of each word starting phoneme index in the phoneme stream. The Syntactic Analysis process would then validate words sequences as described in this invention. Once SENTENCE parts of speech are identified, there are two major improvements over state of the art dictation speech recognition technology that do not use conceptual analysis: a) accuracy would improve since syntactic and conceptual aspects of the speech would be taken into consideration during speech processing, and b) while getting a valid concept, as a residual is the syntactic organization that was used to produce such valid concept; the programming engineer could then use that syntactic organization in order to infer punctuation requirements needed as part of dictated content—consequently generating punctuation in the dictated content without having the speaker explicitly dictating punctuation.

17. Bridging, as explained in FIG. 4 to FIG. 6, may also be used for phonemes that have close pronunciations. Step 564, 634 and 1108 would need to be modified in such a way that some predefined phonemes could be identified as a potential bridging that needs to happen if followed by some other predefined phonemes. As an example and not intending to limit the invention in any manner, if the 's' sound of 'this' is found to be close enough from the 'z' sound of 'zoo', in Step 634, while detecting that the last phoneme of a candidate word is 's', it could set the 's' entry in BL to true as well as the 'z' entry for the ending phoneme index in BL. Step 1108 would also need to implement a simple mechanism (probably a static mapping table of bridging phoneme sets) where the two phonemes are identified as ones that may have generated a bridge. That way, a sequence like "this zoo is near" would be successfully recognized for speakers that tend to perform more bridging than others.

EXAMPLES

The following examples are intended to further illustrate the application of the invention in a limited context, an airline response system, and is not intended to limit the invention in any manner.

Numerous inquiries were input into a sample airline response inquiry system according to the invention. For purposes of illustration and testing of the building of conceptually adequate responses to those inquiries, the following database was created to provide typical responsive reference data that may be found in such an application.

Flight Number: 122
Company: US
Origin Airport: DEN
Destination Airport: DFW
Status: INFLIGHT
Initial Departure Time: 13:15
Revised Departure Time: 13:23
Departure Gate: 15
Initial arrival Time: 15:13
Revised Arrival Time: 15:19
Arrival Gate: B 6
Flight Number: 320
Company: AA Origin Airport: LAS
Destination Airport: DFW
Status: INFLIGHT
Initial Departure Time: 13:20
Revised Departure Time: 14:35
Departure Gate: E 42
Initial Arrival Time: 16:20
Revised Arrival Time: 16:15
Arrival Gate: B 2
Flight Number: 1547
Company: DL
Origin Airport: LAX
Destination Airport: DFW
Status: ARRIVED
Initial Departure Time: 10:22
Revised Departure Time: 10:43
Departure Gate: 7
Initial Arrival Time: 13:30
Revised Arrival Time: 14:31
Arrival Gate: A 10
Flight Number: 1271
Company: UA
Origin Airport: BOS
Destination Airport: DFW
Status: ARRIVED
Initial Departure Time: 9:10
Revised Departure Time: 9:25
Departure Gate: C 76
Initial Arrival Time: 14:10
Revised Arrival Time: 14:25
Arrival Gate: C 4
Flight Number: 600
Company: UA
Origin Airport: JFK
Destination Airport: DFW
Status: ARRIVED
Initial Departure Time: 8:52
Revised Departure Time: 8:59
Departure Gate: B 21
Initial Arrival Time: 14:20
Revised Arrival Time: 14:32
Arrival Gate: B 2

Example 1

The following inquiry was input into an embodiment of the system and method of the invention, with the corresponding response based on the reference data contained from the flight database. The data was processed using a 2.4 GHz Pentium 4 computer that has 1 GB of RAM.

Q: Is flight six hundred delayed?
A: United Airline flight 600 arrived at 2 32 PM and was late by 12 minutes.
Syntactic Organization:
Spelling: is flight 600 delayed
is flight 600 delayed <- [SENTENCE, SENTENCE CONSTRUCTION 1, level 0, index -1]
is flight 600 delayed <- [VERB_PHRASE, VERB PHRASE CONSTRUCTION 9, level 1, index 0]
is flight 600 <- [VERB_PHRASE, VERB PHRASE CONSTRUCTION 1, level 2, index 0]
is <- [VERB, WORD, level 3, index 0]
flight 600 <- [NOUN_PHRASE, PLAIN NOUN PHRASE CONSTRUCTION, level 3, index 1]
flight 600 <- [NOUN, FLIGHT INTEGRATION, level 4, index 0]
flight 600 <- [FLIGHT, FLIGHT IDENTIFICATION CONSTRUCTION 2, level 5, index 0]
flight <- [NOUN, WORD, level 6, index 0]
600 <- [CARDINAL_NUMBER, WORD, level 6, index 1]
6 <- [CARDINAL_NUMBER, WORD, level 7, index 0]
100 <- [CARDINAL_NUMBER, WORD, level 7, index 1]
delayed <- [ADJECTIVE_PHRASE, ADJECTIVE PHRASE CONSTRUCTION 1, level 2, index 1]
delayed <- [ADJECTIVE, WORD, level 3, index 0]
Conceptual Analysis Result:
[MOOD
(CLASS:INTEROGATIVE)
(OBJECT
[PP
(CLASS:VEHICLE)
(TYPE:AIRPLANE)
(COMPANY:UA)
(NUMBER:600)
(ORIGIN:JFK)
(DESTINATION:DFW)
(STATUS:ARRIVED)
(DEPARTURETIME:8:59)
(ARRIVALTIME:14:32)
(INITIALDEPARTURETIME:8:52)
(INITIALARRIVALTIME:14:20)
(DEPARTUREGATE:B 21)
(ARRIVALGATE:B 2)
(SPOKENCOMPANY:NONE)])
(QUERY:
[AIRLINEPOSTANALYSIS
(OPERATION:
[REPORT
(VALUE:DELTASTATUS)
OBJECT:
[PP
(CLASS:VEHICLE)
(TYPE:AIRPLANE)
(COMPANY:UA)
(NUMBER:600)
(ORIGIN:JFK)
(DESTINATION:DFW)
(STATUS:ARRIVED)
(DEPARTURETIME:8:59)
(ARRIVALTIME:14:32)
(INITIALDEPARTURETIME:8:52)
(INITIALARRIVALTIME:14:20)
(DEPARTUREGATE:B 21)
(ARRIVALGATE:B 2)
(SPOKENCOMPANY:NONE)])])]) (TIME_OF_ANALYSIS:Thu Jun 19 20:20:38 2003)]
Time Spent:
streaming and stream analysis -> 15 ms
syntactic analysis -> 0 ms
conceptual analysis -> 16 ms
The system arrived at the indicated response after approximately 31 ms from the time of the inquiry input.

Example 2

Similar to Example 1, the following inquiry was input into the same system, with the indicated response.
Q: When did flight one twenty two leave?
A: US airways flight 122 left at 1 23 PM.
Syntactic Organization:
Spelling: when did flight 122 leave
when did flight 122 leave <- [SENTENCE, SENTENCE CONSTRUCTION 1, level 0, index -1]

when did flight 122 leave <- [VERB_PHRASE, VERB PHRASE CONSTRUCTION 10, level 1, index 0]
   when <- [WH_PRONOUN, WORD, level 2, index 0]
   did flight 122 leave <- [VERB_PHRASE, VERB PHRASE CONSTRUCTION 7, level 2, index 1]
     did <- [VERB, WORD, level 3, index 0]
     flight 122 <- [NOUN_PHRASE, PLAIN NOUN PHRASE CONSTRUCTION, level 3, index 1]
     flight 122 <- [NOUN, FLIGHT INTEGRATION, level 4, index 0]
     flight 122 <- [FLIGHT, FLIGHT IDENTIFICATION CONSTRUCTION 2, level 5, index 0]
       flight <- [NOUN, WORD, level 6, index 0]
       122 <- [CARDINAL_NUMBER, WORD, level 6, index 1]
       1 <- [CARDINAL_NUMBER, WORD, level 7, index 0]
       22 <- [CARDINAL_NUMBER, WORD, level 7, index 1]
       20 <- [CARDINAL_NUMBER, WORD, level 8, index 0]
       2 <- [CARDINAL_NUMBER, WORD, level 8, index 1]
     leave <- [VERB, WORD, level 3, index 2]
Conceptual Analysis Result:
[MOOD
(CLASS:INTEROGATIVE)
(QUERY:
[AIRLINEPOSTANALYSIS
(OPERATION:
[REPORT
(VALUE:DEPARTURETIME)
[OBJECT:
[PP
(CLASS:VEHICLE)
(TYPE:AIRPLANE)
(COMPANY:US)
(NUMBER:122)
(ORIGIN:DEN)
(DESTINATION:DFW)
(STATUS:INFLIGHT)
(DEPARTURETIME:13:23)
(ARRIVALTIME:15:19)
(INITIALDEPARTURETIME:13:15)
(INITIALARRIVALTME:15:13)
(DEPARTUREGATE:15)
(ARRIVALGATE:B 6)
(SPOKENCOMPANY:NONE)])])])
[OBJECT:
[PP
(CLASS:VEHICLE)
(TYPE:AIRPLANE)
(COMPANY:US)
(NUMBER:122)
(ORIGIN:DEN)
(DESTINATION:DFW)
(STATUS:INFLIGHT)
(DEPARTURETIME:13:23)
(ARRIVALTIME:15:19)
(INITIALDEPARTURETIME:13:15)
(INITIALARRIVALTME:15:13)
(DEPARTUREGATE:15)
(ARRIVALGATE:B 6)
(SPOKENCOMPANY:NONE)])
(ASSUMPTION_ON_TIME_OF_EVENT:<PRESENT_TIME)
TIME_OF_ANALYSIS:Thu Jun 19 20:20:40 2003)]
  Time Spent:
  streaming and stream analysis -> 16 ms
  syntactic analysis -> 15 ms
  conceptual analysis -> 32 ms
  The total approximate analysis time was 63 ms.

Example 3

The following inquiry was made into the same system as Examples 1 and 2, with the indicated response.
Q: Has united airlines flight six hundred arrived yet?
A: Yes, United Airline flight 600 arrived at 2 32 PM.
Syntactic Organization:
Spelling: has United airlines flights 600 arrived yet
has United airlines flights 600 arrived yet <- [SENTENCE, SENTENCE CONSTRUCTION 1, level 0, index -1]
  has United airlines flights 600 arrived yet <- [VERB_PHRASE, VERB PHRASE CONSTRUCTION 5, level 1, index 0]
   has <- [VERB, WORD, level 2, index 0]
   United airlines flights 600 <- [NOUN_PHRASE, PLAIN NOUN PHRASE CONSTRUCTION, level 2, index 1]
   United airlines flights 600 <- [NOUN, FLIGHT INTEGRATION, level 3, index 0]
   United airlines flights 600 <- [FLIGHT, FLIGHT IDENTIFICATION CONSTRUCTION 2, level 4, index 0]
    United airlines <- [AIRLINE, AIRLINE IDENTIFICATION, level 5, index 0]
     United <- [AIRLINE, WORD, level 6, index 0]
     airlines <- [NOUN, WORD, level 6, index 1]
    flights <- [NOUN, WORD, level 5, index 1]
    600 <- [CARDINAL_NUMBER, WORD, level 5, index 2]
    6 <- [CARDINAL_NUMBER, WORD, level 6, index 0]
    100 <- [CARDINAL_NUMBER, WORD, level 6, index 1]
   arrived yet <- [GERUNDIVE_PHRASE, GERUNDIVE PHRASE CONSTRUCTION, level 2, index 2]
    arrived <- [GERUNDIVE_VERB, GERUNDIVE ED, level 3, index 0]
     arrived <- [VERB, WORD, level 4, index 0]
    yet <- [ADVERB, WORD, level 3, index 1]
Conceptual Analysis Result:
[MOOD
(CLASS:INTEROGATIVE)
(OBJECT
[PP
(CLASS:VEHICLE)
(TYPE:AIRPLANE)
(COMPANY:UA)
(NUMBER:600)
(ORIGIN:JFK)
(DESTINATION:DFW)
(STATUS:ARRIVED)
(DEPARTURETIME:8:59)
(ARRIVALTIME:14:32)
(INITIALDEPARTURETIME:8:52)
(INITIALARRIVALTIME:14:20)
(DEPARTUREGATE:B 21)
(ARRIVALGATE:B 2)
(SPOKENCOMPANY:UA)])
(QUERY:
[AIRLINEPOSTANALYSIS
(OPERATION:
[REPORT
(VALUE:STATUSARRIVED)
(OBJECT:
[PP
(CLASS:VEHICLE)
(TYPE:AIRPLANE)
(COMPANY:UA)

(NUMBER:600)
(ORIGIN:JFK)
(DESTINATION:DFW)
(STATUS:ARRIVED)
(DEPARTURETIME:8:59)
(ARRIVALTIME:14:32)
(INITIALDEPARTURETIME:8:52)
(INITIALARRIVALTIME:14:20)
(DEPARTUREGATE:B 21)
(ARRIVALGATE:B 2)
(SPOKENCOMPANY:UA)])])])
(ASSUMPTION_ON_TIME_OF_EVENT:<PRESENT_TIME)
(TIME_OF_ANALYSIS:Thu Jun 19 20:20:41 2003)]
Time Spent:
streaming and stream analysis -> 16 ms
syntactic analysis -> 15 ms
conceptual analysis -> 16 ms
The result was reached in approximately 47 ms.

Example 4

Using the same system as Examples 1, 2 and 3, the following inquiry was input and the indicated response was returned.
Q: Will flight 600 arrive before long?
A: United Airline flight 600 already arrived 20 minutes ago.
Syntactic Organization:
Spelling: will flights 600 arrive before long
will flights 600 arrive before long <- [SENTENCE, SENTENCE CONSTRUCTION 1, level 0, index -1]
will flights 600 arrive before long<-[VERB_PHRASE, VERB PHRASE CONSTRUCTION 9, level 1, index 0]
will flights 600 arrive <- [VERB_PHRASE, VERB PHRASE CONSTRUCTION 5, level 2, index 0]
will <- [VERB, WORD, level 3, index 0]
flights 600 <- [NOUN_PHRASE, PLAIN NOUN PHRASE CONSTRUCTION, level 3, index 1]
flights 600 <- [NOUN, FLIGHT INTEGRATION, level 4, index 0]
flights 600 <- [FLIGHT, FLIGHT IDENTIFICATION CONSTRUCTION 2, level 5, index 0]
flights <- [NOUN, WORD, level 6, index 0]
600 <- [CARDINAL_NUMBER, WORD, level 6, index 1]
6 <- [CARDINAL_NUMBER, WORD, level 7, index 0]
100<-[CARDINAL_NUMBER, WORD, level 7, index 1]
arrive <- [GERUNDIVE_PHRASE, GERUNDIVE PHRASE CONSTRUCTION, level 3, index 2]
arrive <- [GERUNDIVE_VERB, WORD, level 4, index 0]
before long <- [ADJECTIVE_PHRASE, ADJECTIVE PHRASE CONSTRUCTION 1, level 2, index 1]
before long <- [ADJECTIVE, WORD, level 3, index 0]
Conceptual Analysis Result:
[MOOD
(CLASS:INTEROGATIVE)
(OBJECT
[PP
(CLASS:VEHICLE)
(TYPE:AIRPLANE)
(COMPANY:UA)
(NUMBER:600)
(ORIGIN:JFK)
(DESTINATION:DFW)
(STATUS:ARRIVED)
(DEPARTURETIME:8:59)
(ARRIVALTIME:14:32)
(INITIALDEPARTURETIME:8:52)
(INITIALARRIVALTIME:14:20)
(DEPARTUREGATE:B 21)
(ARRIVALGATE:B 2)
(SPOKENCOMPANY:NONE)])
(QUERY:
[AIRLINEPOSTANALYSIS
(OPERATION:
[REPORT
(VALUE:TIMETOARRIVAL)
(OBJECT:
[PP
(CLASS:VEHICLE)
(TYPE:AIRPLANE)
(COMPANY:UA)
(NUMBER:600)
(ORIGIN:JFK)
(DESTINATION:DFW)
(STATUS:ARRIVED)
(DEPARTURETIME:8:59)
(ARRIVALTIME:14:32)
(INITIALDEPARTURETIME:8:52)
(INITIALARRIVALTIME:14:20)
(DEPARTUREGATE:B 21)
(ARRIVALGATE:B 2)
(SPOKENCOMPANY:NONE)])])])
(ASSUMPTION_ON_TIME_OF_EVENT:>PRESENT_TIME)
(TIME_OF_ANALYSIS:Thu Jun 19 20:20:41 2003)]
Time Spent:
streaming and stream analysis -> 15 ms
syntactic analysis -> 16 ms
conceptual analysis -> 15 ms
This result was returned in approximately 46 ms.

Example 5

Using the same system, as Examples 1, 2, 3 and 4, the following inquiry was input and the indicated response was returned.
Q: From which city and at what time did flight 600 take off?
A: United Airline flight 600 originated from New York at 8 59 AM.
Syntactic Organization:
Spelling: from which city and at what time did flights 600 take off
from which city and at what time did flights 600 take off <- [SENTENCE, SENTENCE CONSTRUCTION 1, level 0, index -1]
from which city and at what time <- [WH_NP, WH_NP CONSTRUCTION 4, level 1, index 0]
from which city <- [WH_NP, WH_NP CONSTRUCTION 1, level 2, index 0]
from which <- [WH_PRONOUN, WORD, level 3, index 0]
city <- [NOUN_PHRASE, PLAIN NOUN PHRASE CONSTRUCTION, level 3, index 1]
city <- [NOUN, WORD, level 4, index 0]
and <- [CONJUNCTION, WORD, level 2, index 1]
at what time <- [WH_NP, WORD, level 2, index 2]
did flights 600 take off <- [VERB_PHRASE, VERB PHRASE CONSTRUCTION 7, level 1, index 1]
did <- [VERB, WORD, level 2, index 0]
flights 600 <- [NOUN_PHRASE, PLAIN NOUN PHRASE CONSTRUCTION, level 2, index 1]
flights 600 <- [NOUN, FLIGHT INTEGRATION, level 3, index 0]

flights 600 <- [FLIGHT, FLIGHT IDENTIFICATION CONSTRUCTION 2, level 4, index 0]
   flights <- [NOUN, WORD, level 5, index 0]
   600 <- [CARDINAL_NUMBER, WORD, level 5, index 1]
   6 <- [CARDINAL_NUMBER, WORD, level 6, index 0]
   100 <- [CARDINAL_NUMBER, WORD, level 6, index 1]
   take off <- [VERB, WORD, level 2, index 2]
Conceptual Analysis Result:
[AND
(VALUE1:
[MOOD
(CLASS:INTEROGATIVE)
(QUERY:
[AIRLINEPOSTANALYSIS
(OPERATION:
[REPORT
(VALUE:DEPARTURECITY)
(OBJECT:
[PP
(CLASS:VEHICLE)
(TYPE:AIRPLANE)
(COMPANY:UA)
(NUMBER:600)
(ORIGIN:JFK)
(DESTINATION:DFW)
(STATUS:ARRIVED)
(DEPARTURETIME:8:59)
(ARRIVALTIME:14:32)
(INITIALDEPARTURETIME:8:52)
(INITIALARRIVALTIME:14:20)
(DEPARTUREGATE:B 21)
(ARRIVALGATE:B 2)
(SPOKENCOMPANY:NONE)])])])
(OBJECT:
[PP
(CLASS:VEHICLE)
(TYPE:AIRPLANE)
(COMPANY:UA)
(NUMBER:600)
(ORIGIN:JFK)
(DESTINATION:DFW)
(STATUS:ARRIVED)
(DEPARTURETIME:8:59)
(ARRIVALTIME:14:32)
(INITIALDEPARTURETIME:8:52)
(INITIALARRIVALTIME:14:20)
(DEPARTUREGATE:B 21)
(ARRIVALGATE:B 2)
(SPOKENCOMPANY:NONE)])])
(VALUE2:
[MOOD:
(CLASS:INTEROGATIVE)
(QUERY:
[AIRLINEPOSTANALYSIS
(OPERATION:
[REPORT
(VALUE:DEPARTURETIME)
(OBJECT:
[PP
(CLASS:VEHICLE)
(TYPE:AIRPLANE)
(COMPANY:UA)
(NUMBER:600)
(ORIGIN:JFK)
(DESTINATION:DFW)
(STATUS:ARRIVED)
(DEPARTURETIME:8:59)
(ARRIVALTIME:14:32)
(INITIALDEPARTURETIME:8:52)
(INITIALARRIVALTIME:14:20)
(DEPARTUREGATE:B 21)
(ARRIVALGATE:B 2)
(SPOKENCOMPANY:NONE)])])])
(OBJECT:
[PP
(CLASS:VEHICLE)
(TYPE:AIRPLANE)
(COMPANY:UA)
(NUMBER:600)
(ORIGIN:JFK)
(DESTINATION:DFW)
(STATUS:ARRIVED)
(DEPARTURETIME:8:59)
(ARRIVALTIME:14:32)
(INITIALDEPARTURETIME:8:52)
(INITIALARRIVALTIME:14:20)
(DEPARTUREGATE:B 21)
(ARRIVALGATE:B 2)
(SPOKENCOMPANY:NONE)])])
(ASSUMPTION_ON_TIME_OF_EVENT:<PRESENT_TIME)
(TIME_OF_ANALYSIS:Thu Jun 19 20:20:41 2003)]
Time Spent:
streaming and stream analysis -> 31 ms
syntactic analysis -> 16 ms
conceptual analysis -> 15 ms
The result was returned in approximately 62 ms.

Example 6

Using the same system, as Examples 1, 2, 3, 4 and 5, the following inquiry was input and the indicated response was returned.

Q: When and where did flight six hundred arrive from New York and how late was the departure of flight three twenty?
A: United Airline flight 600 arrived from New York at 2 32 PM at gate B 2 of Dallas Fort Worth International Airport in Dallas. American Airline flight 320 left at 2 35 PM and was late by 1 hour 15 minutes.
Syntactic Organization:
Spelling: when and where did flight 600 arrive from New York and how late was the departure of flight 320
   when and where did flight 600 arrive from New York and how late was the departure of flight 320 <- [SENTENCE, SENTENCE CONSTRUCTION 4, level 0, index -1]
   when and where did flight 600 arrive from New York <- [SENTENCE, SENTENCE CONSTRUCTION 1, level 1, index 0]
   when and where did flight 600 arrive from New York <- [VERB_PHRASE, VERB PHRASE CONSTRUCTION 10, level 2, index 0]
   when and where <- [WH_PRONOUN, WH_PRONOUN CONSTRUCTION 1, level 3, index 0]
   when <- [WH_PRONOUN, WORD, level 4, index 0]
   and <- [CONJUNCTION, WORD, level 4, index 1]
   where <- [WH_PRONOUN, WORD, level 4, index 2]
   did flight 600 arrive from New York <- [VERB_PHRASE, VERB PHRASE CONSTRUCTION 5, level 3, index 1]
   did <- [VERB, WORD, level 4, index 0]
   flight 600 <- [NOUN_PHRASE, PLAIN NOUN PHRASE CONSTRUCTION, level 4, index 1]
   flight 600 <- [NOUN, FLIGHT INTEGRATION, level 5, index 0]

```
flight 600 <- [FLIGHT, FLIGHT IDENTIFICATION
CONSTRUCTION 2, level 6, index 0]
    flight <- [NOUN, WORD, level 7, index 0]
    600 <- [CARDINAL_NUMBER, WORD, level 7, index 1]
      6 <- [CARDINAL_NUMBER, WORD, level 8, index 0]
      100 <- [CARDINAL_NUMBER, WORD, level 8, index 1]
    arrive <- [GERUNDIVE_PHRASE, GERUNDIVE
PHRASE CONSTRUCTION, level 4, index 2]
      arrive <- [GERUNDIVE_VERB, WORD, level 5, index 0]
    from New York <- [PREPOSITION_PHRASE, PREPOSI-
TION PHRASE CONSTRUCTION 1, level 4, index 3]
      from <- [PREPOSITION, WORD, level 5, index 0]
      New York <- [NOUN_PHRASE, PLAIN NOUN PHRASE
CONSTRUCTION, level 5, index 1]
        New York <- [NOUN, CITY INTEGRATION, level 6,
index 0]
          New York <- [CITY, WORD, level 7, index 0]
    and <- [CONJUNCTION, WORD, level 1, index 1]
    how late was the departure of flight 320 <- [SENTENCE,
SENTENCE CONSTRUCTION 1, level 1, index 2]
      how late <- [WH_NP, WH_NP CONSTRUCTION 2, level
2, index 0]
        how <- [WH_PRONOUN, WORD, level 3, index 0]
        late <- [ADJECTIVE, WORD, level 3, index 1]
      was the departure of flight 320 <- [VERB_PHRASE,
VERB PHRASE CONSTRUCTION 1, level 2, index 1]
        was <- [VERB, WORD, level 3, index 0]
        the departure <- [NOUN_PHRASE, PLAIN NOUN
PHRASE CONSTRUCTION, level 3, index 1]
          the <- [DEFINITE_ARTICLE, WORD, level 4, index 0]
          departure <- [NOUN, WORD, level 4, index 1]
        of flight 320 <- [PREPOSITION_PHRASE, PREPOSI-
TION PHRASE CONSTRUCTION 1, level 3, index 2]
          of <- [PREPOSITION, WORD, level 4, index 0]
          flight 320 <- [NOUN_PHRASE, PLAIN NOUN PHRASE
CONSTRUCTION, level 4, index 1]
            flight 320 <- [NOUN, FLIGHT INTEGRATION, level 5,
index 0]
              flight 320 <- [FLIGHT, FLIGHT IDENTIFICATION
CONSTRUCTION 2, level 6, index 0]
                flight <- [NOUN, WORD, level 7, index 0]
                320 <- [CARDINAL_NUMBER, WORD, level 7, index 1]
                  3 <- [CARDINAL_NUMBER, WORD, level 8, index 0]
                  20 <- [CARDINAL_NUMBER, WORD, level 8, index 1]
Conceptual Analysis Result:
[AND
(VALUE1:
[AND
(VALUE1:
[MOOD
(CLASS:INTEROGATIVE)
(QUERY:
[AIRLINEPOSTANALYSIS
(OPERATION:
[REPORT
(VALUE:ARRIVALTIME)
(OBJECT:
[PP
(CLASS:VEHICLE)
(TYPE:AIRPLANE)
(COMPANY:UA)
(NUMBER:600)
(ORIGIN:JFK)
(DESTINATION:DFW)
(STATUS:ARRIVED)
(DEPARTURETIME:8:59)
(ARRIVALTIME:14:32)
(INITIALDEPARTURETIME:8:52)
(INITIALARRIVALTIME:14:20)
(DEPARTUREGATE:B 21)
(ARRIVALGATE:B 2)
(SPOKENCOMPANY:NONE)])])])
(OBJECT:
[PP
(CLASS:VEHICLE)
(TYPE:AIRPLANE)
(COMPANY:UA)
(NUMBER:600)
(ORIGIN:JFK)
(DESTINATION:DFW)
(STATUS:ARRIVED)
(DEPARTURETIME:8:59)
(ARRIVALTIME:14:32)
(INITIALDEPARTURETIME:8:52)
(INITIALARRIVALTIME:14:20)
(DEPARTUREGATE:B 21)
(ARRIVALGATE:B 2)
(SPOKENCOMPANY:NONE)])])
(VALUE2:
[MOOD
(CLASS:INTEROGATIVE)
(QUERY:
[AIRLINEPOSTANALYSIS
(OPERATION:
[REPORT:
(VALUE:ARRIVALLOCATION)
(OBJECT:
[PP
(CLASS:VEHICLE)
(TYPE:AIRPLANE)
(COMPANY:UA)
(NUMBER:600)
(ORIGIN:JFK)
(DESTINATION:DFW)
(STATUS:ARRIVED)
(DEPARTURETIME:8:59)
(ARRIVALTIME:14:32)
(INITIALDEPARTURETIME:8:52)
(INITIALARRIVALTIME:14:20)
(DEPARTUREGATE:B 21)
(ARRIVALGATE:B 2)
(SPOKENCOMPANY:NONE)])])])
(OBJECT:
[PP
(CLASS:VEHICLE)
(TYPE:AIRPLANE)
(COMPANY:UA)
(NUMBER:600)
(ORIGIN:JFK)
(DESTINATION:DFW)
(STATUS:ARRIVED)
(DEPARTURETIME:8:59)
(ARRIVALTIME:14:32)
(INITIALDEPARTURETIME:8:52)
(INITIALARRIVALTIME:14:20)
(DEPARTUREGATE:B 21)
(ARRIVALGATE:B 2)
(SPOKENCOMPANY:NONE)])])
(ASSUMPTION_ON_TIME_OF_EVENT:   <PRESENT_
TIME)
(EXTRA:
[AIRLINEPOSTANALYSIS
(OPERATION:
[VERIFY
```

```
(ORIGIN:
[CITY
(CITYCODE:NEWYORK)
(VALUE:
[AIRPORT
(AIRPORTCODE:JFK)
(AIRPORTNAME:John F Kennedy International Airport)])
(VALUE:
[AIRPORT
(AIRPORTCODE:NWK)
(AIRPORTNAME:Newark International
Airport)])])
(OBJECT:
[PP
(CLASS:VEHICLE)
(TYPE:AIRPLANE)
(COMPANY:UA)
(NUMBER:600)
(ORIGIN:JFK)
(DESTINATION:DFW)
(STATUS:ARRIVED)
(DEPARTURETIME:8:59)
(ARRIVALTIME:14:32)
(INITIALDEPARTURETIME:8:52)
(INITIALARRIVALTIME:14:20)
(DEPARTUREGATE:B 21)
(ARRIVALGATE:B 2)
(SPOKENCOMPANY:NONE)])])])
(VALUE2:
[MOOD
(CLASS:INTEROGATIVE)
(QUERY:
[AIRLINEPOSTANALYSIS
(OPERATION:
[AIRLINEPOSTANALYSIS
(OPERATION:
[REPORT:
(VALUE:DEPARTUREDELTASTATUS)
    (OBJECT:
    [PP
(CLASS:VEHICLE)
(TYPE:AIRPLANE)
(COMPANY:AA)
(NUMBER:320)
(ORIGIN:LAS)
(DESTINATION:DFW)
(STATUS:INFLIGHT)
(DEPARTURETIME:14:35)
(ARRIVALTIME:16:15)
(INITIALDEPARTURETIME:13:20)
(INITIALARRIVALTIME:16:20)
(DEPARTUREGATE:E 42)
(ARRIVALGATE:B 2)
(SPOKENCOMPANY:NONE)])])])
(OBJECT:
[PP
(CLASS:VEHICLE)
(TYPE:AIRPLANE)
(COMPANY:AA)
(NUMBER:320)
(ORIGIN:LAS)
(DESTINATION:DFW)
(STATUS:INFLIGHT)
(DEPARTURETIME:14:35)
(ARRIVALTIME:16:15)
(INITIALDEPARTURETIME:13:20)
(INITIALARRIVALTIME:16:20)
(DEPARTUREGATE:E 42)
(ARRIVALGATE:B 2)
(SPOKENCOMPANY:NONE)])])])
(OBJECT:
 [PP
(CLASS:VEHICLE)
(TYPE:AIRPLANE)
(COMPANY:AA)
(NUMBER:320)
(ORIGIN:LAS)
(DESTINATION:DFW)
(STATUS:INFLIGHT)
(DEPARTURETIME:14:35)
(ARRIVALTIME:16:15)
(INITIALDEPARTURETIME:13:20)
(INITIALARRIVALTIME:16:20)
(DEPARTUREGATE:E 42)
(ARRIVALGATE:B 2)
(SPOKENCOMPANY:NONE)])
(ASSUMPTION_ON_TIME_OF_EVENT:<PRESENT_
    TIME)
(TIME_OF_ANALYSIS:Thu Jun 19 20:20:41 2003)]
    Time Spent:
    streaming and stream analysis -> 31 ms
    syntactic analysis -> 31 ms
    conceptual analysis -> 828 ms
```

The result was returned in approximately 890 ms.

The foregoing embodiments have been presented for the purpose of illustration and description only and are not to be construed as limiting the scope of the invention in any way. The scope of the invention is to be determined from the claims appended hereto.

The invention claimed is:

1. A method for processing language comprising:
identifying known words within a received input;
generating a set of candidate parts of speech from each continuous sequence of identified known words within said input;
permuting at least a portion of the candidate parts of speech from each continuous sequence;
producing a plurality of potentially valid syntactic structures from the permuted candidate parts of speech;
for at least one of the potentially valid syntactic structures, generating a conceptual representation thereof based on a database of conceptual information comprising parts of speech and a dictionary;
determining at least one anomaly criterion for each conceptual representation; and
at least one of responding and processing a response to the input, based on one or more of the conceptual representations, in dependence on the determined at least one anomaly criterion, in a conceptually appropriate manner.

2. The method of claim 1, wherein the permuting of candidate parts of speech is implemented as one of a bottom-up parsing process, a top-down parsing process, an Early parsing process, a finite-state parsing process, and a CYK parsing process.

3. The method of claim 1, wherein syntactically analyzing comprises applying syntactic transform scripts to the potential syntactic structures.

4. The method of claim 1, further comprising the step of using the conceptual representation to formulate a response to a language sample comprising an inquiry.

5. The method of claim 1, further comprising associating conceptual rules with each candidate word and each associated part of speech, and each syntactic sequence of words and each associated part of speech, wherein further the conceptual rules relate to conceptual relationships between at least two of the candidate words and syntactic sequences of words.

6. The method of claim 5, wherein the step of deriving the conceptual representation further comprises applying the conceptual rules to the syntactic sequence of words, the candidate words or any combination thereof.

7. The method of claim 5, wherein the conceptual rules comprise an interpreted language.

8. The method of claim 5, wherein the conceptual rules comprise a predicate builder scripting language.

9. The method of claim 5, wherein the conceptual rules comprise a compiled language.

10. The method of claim 1, wherein the input is in the form of a remote electronic communication.

11. The method of claim 1, wherein the input is derived from a speech recognition process.

12. The method of claim 1, wherein the input comprises electronic text.

13. The method of claim 1, wherein the input comprises a speech input.

14. The method of claim 13, wherein the speech input is received from a microphone.

15. The method of claim 13, wherein the speech input is received from at least one of an audio file and a recording.

16. The method of claim 1, wherein the input is derived from the Internet.

17. A method for processing speech, comprising:
identifying an array of conceptual components forming words within an input;
generating a set of candidate parts of speech from each word;
permuting at least a portion of the candidate parts of speech from each array;
producing a plurality of potentially valid syntactic structures from the permuted candidate parts of speech;
for a plurality of potentially valid syntactic structures, generating a conceptual representation thereof based on a database of conceptual information comprising parts of speech and a dictionary;
determining at least one anomaly criterion for each conceptual representation;
disambiguating between at least two potentially valid syntactic structures based on the corresponding conceptual representations, in dependence on the determined at least one anomaly criterion; and
producing at least one of an output and a response in dependence on said disambiguating.

18. The method of claim 17, wherein processing the speech comprises producing the candidate words from an N-best list of potential words produced by application of the Hidden Markov Model (HMM) technique to a speech sample from the input and also from combinations of two or more consecutive N-best list potential words.

19. The method of claim 17, wherein the permuting of candidate parts of speech is implemented as one of a bottom-up parsing process, a top-down parsing process, an Early parsing process, a finite-state parsing process, and a CYK parsing process.

20. The method of claim 17, wherein syntactically analyzing comprises applying syntactic transform scripts to the potential syntactic structures.

21. The method of claim 17, further comprising the step of using the conceptual representation to formulate a response to a speech sample comprising an inquiry.

22. The method of claim 17, further comprising associating conceptual rules with each candidate word and each associated part of speech, and each syntactic sequence of words and each associated part of speech, wherein further the conceptual rules relate to conceptual relationships between at least two of the candidate words and syntactic sequences of words.

23. The method of claim 22, wherein the step of deriving the conceptual representation further comprises applying the conceptual rules to the syntactic sequence of words, the candidate words or any combination thereof.

24. The method of claim 22, wherein the conceptual rules comprise an interpreted language.

25. The method of claim 22, wherein the conceptual rules comprise a predicate builder scripting language.

26. The method of claim 22, wherein the conceptual rules comprise a compiled language.

27. The method of claim 17, wherein the input is received from a microphone.

28. The method of claim 17, wherein the input is received from at least one of an audio file and a recording.

29. The method of claim 17, wherein the input is received through a speech recognition process.

30. The method of claim 17, wherein the input is received through a speech to text process.

31. The method of claim 17, wherein the input is derived from the Internet.

32. A system adapted to process language, comprising:
an input;
at least one processor adapted to:
(a) identify known words received through the input;
(b) generating a set of candidate parts of speech from each continuous sequence of identified known words;
(c) permuting at least a portion of the candidate parts of speech from each continuous sequence;
(d) producing a plurality of potentially valid syntactic structures from the permuted candidate parts of speech;
(e) for at least one of the potentially valid syntactic structures, generating a conceptual representation thereof based on a database of conceptual information comprising parts of speech and a dictionary;
(f) determining at least one anomaly criterion for each conceptual representation; and
(g) generating a response to the input, based on one or more of the conceptual representations, in dependence on the determined at least one anomaly criterion, in a conceptually appropriate manner; and
at least one of an output presenting a signal sensitive to the response and the processor being adapted to process the response.

33. The system of claim 32, wherein the permuting of candidate parts of speech is implemented as one of a bottom-up parsing process, a top-down parsing process, an Early parsing process, a finite-state parsing process, and a CYK parsing process.

34. The system of claim 32, wherein syntactically analyzing comprises applying syntactic transform scripts to the potential syntactic structures.

35. The system of claim 32, wherein the processor is further adapted to use the conceptual representation to formulate a response to a language sample comprising an inquiry.

36. The system of claim 32, wherein the processor is further adapted to associate conceptual rules with each candidate word and each associated part of speech, and each syntactic sequence of words and each associated part of speech, wherein further the conceptual rules relate to conceptual relationships between at least two of the candidate words and syntactic sequences of words.

37. The system of claim 36, wherein the deriving the conceptual representation further comprises applying the conceptual rules to the syntactic sequence of words, the candidate words or any combination thereof.

38. The system of claim 36, wherein the conceptual rules comprise an interpreted language.

39. The system of claim 36, wherein the conceptual rules comprise a predicate builder scripting language.

40. The system of claim 36, wherein the conceptual rules comprise a compiled language.

41. The system of claim 32, wherein the input is derived from a remote electronic communication.

42. The system of claim 32, wherein the input is derived through a speech recognition process.

43. The system of claim 32, wherein the input comprises electronic text.

44. The system of claim 32, wherein the input comprises a speech input.

45. The system of claim 44, wherein the speech input is received from a microphone.

46. The system of claim 44, wherein the speech input is received from at least one of an audio file and a recording.

47. The system of claim 32, wherein the input is derived from the Internet.

48. A system adapted to process speech, comprising:
an input receiving an array of conceptual components forming words;
a processor, adapted to
(a) generate a set of candidate parts of speech from each word;
(b) permute at least a portion of the candidate parts of speech from each array;
(c) produce a plurality of potentially valid syntactic structures from the permuted candidate parts of speech;
(d) for a plurality of potentially valid syntactic structures, generate a conceptual representation thereof based on a database of conceptual information comprising parts of speech and a dictionary;
(e) determine at least one anomaly criterion for each conceptual representation; and
(f) disambiguate between at least two potentially valid syntactic structures based on the corresponding conceptual representations, in dependence on the determined at least one anomaly criterion; and
an output responsive to the disambiguation.

49. The system of claim 48, wherein processing the speech comprises producing the candidate words from an N-best list of potential words produced by application of the Hidden Markov Model (HMM) technique to a speech sample from the input and also from combinations of two or more consecutive N-best list potential words.

50. The system of claim 48, wherein the permuting of candidate parts of speech is implemented as one of a bottom-up parsing process, a top-down parsing process, an Early parsing process, a finite-state parsing process, and a CYK parsing process.

51. The system of claim 48, wherein syntactically analyzing comprises applying syntactic transform scripts to the potential syntactic structures.

52. The system of claim 48, wherein the processor is further adapted to use the conceptual representation to formulate a response to a speech sample comprising an inquiry.

53. The system of claim 48, wherein the processor is further adapted to associate conceptual rules with each candidate word and each associated part of speech, and each syntactic sequence of words and each associated part of speech, wherein further the conceptual rules relate to conceptual relationships between at least two of the candidate words and syntactic sequences of words.

54. The system of claim 53, wherein the deriving the conceptual representation further comprises applying the conceptual rules to the syntactic sequence of words, the candidate words or any combination thereof.

55. The system of claim 48, wherein the received array of conceptual components forming words is derived from the output of a speech recognizer.

56. The system of claim 48, wherein the input comprises a microphone.

57. The system of claim 48, wherein the input is derived from at least one of an audio file and a recording.

58. The system of claim 48, wherein the input is derived from the Internet.

59. The system of claim 48, wherein the received input is derived from a speech to text process.

60. A tangible computer readable medium for controlling a programmable computer to perform a method comprising the steps of:
identifying words within a received input;
generating a set of candidate parts of speech from each continuous sequence of input identified words;
permuting at least a portion of the candidate parts of speech from each continuous sequence; producing a plurality of potentially valid syntactic structures from the permuted candidate parts of speech;
for at least one of the potentially valid syntactic structures, generating a conceptual representation thereof based on a database of conceptual information comprising parts of speech and a dictionary;
determining at least one anomaly criterion for each conceptual representation; and
responding to the input, based on one or more of the conceptual representations, in dependence on the determined at least one anomaly criterion, in a conceptually appropriate manner.

61. The method according to claim 60, wherein the identifying step further comprises the step of identifying known words within a received textual input.

62. The method according to claim 60, wherein the identifying step further comprises the step of identifying known words within a received speech input.

63. The method according to claim 60, wherein the identifying step further comprises the step of identifying an array of syntactic components forming words within an input.

64. A tangible computer readable medium for controlling a programmable computer to perform a method comprising the steps of:
identifying an array of conceptual components forming words within an input;
generating a set of candidate parts of speech from each word; permuting at least a portion of the candidate parts of speech from each array; producing a plurality of potentially valid syntactic structures from the permuted candidate parts of speech;
for a plurality of potentially valid syntactic structures, generating a conceptual representation thereof based on a database of conceptual information comprising parts of speech and a dictionary;
determining at least one anomaly criterion for each conceptual representation;
disambiguating between at least two potentially valid syntactic structures based on the corresponding conceptual representations, in dependence on the determined at least one anomaly criterion; and producing at least one of an output and a response in dependence on said disambiguating.

65. A method for processing a sequence of words, comprising:

generating a set of candidate parts of speech from a sequence of input known words;

permuting at least a portion of the candidate parts of speech from each continuous sequence;

producing a plurality of potentially valid syntactic structures from the permuted candidate parts of speech;

for at least one of the potentially valid syntactic structures, generating a conceptual representation thereof based on at least a correspondence of a word with a part of speech and linguistic rules;

determining at least one anomaly criterion for each conceptual representation; and responding to the textual input, based on one or more of the conceptual representations, in dependence on the determined at least one anomaly criterion, in a conceptually appropriate manner.

* * * * *